United States Patent
Takimoto et al.

(10) Patent No.: US 6,715,789 B2
(45) Date of Patent: Apr. 6, 2004

(54) KNEE PROTECTING AIRBAG DEVICE

(75) Inventors: Masahiro Takimoto, Aichi-ken (JP); Toru Koyama, Aichi-ken (JP); Chiharu Totani, Aichi-ken (JP); Hikaru Ando, Aichi-ken (JP); Takeshi Hosokawa, Aichi-ken (JP); Hiroyuki Tajima, Aichi-ken (JP); Yoshio Mizuno, Aichi-ken (JP); Kazumasa Suzuki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/141,057

(22) Filed: May 9, 2002

(65) Prior Publication Data

US 2002/0171231 A1 Nov. 21, 2002

(30) Foreign Application Priority Data

| May 21, 2001 | (JP) | 2001-150478 |
| May 21, 2001 | (JP) | 2001-150484 |
| May 21, 2001 | (JP) | 2001-151516 |
| Dec. 21, 2001 | (JP) | 2001-390263 |
| Jan. 23, 2002 | (JP) | 2002-014616 |

(51) Int. Cl.$^7$ .............................................. B60R 21/22
(52) U.S. Cl. ........................ 280/730.1; 280/743.1; 280/735; 280/753
(58) Field of Search .................... 280/730.1, 753, 280/735, 743.1

(56) References Cited

U.S. PATENT DOCUMENTS

| 3,784,223 A | * | 1/1974 | Hass et al. ............... 280/730.1 |
| 4,198,075 A | * | 4/1980 | Kob et al. ................. 280/753 |
| 4,262,931 A | * | 4/1981 | Strasser et al. ............ 280/729 |
| 5,536,043 A | * | 7/1996 | Lang et al. ................ 280/753 |

(List continued on next page.)

FOREIGN PATENT DOCUMENTS

| DE | 298 07 424 U1 | 10/1998 | |
| DE | 19900592 | 7/2000 | |
| EP | 357225 A1 * | 3/1990 | ........... B60R/21/22 |
| EP | 684 167 | 11/1995 | |
| EP | 818 360 | 9/1998 | |
| GB | 2 263 671 | 8/1993 | |
| JP | 04024142 A * | 1/1992 | ........... B06R/21/16 |
| JP | 5-208646 | 8/1993 | |
| JP | 05345553 A * | 12/1993 | ......... B60R/21/045 |
| JP | 8-301054 | 11/1996 | |
| JP | 0-123862 | 5/1997 | |
| JP | 9-123863 | 5/1997 | |
| JP | 10-59103 | 3/1998 | |
| JP | 10071911 | 3/1998 | |
| JP | 10-315894 | 12/1998 | |
| JP | 11240411 | 9/1999 | |
| JP | 2000-225911 | 8/2000 | |
| WO | WO 02/04261 | 1/2002 | |
| WO | WO 02/04262 | 1/2002 | |

*Primary Examiner*—Charles T. Jordan
*Assistant Examiner*—Bret Hayes
(74) *Attorney, Agent, or Firm*—Posz & Bethards, PLC

(57) ABSTRACT

A knee protecting airbag device, which is located in front of a passenger, comprises an airbag, an inflator, and a case housing the airbag and the inflator. When the airbag extends and expands, it protrudes toward the rear of the vehicle from the opening of the case, to protect the knees of the passenger. The knee protecting airbag device further comprises a holding member having a mounting portion for mounting the knee protecting airbag device on the vehicle. The holding member holds the case. In the holding member, there are a communication hole and a support face, which is arranged on the periphery of the communication hole. The communicating hole communicates with the opening of the case and allows the airbag to expand. The support face can support the front face of the extending and expanding airbag.

20 Claims, 58 Drawing Sheets

U.S. PATENT DOCUMENTS

| | | | |
|---|---|---|---|
| 5,570,901 A | * 11/1996 | Fyrainer | 280/730.1 |
| 5,695,214 A | * 12/1997 | Faigle et al. | 280/735 |
| 5,931,493 A | * 8/1999 | Sutherland | 280/730.1 |
| 6,092,836 A | * 7/2000 | Saslecov | 280/730.1 |
| 6,155,595 A | * 12/2000 | Schultz | 280/729 |
| 6,186,542 B1 | * 2/2001 | Enders et al. | 280/743.1 |
| 6,193,272 B1 | * 2/2001 | Aigner et al. | 280/730.1 |
| 6,217,059 B1 | * 4/2001 | Brown et al. | 280/730.2 |

\* cited by examiner

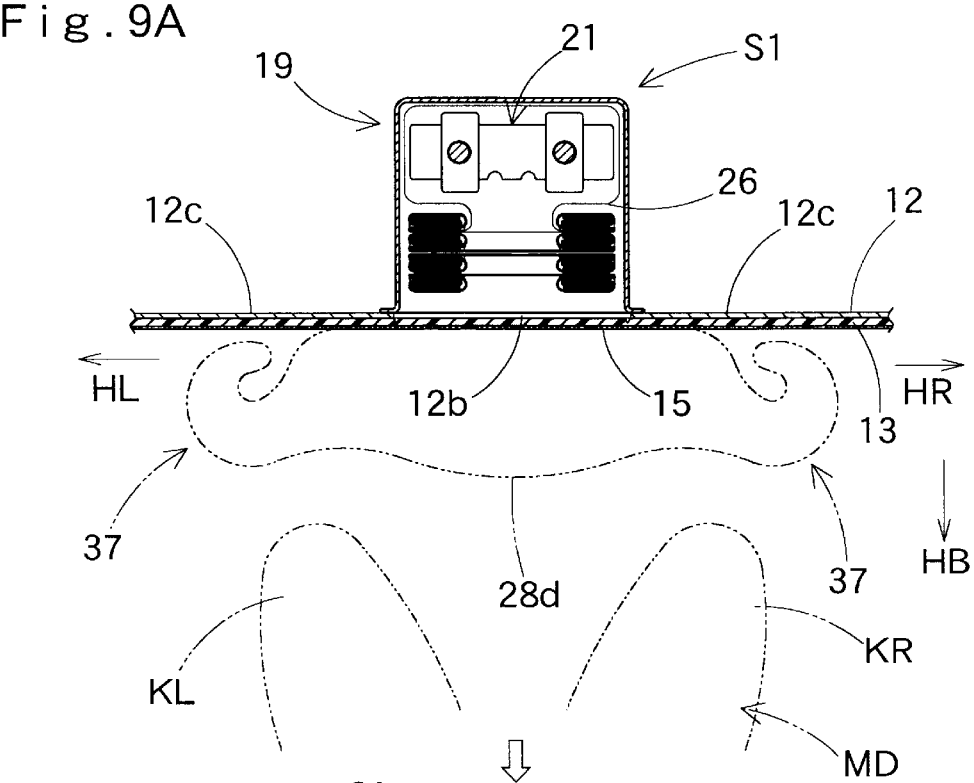
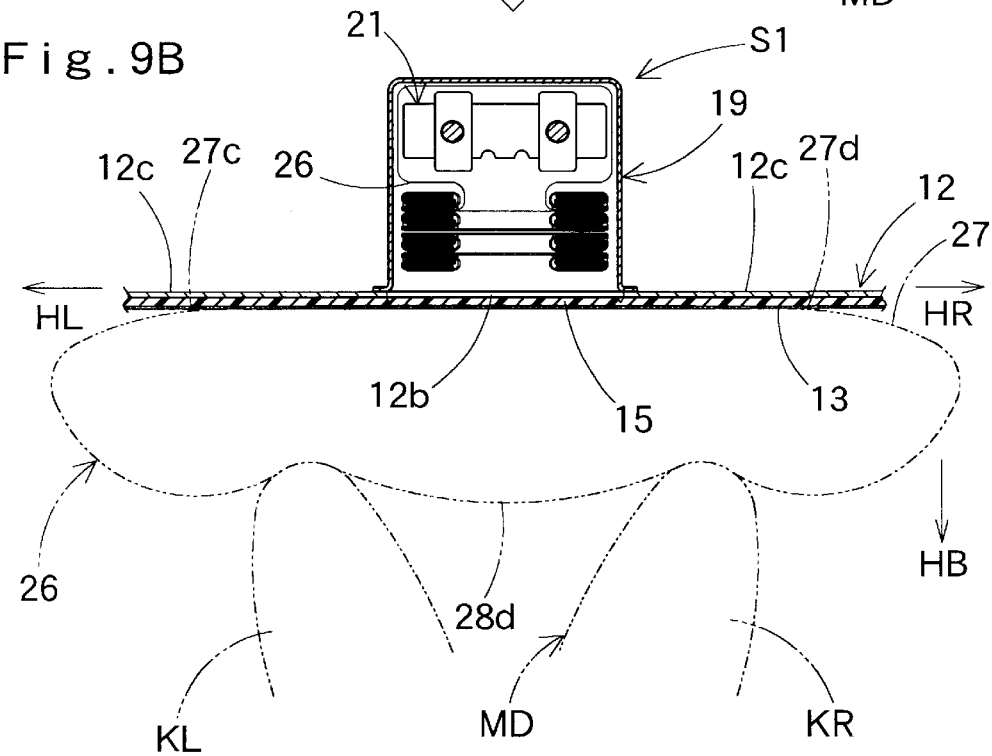

KNEE PROTECTING AIRBAG DEVICE

CROSS REFERENCES TO RELATED APPLICATIONS

The present application claims priority to Japanese patent application of Takimoto et al., filed May 21, 2001, No.2001-150478, and Japanese patent application of Takimoto et al., filed May 21, 2001, No.2001-150484, and Japanese patent application of Totani et al., filed May 21, 2001, No.2001-151516, and Japanese patent application of Mizuno et al., filed Dec. 21, 2001, No.2001-390263, and Japanese patent application of Totani et al., filed Jan. 23, 2002, No.2002-14616, the entirely of each is hereby incorporated into the present application by this reference.

BACKGROUND OF THE INVENTION

The present invention relates to a knee protecting airbag device capable of protecting the knees of a passenger with an airbag, which extends and expands when filled with an inflating gas.

In the prior art, a device for protecting the knees of a passenger is exemplified by an airbag device having a construction, disclosed in Unexamined Published Japanese Patent Application No. 9-123862. This airbag device is arranged at a position below a steering column to protect the knees of a driver. The airbag device comprises an airbag, an inflator for feeding an inflating gas to the airbag, a case for housing the airbag and the inflator, and an airbag cover for covering the housed airbag and for allowing the airbag to protrude. The airbag extends and expands, when activated, toward the lower face of the upper portion of a column cover.

In the airbag device thus constructed, a strong reaction force pushing the case forward is applied to the case when the airbag extends and expands with the inflating gas from the inflator. Therefore, the case has to be mounted and fixed on a highly rigid structural member such as a steering column so that the case is not moved by the reaction.

At positions below the steering column, where the airbag device of the aforementioned construction is located, however, there are usually arranged not only the steering column but also a tilt mechanism, a telescopic mechanism, a parking brake device and so on, thereby leaving just a narrow space for accommodating the airbag device. Therefore, the space for mounting and fixing the case on the steering column is so narrow that the installation requires a long time.

In order to protect the knees of a passenger seated on the front seat next to the driver, or the passenger seat, on the other hand, it is conceivable to arrange the knee protecting airbag device in front of the passenger seat. In front of the passenger seat, where such an airbag device would be installed, however, there are closely arranged a main airbag device, which includes an airbag for extending and expanding between the windshield and the passenger to protect the passenger, the duct of an air conditioner, a, glove box and so on. Therefore, the space for installing this airbag device is narrow as in the case of the driver's seat, and the space for mounting and fixing the case is narrow.

In the airbag device thus constructed, moreover, it is also conceivable to arrange a case or the like on a plate-shaped holding member such as a knee panel (or a knee bolster) to be arranged in front of the seated passenger.

The knee panel is connected to a movement energy absorber, which is located in front of the knee panel. Such a panel would face a large portion the front side of the seated passenger. The knee panel receives the forward moving knees of the passenger at the time of a front collision of the vehicle and moves forward together with the knees, to deform the kinetic energy absorber in front. In short, the knee panel acts to dampen the shock on the knees of the forward-moving passenger.

When the airbag and the inflator are to be housed in the plate-shaped holding member or knee panel, the airbag cover for covering the folded airbag also has to be mounted on the holding member.

This airbag cover is desirably constructed to widely cover the rear side of the holding member such as the knee panel to avoid degradation in appearance. The airbag cover is desirably formed not separately of but integrally with a door portion, which covers the folded airbag but is opened when pushed by the expanding airbag. In this construction, therefore, the door portion is formed integrally with the rest of the airbag cover by providing a breakaway in its periphery.

When the airbag cover having the integrated door portion is mounted on the aforementioned holding member, however, there arises a problem that the breakaway portion is smoothly broken to open the door portion.

In the airbag device thus constructed, the airbag module, which includes the airbag, the inflator, the case and the airbag cover, is mounted and fixed on the vehicle body by supporting it on a mounting bracket.

When an airbag that has completed its extension and expansion cannot completely absorb the kinetic energy of the knees, the aforementioned mounting bracket of the airbag device is constructed to deform and buckle plastically, to absorb the kinetic energy of the knees.

In short, the airbag device is constructed to absorb the kinetic energy of the knees by buckling the mounting bracket. For this, the mounting bracket has a structure in which it is extended generally forward from the airbag module and is fixed at a predetermined portion of the vehicle body. As a result, the forward extension of the mounting bracket requires space.

If the distance between the airbag module and the portion of the vehicle body for rigidly fixing the module is short, therefore, the structure having the aforementioned mounting bracket is not acceptable, and the conventional device has a low degree of freedom with regard to locating the device.

In addition, if the airbag device of the aforementioned construction is mounted on a vehicle, the distance from the steering column cover or the instrument panel to the knees of the passenger is usually short when the passenger is seated. In the case of the driver, the driver is frequently depressing the brake pedal when the airbag device deploys, so that the distance from the column cover to the driver's knees is shorter. Therefore, the airbag has to quickly expand in order for it to protect the knees properly.

In addition, if the airbag device of this kind is arranged at the driver's seat, the steering column, the tilt mechanism, the telescopic mechanism, the parking brake and so on are close to the location of the airbag device. Therefore, it is difficult to provide a large housing space for locating the knee protecting airbag device. Especially in recent years, it has been difficult to make space to accommodate the width of the airbag device in the directions perpendicular to the axis of the case when a glove box or the like is arranged below the column cover. It is, therefore, desired to make the airbag device compact by making the width as small as possible in the directions perpendicular to the case axis.

SUMMARY OF THE INVENTION

A first object of the invention is to provide a knee protecting airbag device that can be easily mounted in a vehicle.

A second object of the invention is to provide a knee protecting airbag device, in which a door portion can be pushed and smoothly opened even if an airbag cover having the an integral door portion is mounted on a plate-shaped holding member located in front of the knees of a seated passenger.

A third object of the invention is to provide a knee protecting airbag device that can absorb the kinetic energy of the knees, if not fully absorbed by the airbag, and that can improve the degree of freedom in locating the device.

A fourth object of the invention is to provide a knee protecting airbag device that can extend the airbag quickly enough to protect the knees of the passenger properly.

A fifth object of the invention is to provide a knee protecting airbag device that is reduced in width in the direction perpendicular to the axis of a case so that it can be located in a narrow space.

The first object of the invention can be achieved by a knee protecting airbag device having the following construction.

The knee protecting airbag device comprises a folded airbag, an inflator for feeding an inflating gas to the airbag, and a case housing the airbag and the inflator. The device is arranged in the vehicle in front of a seated passenger. The airbag, when fed with the inflating gas, extends and expands, while protruding backward from the opening of the case, to protect the knees of the passenger. The knee protecting airbag device further comprises a holding member, which has a mounting portion mounted to the vehicle. The holding member includes a communication hole communicating with the opening of the case, for allowing the expanding airbag to protrude, and a support face arranged on the periphery of the communication hole, for supporting the vehicle front side face of the extending and expanding airbag.

In the knee protecting airbag device, the case housing the folded airbag and the inflator is held by the holding member. By using the mounting portion formed at the holding member, the knee protecting airbag device is mounted on the vehicle. At the time of mounting the knee protecting airbag device on the vehicle, therefore, the mounting portion of the holding member holding the case is mounted and fixed on the highly rigid mounting portion of the vehicle body, so that the knee protecting airbag device can be mounted on the vehicle. At this time, the work to mount the mounting portion of the holding member on the mounting portion of the vehicle body can be done in the free space provided both transversely and vertically from the pre-arranged position of the case. By setting the position of the mounting portions of the holding members at a location where the working space can be easily provided, therefore, the work to mount the knee protecting airbag device on the vehicle can be done more easily than when the case is mounted and fixed directly on the mounting portion of the vehicle body.

Of course, the holding member holding the case is mounted on the highly rigid mounting portion of the vehicle body so that the case housing the airbag and the inflator is also held in a stable manner.

In the knee protecting airbag device thus constructed, moreover, the front face of the airbag, when it is extended and expanded, is supported by the support face of the holding member. Even when the airbag interferes with the knees of the passenger when expanded, therefore, the airbag does not move forward but can properly protect the knees of the passenger.

In the knee protecting airbag device thus constructed, therefore, the stable support of the case and the airbag, when extended and expanded, can be provided, and the mounting of the knee protecting airbag device on the vehicle can be facilitated.

In the knee protecting airbag device thus constructed, it is preferred that the case housing the folded airbag and the inflator is assembled in advance with the holding member into one assembly.

With this construction of the knee protecting airbag device, the airbag, the inflator, the case and the holding member can be transported and stored in the assembled state. Therefore, it is easy to handle these members when mounting them on the vehicle.

A second object of the invention can be achieved by a knee protecting airbag device having the following construction.

In a knee protecting airbag device, a knee protecting folded airbag and an inflator for feeding an inflating gas to the airbag are housed in a plate-shaped holding member arranged in front of the knees of a seated passenger. An airbag cover for covering the housed airbag and for allowing it to protrude when activated is mounted on the holding member. The holding member includes a bottomed box-shaped housing portion for housing the airbag and the inflator. The housing portion has a rear-facing opening. The airbag cover includes a door portion, a breakaway portion, a hinge portion, and a general portion. The door portion covers the opening of the housing portion for opening when pushed by the expanding airbag. The thinned breakaway portion is arranged at the periphery of the door portion and is broken for the door portion to open. The hinge portion is arranged at one side of the door portion for providing a pivot for the door portion to open. The general portion is arranged around the door portion with the breakaway portion and the hinge portion between them, for covering the periphery of the rear housing portion of the holding member. Mounting members to be mounted at the housing portion are arranged at a plurality of locations of the general portion, in the vicinity of the periphery of the opening of the housing portion.

In the knee protecting airbag device thus constructed, the airbag expands with the inflating gas discharged by the inflator. Then, the airbag pushes the door portion of the airbag cover and breaks the breakaway portion so that the door portion opens and pivots at the hinge portion. As a result, the airbag protrudes from the housing portion in the rearward direction and extends and expands greatly to protect the knees of the passenger.

In the knee protecting airbag device thus constructed, the airbag cover is mounted at a plurality of mounting members in the general portion, near the periphery of the housing portion opening, through the holding member. When the airbag expands, therefore, the breakaway portion and the hinge portion of the general portion, near the opening periphery of the housing portion, are hard to move relative to the housing portion. As a result, the pushing force of the airbag acts properly on the breakaway portion to break the breakaway portion smoothly. In addition, the hinge portion, which pivots when the door portion opens, is also hard to move relative to the housing portion and can stabilize the opening action of the door portion. Even if the airbag cover is made of a synthetic resin such as a thermoplastic elastomer, therefore, the door portion is smoothly opened when pushed by the airbag.

In the knee protecting airbag device thus constructed, therefore, the door portion can be smoothly opened by the pushing force of the airbag, even when the airbag cover, which has the integrated door portion, is mounted on the holding member in front of the knees of the seated passenger.

The individual mounting members of the airbag cover are only inserted in the holding member around the opening of the housing portion, so that the external surface area of the holding member is not reduced. Even if the knees of the passenger interfere with the holding member in an unexpanded state of the airbag, therefore, the holding member can engage the knees over a wide area. Accordingly, the holding member can support the front side of the airbag when the airbag has completed its expansion, so that the airbag is stably supported by the holding member when expanded.

In the knee protecting airbag device thus constructed, the airbag and the inflator are housed in the housing portion mounted on the holding member, and the airbag cover is mounted on the holding member. The airbag cover is provided with the door portion, for covering the folded airbag, and the general portion, for covering the rear side of the holding member at the periphery of the housing portion opening. In short, the airbag, the inflator, the airbag cover and the holding member can be assembled in advance. When the airbag, the inflator, the airbag cover and the holding member are assembled in advance, therefore, the airbag and its associated parts can be transported and stored in the assembled state. Therefore, it is easy to handle the individual members while they are mounted on the vehicle.

In the knee protecting airbag device thus constructed, moreover, it is preferred that the individual mounting members of the air bag cover have retaining holes. The housing portion has a plurality of hooks to be inserted into and retained by the retaining holes.

With the knee protecting airbag device being thus constructed, the work to mount the mounting members on the housing portion can be completed by inserting the individual hooks of the housing portion into the retaining holes of the individual mounting members of the airbag cover and by retaining the mounting members by the individual hooks. It is, therefore, possible to reduce the number of steps of and the cost of mounting the airbag cover on the holding member.

In the knee protecting airbag device thus constructed, it is preferred that the holding member comprises joining portions connected to the vehicle body, which are joined when the knee protecting airbag device is mounted on the vehicle. A kinetic energy absorbing member, which is capable of absorbing the kinetic energy of the knees, is arranged on the body of the vehicle at positions where the joining portions are connected.

With the knee protecting airbag device being thus constructed, the kinetic energy absorbing member is deformed in absorbing the kinetic energy of the knees if the expanded airbag fails to absorb the kinetic energy of the knees fully. Therefore, the knees of the passenger can be properly protected by lessening the impact on the knees.

Moreover, the third object of the invention can be achieved by a knee protecting airbag device having the following construction.

A knee protecting airbag device comprises an airbag module arranged in front of the knees of a seated passenger. The airbag module includes a knee protecting folded airbag, an inflator capable of feeding inflating gas the airbag, a case for housing the airbag and the inflator, and an airbag cover for covering the rear-facing opening of the case. The case has an opening for allowing the airbag to protrude toward the rear of the vehicle when it expands. The knee protecting airbag device further includes a plate-shaped holding member made of a deformable material. The holding member has a plate-shaped portion, extending around the opening of the case, and a mounting portion to be mounted on the vehicle body. The plate-shaped portion is arranged in front of the area occupied by the airbag when the airbag has completed its expansion. The mounting portion is arranged near the periphery of the plate-shaped portion. The holding member is constructed to hold the case that houses the airbag, the inflator, and the airbag cover. Then, when a kinetic energy higher than a predetermined level is applied by the knees to the airbag, the plate-shaped portion is deformed to absorb the kinetic energy of the knees.

With the knee protecting airbag device being thus constructed, the plate-shaped portion of the holding member is deformed to absorb the excess kinetic energy of the knees, if the airbag, after completely expanding, is flattened and the kinetic energy still has not been completely absorbed.

The plate-shaped portion of the holding member is extended from the periphery of the opening of the case such that it is arranged in front of the area occupied by the airbag when the airbag has completed its expansion. Therefore, the plate-shaped portion of the holding member can absorb the kinetic energy of the knees properly through the airbag when the airbag has completed its expansion.

Here, the plate-shaped portion of the holding member is extended from the periphery of the opening of the case such that it covers the area in front of the airbag when the airbag has completed its expansion. In this way, the plate-shaped portion is arranged in a large flat area in the vertical and transverse directions of the vehicle. Even with a small deformation stroke at the time of absorbing the kinetic energy, therefore, the kinetic energy of the knees can be sufficiently absorbed by the plate-shaped portion of the holding member.

The holding member is fixed to the vehicle body at mounting portions near the periphery of the plate-shaped portion so that the mounting portions will not obstruct the deformation of the plate-shaped portion.

The plate-shaped portion of the holding member does not extend in the longitudinal direction of the vehicle, as does the mounting bracket of the prior art. Specifically, the plate-shaped portion of the holding member is extended from the periphery of the opening of the case and arranged flatly in the vertical and transverse directions of the vehicle such that it is arranged in front of the area occupied by the airbag when the airbag has completed its expansion. Therefore, the airbag module can be easily arranged even if less space is available in front of the airbag module.

The mounting portion of the holding member need not be extended longitudinally from the periphery of the plate-shaped portion. If the airbag module can be mounted and fixed at a predetermined portion of the vehicle body, it can extend transversely from the periphery of the plate-shaped portion. In this case, the size of the airbag device in the longitudinal direction of the vehicle can be made shorter and more compact to improve the degree of freedom in finding a location for the airbag device.

In the knee protecting airbag device thus constructed, therefore, it is possible to absorb the kinetic energy of the knees, if such kinetic energy is not fully absorbed by the airbag, and to improve the degree of freedom in placing the airbag device.

In the knee protecting airbag device thus constructed, moreover, it is preferred that the plate-shaped portion of the holding member has ribs capable of adjusting the quantity of the kinetic energy of the knees that can be absorbed.

In the knee protecting airbag device thus constructed, it is preferred that the plate-shaped portion of the holding member has a flange portion arranged on its periphery for adjusting the quantity of the kinetic energy of the knees that can be absorbed.

As in the construction thus far described, ribs, which are for adjusting the absorption quantity of kinetic energy are arranged on the plate-shaped portion of the holding member, or a flange portion for adjusting the absorption quantity of kinetic energy is arranged on the periphery of the plate-shaped portion. Thus, the absorption quantity of kinetic energy can be easily adjusted to correspond to the deformation stroke or the like of the plate-shaped portion by setting the number, shape and arranged position of the rib and flange portions.

The fourth object of the invention can be achieved by a knee protecting airbag device having the following construction.

A knee protecting airbag device is arranged in front of the knees of a seated passenger. The knee protecting airbag device comprises a knee protecting folded airbag, an inflator for feeding inflating gas to the airbag, a case, which opens toward the rear of the vehicle for housing the airbag and the inflator, and an airbag cover for covering the case on its rear-facing side. The airbag cover is formed of an integral molding, including a door portion for covering the opening of the case and a general portion arranged around the door portion. The door portion includes a hinge portion, which is arranged at the lower edge, for providing a pivot when the door portion is opened, and a thinned breakaway portion, which is arranged at the periphery, other than the hinge portion. The door portion can be opened downward when the airbag expands. Extension promoting means for quickly opening the door portion to promote the extension and expansion of the airbag is arranged near the door portion.

With the knee protecting airbag device thus constructed, the door portion can be quickly opened by the extension promoting means at the beginning of the expansion of the airbag. As a result, the airbag can be quickly protruded to extend and expand from the opening of the quickly opened door portion. In the knee protecting airbag device thus constructed, the door portion is opened downward, with the opening being widest at the upper edge. In other words, the airbag can easily protrude upward from the opening portion of the upper end side of the door portion of the largest opening side. By the opening action of the door portion, therefore, the airbag can be guided upward. As a result, the airbag can extend and expand quickly upward.

In the knee protecting airbag device thus constructed, therefore, the airbag can be quickly extended to protect the knees of the passenger properly.

In the knee protecting airbag device thus constructed, the airbag cover is formed by an integral molding including the door portion, which has the breakaway periphery, and the general portion, which is around the door portion. Therefore, the door portion is not disharmonious with the surrounding general portion but provides an excellent design.

In the knee protecting airbag device thus constructed, it is preferred that the door portion is arranged at an inclination so that its upper edge is more toward the rear and its hinge portion is more toward the front.

In the knee protecting airbag device thus constructed, even if the upper edge of the door portion, the side that opens first, is arranged toward the rear of the vehicle and removed from the housed airbag and inflator, the extension promoting means is arranged near the door portion, so that the door portion can be quickly opened. Therefore, the airbag can quickly extend and expand. With the knee protecting airbag device being thus constructed, the lower side of the door portion in the airbag cover can be arranged toward the front so that the space in front of the knee, or the space near the lower portion of the passenger, can be kept wide. Therefore, the airbag device can be mounted on the vehicle without interfering with the toes or the like of the passenger.

In the knee protecting airbag device thus constructed, the case preferably includes a peripheral wall portion and a bottom wall portion. The airbag cover has mounting wall portions for mounting and fixing the airbag cover on the case peripheral wall portion. The mounting wall portions, which serve as the extension promoting means, are arranged near an upper end breakaway portion, which is arranged on the upper end of the door portion.

With the knee protecting airbag device thus constructed, the portion near the upper end breakaway portion is firmly connected to the case by the mounting wall portions, which serve as the extension promoting means. In other words, with the protrusion of the airbag, the portion near the upper end breakaway portion is not moved away from the case by the pushing force of the airbag. By the airbag, therefore, the upper end breakaway portion on the upper edge, where the opening of the door portion starts, can be smoothly broken so that the remaining breakaway portions can also be smoothly broken. As a result, the door portion can be quickly opened so that the airbag can quickly protrude to extend and expand from the opening of the opened door portion.

In the knee protecting airbag -device thus constructed, it is preferred that a guide wall portion for covering the lower area of the opening is arranged on the case near the door portion. The guide wall portion can serve as the extension promoting means to guide the expanding airbag toward the upper side of the door portion.

In case the knee protecting airbag device is thus constructed, the airbag, when fed with the inflating gas, is guided toward the upper side of the door portion by the guide wall portion, which serves as extension promoting means. At the beginning of the extension of the airbag, therefore, the breakaway portion, which is arranged on the upper edge of the door portion, can be broken to smoothly open the downward-opening door portion from the upper edge. As a result, the door portion can be quickly opened so that the airbag can quickly protrude from the opening formed by the opened door portion.

In the knee protecting airbag device thus constructed, it is possible that the door portion has ribs formed to protrude forward. The face of each forward-facing rib is a face to receive a pushing force and serves as the extension promoting means for opening the door portion when pushed by the airbag.

If the knee protecting airbag device is thus constructed, at the beginning of the expansion of the airbag, the protruding airbag pushes the front face of the rib backward to open the door portion. Usually, in the case of a knee protecting airbag device constructed with no rib on the door portion, the protruding airbag pushes the front face of the door portion to open the door portion. If the knee protecting airbag device is constructed with ribs, more specifically, the rib shortens the distance between the airbag and the door portion substantially. As compared with an airbag device having no rib, therefore, the door portion can be opened more quickly. As a result, the airbag can quickly protrude to extend and expand from the opening of the door portion, which is opened quickly.

In the knee protecting airbag device thus constructed, it is possible that the case includes a peripheral wall portion and a bottom wall portion. A left side wall portion and a right side wall portion, which are arranged transversely of the vehicle in the case peripheral wall portion, are inclined. The left side wall portion and the right side wall portion act as extension promoting means.

If the knee protecting airbag device is thus constructed, the inflating gas discharged from the inflator is guided upward in the airbag by the left side wall portion and the right side wall portion. In other words, the expanding airbag can be guided toward the upper side of the door portion. By the protruding airbag, therefore, the downward door portion can be smoothly opened from the upper end side. As a result, the airbag can be quickly protruded to extend and expand from the opening of the door portion.

Moreover, the fifth object of the invention can be achieved by a knee protecting airbag device having the following construction.

A knee protecting airbag device comprises a folded airbag, an inflator for feeding an inflating gas to the airbag, and a case housing the airbag and the inflator, and the device is arranged below a steering column. The airbag, when fed with the inflating gas, extends and expands while protruding rearward from the opening of the case, to protect the knees of the passenger. The case is opened toward the rear of the vehicle and includes a peripheral wall portion and a bottom wall portion, which closes the front side of the peripheral wall portion. The inflator is a cylinder-type inflator and is housed in the case such that its axis is generally parallel to the axis of the peripheral wall portion.

In the knee protecting airbag device thus constructed, the cylinder-type inflator is arranged such that its axis is generally parallel to the axis of the case peripheral wall portion. In addition, the axial dimension of the cylinder-type inflator is greater than the external diameter. If the inflator is arranged in the case such that its axis is generally parallel to the axis of the peripheral wall portion, therefore, the dimension, or width, perpendicular to the axis of the case may be set to the sum of the external diameter of the inflator and the size of the space that is required to house the folded airbag. As a result, the dimension, or width, perpendicular to the axis of the case can be made smaller than that of a case in which a cylinder-type inflator is arranged with its axis generally perpendicular to the axis of the case.

In the knee protecting airbag device thus constructed, therefore, the width of the case, which is perpendicular to its axis, can be reduced and thus the airbag device can be placed in a narrow housing space.

Moreover, it is possible that the inflator is a disc-type inflator and is mounted and fixed on the peripheral wall portion of the case such that its axis is generally perpendicular to the axis of the peripheral wall portion.

In the knee protecting airbag device thus constructed, the disc type inflator is mounted and fixed on the peripheral wall portion of the case such that its axis is generally perpendicular to the axis of the case peripheral wall portion. The external diameter of the disc-type inflator is larger than its axial dimension. If the inflator is mounted and fixed on the peripheral wall portion of the case so that its axis is generally perpendicular to the axis of the peripheral wall portion of the case, the distance from the wall portion on which the inflator is mounted to the wall portion confronting the inflator may be set to be the sum of the axial length of the inflator and the size of the space required to house the folded airbag. If the inflator is fixed on an upper or lower wall, for example, the vertical dimension, perpendicular to the axis of the case, can be reduced. If the inflator is fixed on a left or right wall, on the other hand, the transverse dimension, perpendicular to the axis of the case, can be reduced. As a result, the dimensions in the directions perpendicular to the axis of the case can be made smaller than those of a case in which the inflator is mounted and fixed on the bottom wall portion.

In the knee protecting airbag device thus constructed, therefore, the size of the case can be reduced in a direction perpendicular to the axis, and the device can be placed in a narrow housing space.

In the knee protecting airbag device thus constructed, the case is preferably constructed such that the upper end of the open face is positioned closer to the rear of the vehicle than the lower end of the open face. The inflator is mounted and fixed on the upper wall portion of the peripheral wall portion.

In the knee protecting airbag device thus constructed, the inflator is mounted and fixed on the upper wall in the case, and the upper edge of the opening face is positioned close to the vehicle rear. Moreover, the length of the upper wall portion of the case can be increased in the longitudinal direction to the extent that the rear edge is positioned rearward relative to that of the remaining peripheral wall portion of the case. Therefore, the depth of the case can be made smaller than that of a case in which the inflator is mounted and fixed on the remaining peripheral wall portion.

In addition, the inflator can be located outside of the case.

In the knee protecting airbag device thus constructed, the inflator is not located in the case, and only the folded airbag and the gas feed passage for feeding the inflating gas to the airbag are arranged in the case. Such a gas feed passage has a smaller volume than that of the inflator. Therefore, a dimension in a direction perpendicular to the axis of the case can be made smaller than that of the airbag device in which the inflator is located in the case.

Therefore, the knee protecting airbag device thus constructed can be placed in a narrow housing space.

BRIEF DESCRIPTION OF THE DRAWINGS

FIGS. 9A and 9B are schematic lateral section views showing the state of the knee protecting airbag device of the first embodiment during extending and expanding of the airbag, where the plane of the section extends in the longitudinal direction of the vehicle;

DESCRIPTION OF THE PREFERRED EMBODIMENTS

Figure 1:
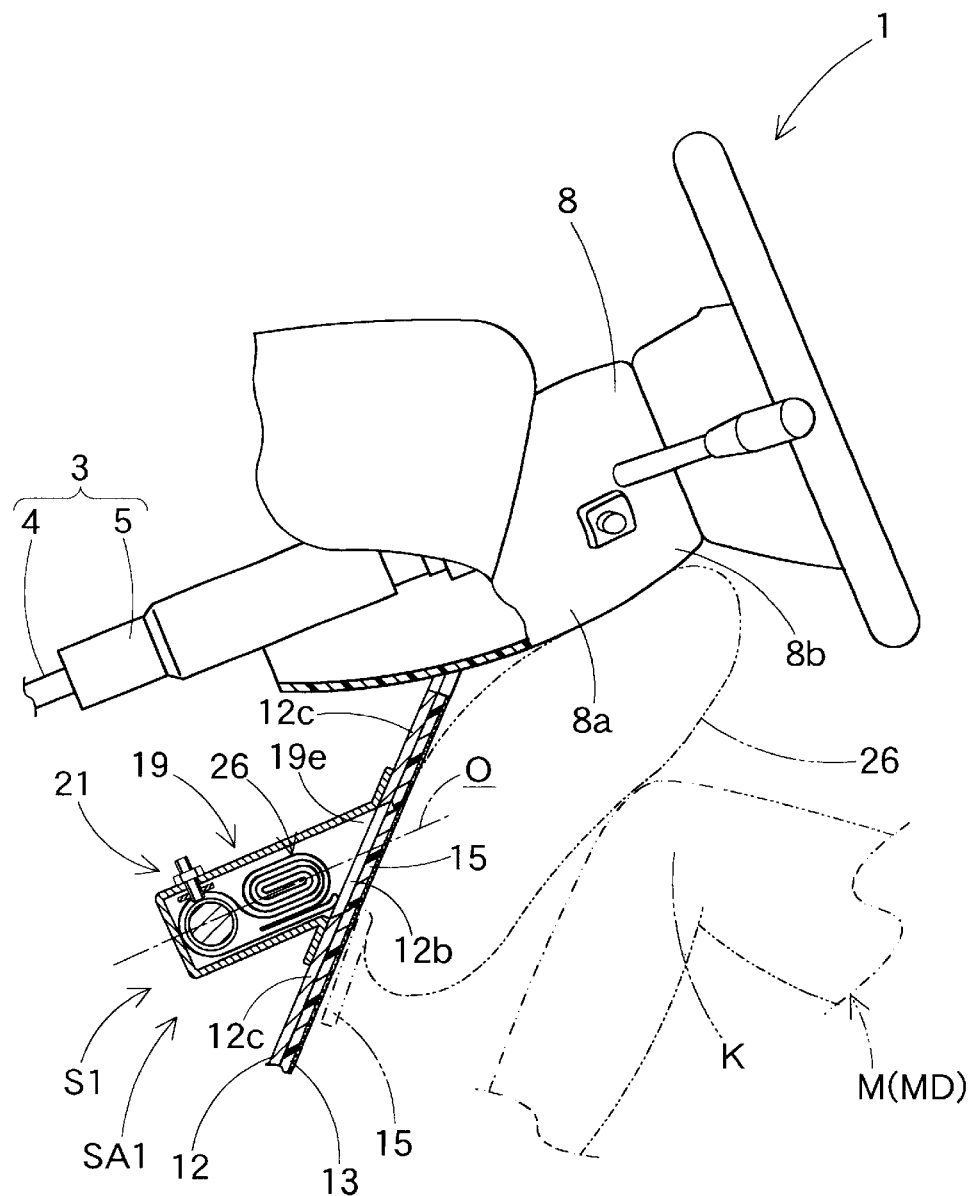
FIG. 1 is a schematic vertical section view showing the operation of a knee protecting airbag device according to a first embodiment of the present invention, where the plane of the section extends in the longitudinal direction of the vehicle.

The invention will be described below by way of embodiments shown in the drawings. In addition, the invention is not limited to the illustrated embodiments. All modifications within the requirements of the claims and equivalents with respect to the requirements should be included in the scope of the claims.

Embodiments of the present invention will be described with reference to the accompanying drawings.

First of all, the following are the described knee protecting airbag devices S1 to S3 that can achieve the first object of the invention.

Figure 2:
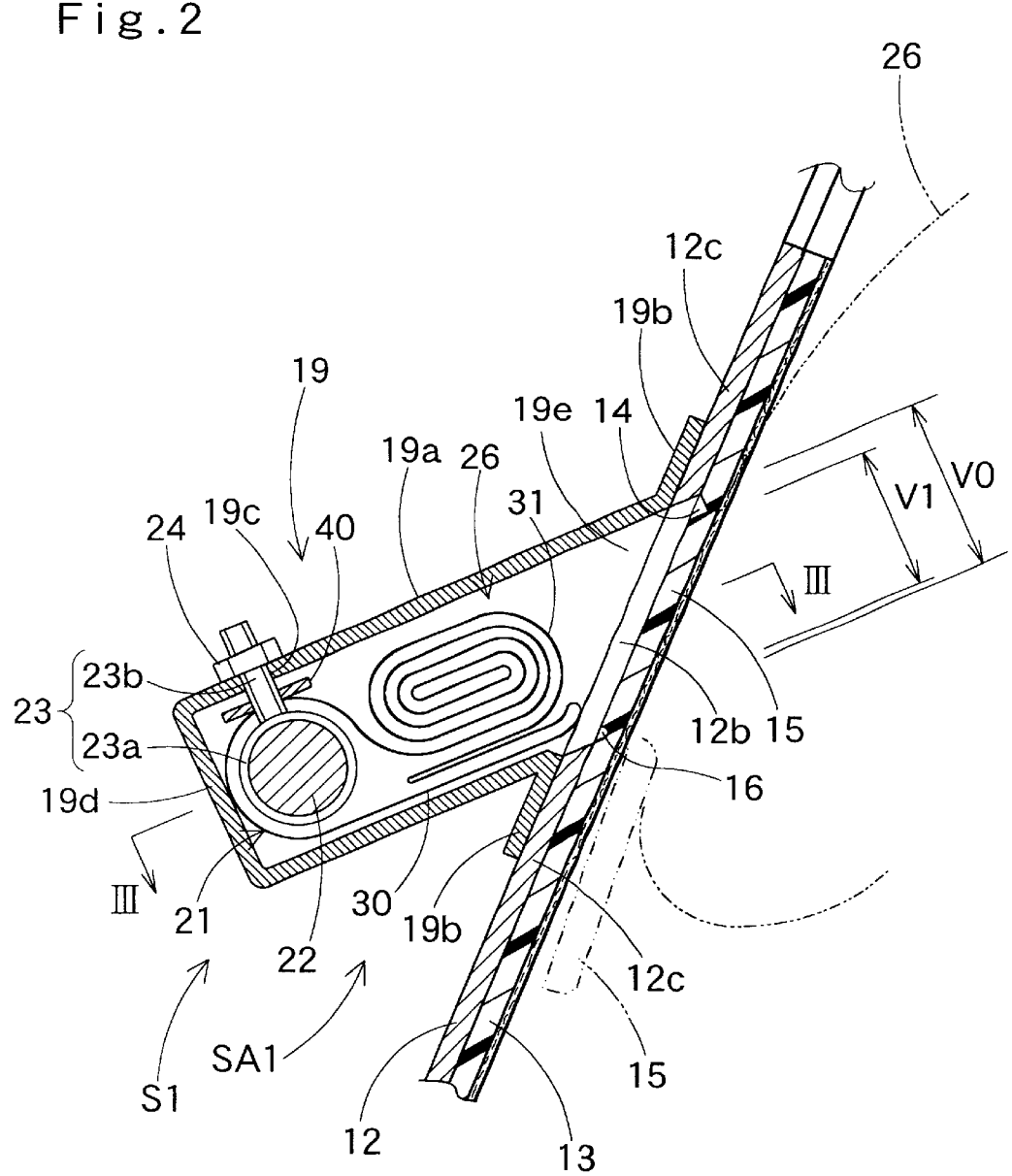
FIG. 2 is a schematic vertical section view of the knee protecting airbag device of the first embodiment, where the plane of the section extends in the longitudinal direction of the vehicle.
Figure 3:
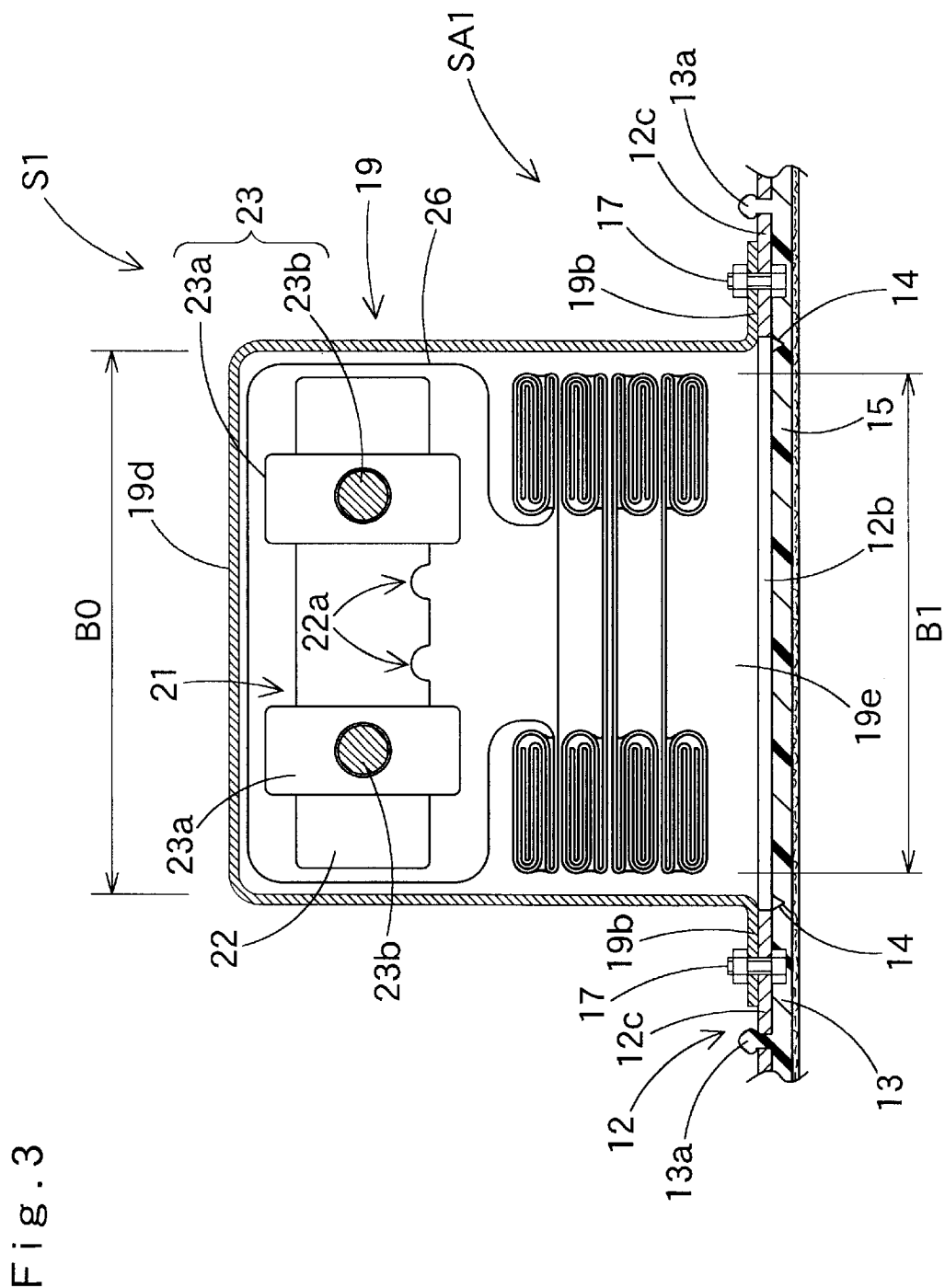
FIG. 3 is a section view taken along the plane III—III of FIG. 2.

A knee protecting airbag device S1 according to a first embodiment of the invention is shown in FIGS. 1 to 3.

The vertical, transverse and longitudinal directions will be termed to correspond to the vertical, transverse and longitudinal directions of a vehicle when the knee protecting airbag device is mounted on the vehicle.

The passenger M is a driver MD, or a person MP sitting in the passenger's seat. That is, the term passenger M includes the driver MD.

Figure 4:
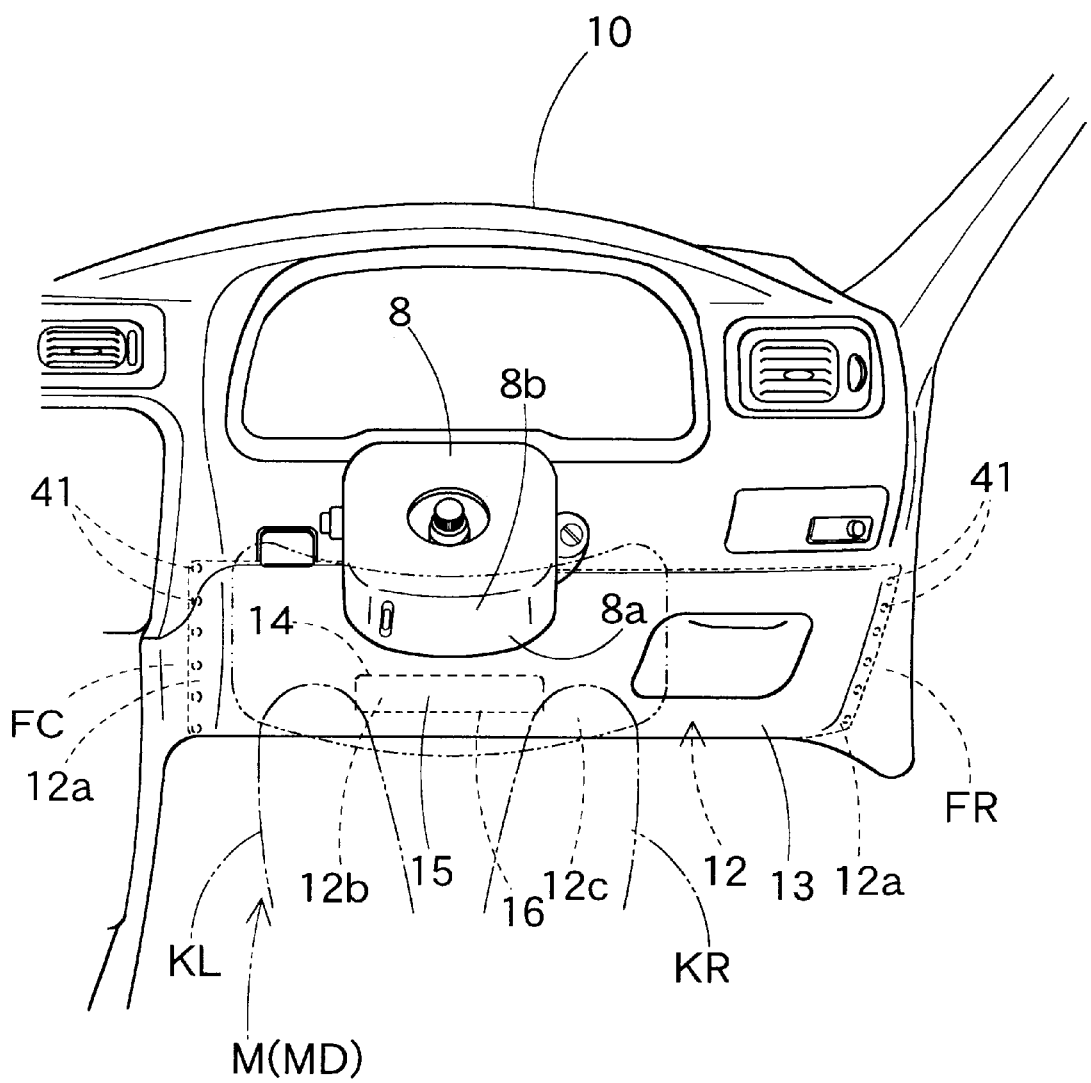
FIG. 4 is a schematic front elevation view showing the operation of the knee protecting airbag device of the first embodiment as viewed from the rear side of the vehicle.

The airbag device S1 is arranged below a steering column 3 in front of a driver MD, which is one of the passengers M, to protect the knees K of the driver MD. The airbag device S1 comprises a folded airbag 26, an inflator 21, a case 19, an airbag cover 13 and a holding member 12. The inflator 21 feeds an inflating gas to the airbag 26. The case 19 houses the airbag 26 and the inflator 21. The airbag cover 13 is constructed to cover the airbag 26 when the airbag 26 is folded. The holding member 12 holds the case 19. In the airbag device S1 of this embodiment, the case 19, having the airbag 26 housed therein, is held by the holding member 12. At the left and right ends of the holding member 12, there are formed mounting portions 12a and 12a, which are mounted and fixed on rigid frame portions FC and FR, as shown in FIG. 4. The folded airbag 26 is arranged in front of the knees K (KL and KR) of the seated driver MD below the steering column 3.

In the case of the illustrated embodiment, the frame portion FR is the front body pillar of the vehicle. On the other hand, the frame portion FC is the center brace in the body of the vehicle.

The steering column 3 comprises, as shown in FIG. 1, a main shaft 4, which is connected to a steering wheel 1, and a column tube 5, which encloses the main shaft 4. Between the main shaft 4 and the column tube 5, there are arranged the unillustrated tilt mechanism, which is capable of adjusting the angle of the ring face of the steering wheel, and the unillustrated telescopic mechanism, which is capable of moving and stopping the steering wheel 1 in the axial direction of the shaft.

A column cover 8 is formed of a synthetic resin into a generally square tubular shape or the like. The column cover 8 is constructed to cover the steering column 3 below the steering wheel 1. The column cover 8 is arranged in the axial direction of the steering column 3. Specifically, the column cover 8 is inclined so that its front side is downward and its rear side is upward. The column cover 8 has a lower face 8a formed into a generally rectangular shape and a profile line curving upward.

The holding member 12 is formed of a sheet metal into a plate-like shape. The holding member 12 is arranged on the lower side of an instrument panel (hereafter called the "dashboard") 10, as shown in FIGS. 1 to 4. This holding member 12 is arranged at the lower side of the column cover 8. The holding member 12 is inclined such that its upper end is positioned toward the rear of the vehicle and its lower end is positioned toward the front of the vehicle. On the left and right ends of the holding member 12, there are formed the mounting portions 12a, which are individually provided with unillustrated mounting holes for receiving bolts 41. The holding member 12 is connected and fixed by fastening its mounting portions 12a and 12a on the left and right vehicle frame portions FC and FR at a plurality of positions by the bolts 41. The holding member 12 is fixed to the front of the case 19 by bolts, nuts, rivets and welding. In the illustrated embodiment, the holding member 12 is fixed to the case 19 (see FIG. 3) by fastening nuts on bolts 17, which protrude forward from the rear face of the holding member 12 to the forward face.

In the portion of the holding member 12 for mounting the case 19, there is formed a communication hole 12b for communicating with the later-described opening 19e of the case 19. This communication hole 12b allows the airbag 26 housed in the case 19 to protrude into the vehicle compartment toward the rear of the vehicle. The communication hole 12b has a generally rectangular shape to match the opening 19e of the case 19. The periphery of the communication hole 12b has a flat shape. The periphery of the communication hole 12b provides a support face 12c, which is capable of supporting the front face of the extending and expanding airbag 26.

In the case of the illustrated embodiment, as shown in FIGS. 1 to 4, the airbag cover 13 is mounted and fixed on the rear face of the holding member 12 by means such as bolts, nuts or rivets. The airbag cover 13 performs a role as an interior member to cover the folded airbag 26 and the face of the holding member 12 on the passenger compartment side. In the case of the illustrated embodiment, the airbag cover 13 is fixed on the holding member 12 (as shown in FIG. 3) by using clips 13a and an adhesive. In the airbag cover 13, there is formed a door portion 15 having a generally rectangular plate shape. The door portion 15 is arranged at the position of the communication hole 12b in the holding member 12. The door portion 15 opens into the passenger compartment when pushed by the extending and expanding airbag 26. Around the door portion 15 is a thin breakaway portion 14 having an inverted U-shape as viewed from the passenger compartment. The door portion 15 has a hinge portion, which is an integral hinge, on the lower edge. When the airbag 26 expands, the door portion 15 is opened at the hinge portion 16 toward the lower side of the passenger compartment while being pressed by the airbag 26 to break the breakaway portion 14.

The case 19 is formed of sheet metal into a generally rectangular box shape. As shown in FIGS. 1 to 3, the case 19 is arranged as a housing portion for housing the folded airbag 26. In the case of the illustrated embodiment, the case 19 houses the airbag 26 together with the inflator 21. The case 19 is provided with a peripheral wall portion 19a of a generally rectangular tubular shape and a bottom wall portion 19d. An opening 19e is formed on the rear side of the case 19. The bottom wall portion 19d is formed into a generally rectangular shape to close the front side of the case 19. On the periphery of the opening 19e in the peripheral wall portion 19a, there is formed a flange portion 19b, which is connected to the holding member 12. In the upper face of the peripheral wall portion 19a at the front of the case, there are a plurality of (e.g., two in the illustrated embodiment) mounting holes 19c for mounting and fixing the inflator 21 and the airbag 26. The axis O of the peripheral wall portion 19a of the case 19 extends along the lower face 8a of the column cover 8 (or in the axial direction of the steering column 3), as shown in FIG. 1.

As shown in FIGS. 1 to 3, 5 and 6, the inflator 21 comprises a cylindrical body 22 and two brackets 23. The body 22 can discharge an inflating gas G in response to an electric signal. The body 22 is provided with gas discharge ports 22a for discharging the inflating gas G. In the case of the illustrated embodiment, the body 22 is activated simultaneously, with an unillustrated airbag device, which is mounted in the steering wheel 1, in response to the electric signal coming from a control device for activating the airbag device. Each bracket 23 comprises a retaining ring 23a made of sheet metal, and a bolt 23b protruding from the retaining ring 23a. The retaining ring 23a is mounted on the body 22 by fitting it elastically on the body 22 and by constricting it. The inflator 21 is mounted and fixed together with the airbag 26 in the case 19, as follows. First, the inflator 21 is arranged in the airbag 26, and the individual bolts 23b are protruded from the later-described mounting holes 29 of the airbag 26. The bolts 23b are protruded from the individual mounting holes 19c of the case 19 and are fastened by nuts 24. An unillustrated lead wire is connected with the body 22.

The case 19 may also be integrated with the holding member 12 by a pressing or welding method using a metallic material such as sheet metal or by a die-casting method using a light metal alloy material of aluminum or the like. In this modification, the flange portion 19b of the case 19 is made large, and the mounting portions 12a are formed at the large flange portion 19b.

Figure 5:
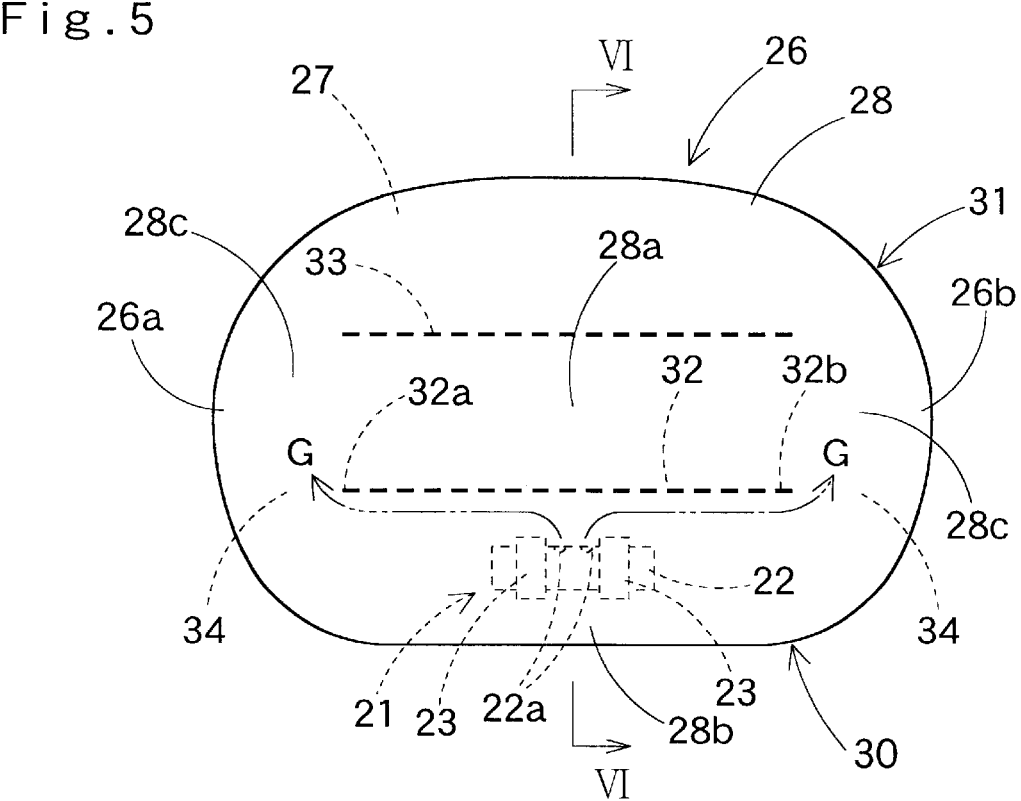
FIG. 5 is a front elevation view of an airbag to be used in the first embodiment.
Figure 6:
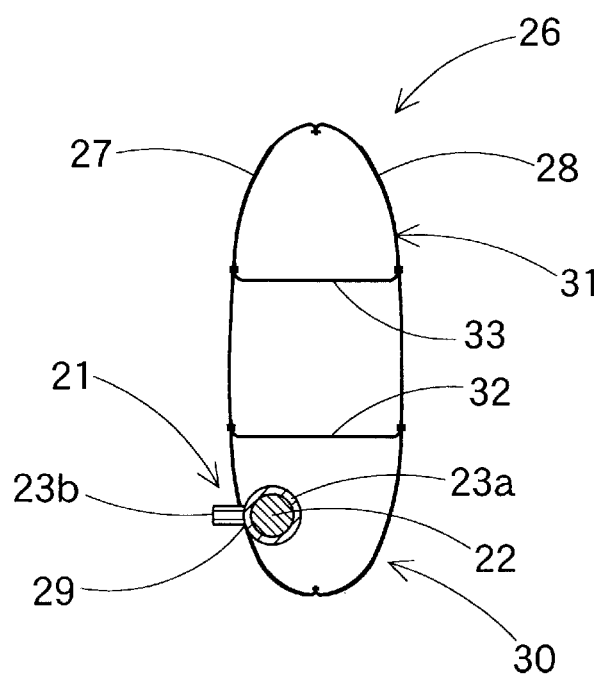
FIG. 6 is a schematic section view taken along plane VI—VI of FIG. 5.

The airbag 26 is formed of a woven fabric having flexibility such as polyester or polyamide. As shown in FIGS. 4 to 6, the airbag 26 is formed to have a generally rectangular plate shape upon completion of the extension and expansion. In the case of the illustrated embodiment, the airbag 26 is constructed of two woven fabrics: a wall portion 27 facing the column cover (the vehicle side wall portion) in a generally rectangular shape; and a wall portion 28 facing the driver MD (the passenger wall portion) in a generally rectangular shape. The airbag 26 is formed by sewing the wall portions 27 and 28 at their periphery. In the lower side of the vehicle side wall portion 27, there are the mounting holes 29 for receiving the individual bolts 23b of the inflator 21.

On the other hand, as shown in FIG. 5, the passenger side wall portion 28 includes a lower central portion 28b to the rear of the inflator 21. Moreover, the passenger side wall portion 28 comprises a central portion 28a, and left and right joining portions 28c, which merge into the central portion 28a. The central portion 28a is at the transversely central position of the airbag 26. The joining portions 28c are positioned on the central side of two left and right edges 26a and 26b in the airbag 26, when the airbag 26 is flat.

In the illustrated embodiment, the airbag 26 is provided with a lower expansion portion 30, which is on the side housing the inflator 21, and an upper expansion portion 31, which extends on the upper side of the lower expansion portion 30. The lower expansion portion 30 and upper expansion portion 31 are vertically divided at the position of the later-described tether 32. The lower expansion portion 30 is on the upstream side of the inflating gas G. The lower expansion portion 30 protrudes during extending and expanding of the airbag 26 rearward from the communication hole 12b formed in the holding member 12. The lower expansion portion 30 covers the rear side of the communication hole 12b in the holding member 12. Also, the lower expansion portion 30 covers the lower side of the rear-facing side of the support face 12c arranged on the periphery of the communication hole 12b. The lower expansion portion 30 can cover the front sides of the knees K (KL and KR) of the driver MD, too. The upper expansion portion 31 communicates with the lower expansion portion 30 downstream of the inflating gas G. The upper expansion portion 31 is a portion protruding upward from the lower expansion portion 30 along the lower face 8a of the column cover 8. The upper expansion portion 31 covers at least from the upper side of the rear-facing side of the support face 12c to the vicinity of the upper end 8b of the lower face 8a of the column cover 8. In the case of the illustrated embodiment, the lower expansion portion 30, during extending and expanding, has a larger transverse width than that of the communication hole 12b so that it can sufficiently protect the knees KL and KR of the driver MD.

In the airbag 26, as shown in FIGS. 5 and 6, there are the tethers 32 and 33 for connecting the vehicle side wall portion 27 and the passenger side wall portion 28. The tethers 32 and 33 set the thicknesses of the lower expansion portion 30 and the upper expansion portion 31 at the extending and expanding time. Specifically, the tethers 32 and 33 are thickness regulating means for inserting the airbag 26 smoothly into the clearance between the knees K of the driver MD and the column cover lower face 8a. The tethers 32 and 33 are made of a flexible material like the walls 27 and 28 of the airbag 26. Moreover, the tethers 32 and 33 are sewn to the walls 27 and 28. In the case of the illustrated embodiment, the tethers 32 and 33 are arranged generally in the transverse direction above the inflator 21. Further, the individual tethers 32 and 33 are arranged to have their left and right ends separated from the left and right edges 26a and 26b of the airbag 26, respectively. The tether 32 serves as the thickness regulating means and performs a role as a gas flow guide member, as will be described in the following. The tether 32 guides the inflating gas G discharged from the inflator 21 to the upper expansion portion 31 while also directing it toward the left and right edges 26a and 26b of the airbag 26.

In the airbag 26, more specifically, the gas from inflator 21 is blocked from above by the tether 32. Gas communication holes 34 are formed between the left end 32a of the tether 32 and the airbag left edge 26a and between the right end 32b of the tether 32 and the airbag right edge 26b. When the inflating gas G flows in the airbag upper expansion portion 31, which is downstream, the inflating gas G discharged from the inflator 21 flows in the airbag lower expansion portion 30, which is upstream, upward to the gas communication holes 34 while being directed leftward and rightward along the tether 32.

In the airbag 26 of the illustrated embodiment, at the initial stage of the extension and expansion and before the upper expansion portion 31 completes its extension and expansion, the lower expansion portion 30 is folded to cover the left and right periphery of the communication hole 12b. In the case of the illustrated embodiment, the airbag 26 is folded through the following vertical folding step and transverse folding step.

At the vertical folding steps as shown in FIGS. 7A to 7D, the passenger side wall portion 28 is extended flat over the vehicle side wall portion 27, the two left and right edges 26a and 26b are vertically folded closer to the central portion 28a to fold the airbag 26 to have a transverse width B1 and to house the airbag 26 in the case 19. The vertical folding step of the airbag 26 is characterized in that the folding portions 37 and 37 on the left and right edge sides of the airbag 26 are respectively arranged on the sides of the vehicle side wall portion 27 at the position of the left and right joining portions 28c of the passenger side wall portion 28. The folded portions 37 and 37 on the left and right edge sides of the airbag 26 at the vertical folding step can be prepared by folding them into bellows or by rolling the left and right edges 26a and 26b on the side of the vehicle side wall portion 27.

The transverse folding step is done after the vertical folding step. At the transverse folding step, as shown in FIGS. 7D and 7E, the upper edge 26c of the airbag 26, after the vertical folding step, is transversely folded closer to the side of the position of the inflator 21 to form a folded portion 38 having a vertical width V1 (see FIG. 2) such that the airbag 26 can be housed in the case 19.

Mounting the airbag device S1 on the vehicle will now be described. First, the airbag 26 is folded while housing the inflator 21. The individual bolts 23b of the inflator 21 are protruded in advance from the mounting holes 29. The unillustrated lead wire extending from the body 22 is led out from an unillustrated hole in the airbag 26.

In the case of the illustrated embodiment, the airbag 26 is folded in two steps, the vertical folding step and the transverse folding step above described.

Figure 7A:
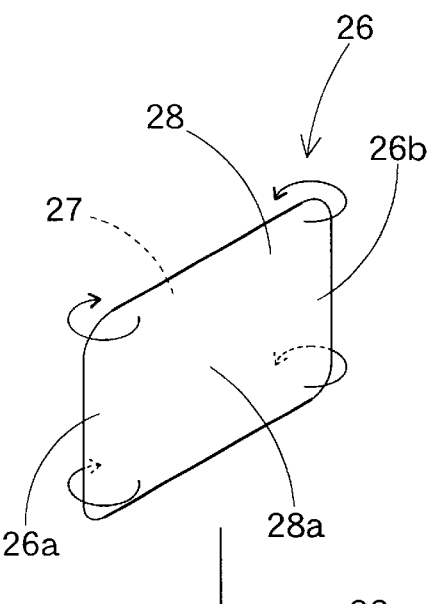
FIGS. 7A to 7E are schematic views showing folding of the airbag used in the first embodiment.
Figure 7B:
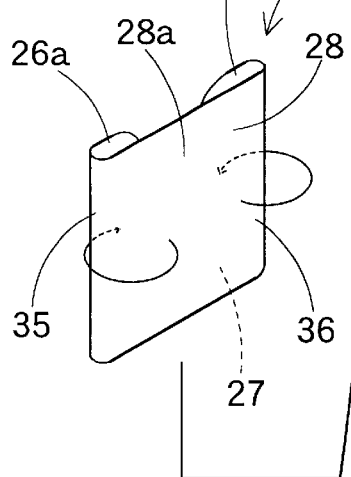
Figure 7C:
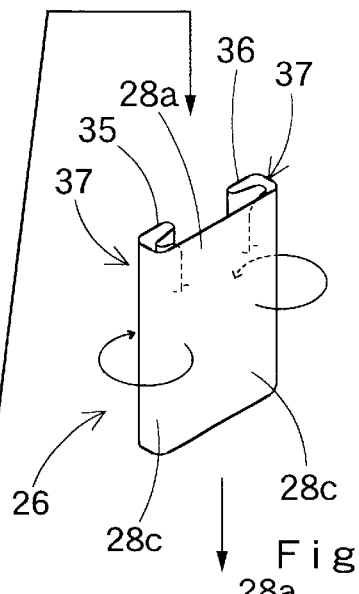
Figure 7D:
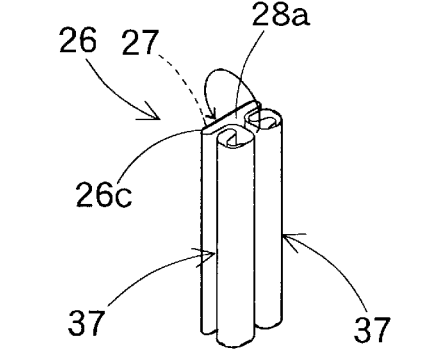
Figure 7E:
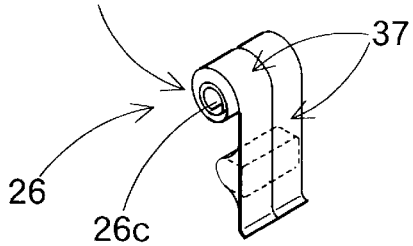

At the vertical folding step, the passenger side wall portion 28 is extended flat against the vehicle side wall portion 27, as shown in FIG. 7A. Next, as shown in FIG. 7B, the two left and right edges 26a and 26b of the airbag 26 are each folded toward the side of the vehicle side wall portion 27 to come closer to the central portion 28a of the passenger side wall portion 28. As shown in FIG. 7c, the two left and right folded edges 35 and 36 of the airbag 26 are folded close to the central portion 28a of the passenger side wall portion 28. At this time, the two edges 35 and 36 are each folded toward the side of the vehicle side wall portion 27 to form the folded portions 37. Next, as shown in FIG. 7D, the folded portions 37 are folded to complete the vertical folding step such that they may be placed on the outer surface (i.e., on the rear side and on the passenger side) at the central portion 28a of the passenger side wall portion 28. At this time, the folded portions 37 are each arranged on the side of the vehicle side wall portion 27 in the left and right joining positions 28c of the passenger side wall portion 28.

At the transverse folding step, after the vertical folding step, as shown in FIGS. 7D and 7E, the vertically folded airbag 26 is folded by rolling it from the upper edge 26c toward the vehicle side wall portion 27, to form the folded portion 38. This folded portion 38 is folded to have the vertical housing width V0 (see FIG. 2) of the case 19. Thus, the transverse folding step is completed to complete the folding of the airbag 26.

After the airbag 26 is folded, it is wrapped with an unillustrated breakable wrapping film so that the airbag will not become loose, and the individual bolts 23b are protruded from the wrapping film. The individual bolts 23b are assembled with spring nuts 40 having a thin sheet shape. Then, the airbag 26 and the inflator 21 are housed in the case 19, and the individual bolts 23b are protruded from the mounting holes 19c of the case 19. When the nuts 24 are threaded on the individual protruded bolts 23b, the inflator 21 and the airbag 26 can be housed and fixed in the case 19. The unillustrated lead wire extending from the inflator body 22 is led from the wrapping film and from the unillustrated hole of the case 19. Then, the flange portion 19b of the case 19 is fixed on the holding member 12 by the bolts 17 to form an airbag assembly SA1.

After this, the mounting portions 12a formed on the left and right ends of the holding member 12 in the formed airbag assembly Sa1 are each fixed on the vehicle frame portions FC and FR, which are on the left and right sides, by the bolts 41. The airbag device S1 can be mounted on the vehicle, as shown in FIGS. 1 to 4, by connecting the unillustrated lead wire with the control circuit and by mounting the dashboard 10 and other items on the vehicle.

After the airbag device S1 is mounted on the vehicle, the inflating gas G is discharged from the gas discharge ports 22a if the specified electric signal is inputted to the inflator body 22. Then, the airbag 26 is expand ed by the inflating gas G to break the unillustrated wrapping film and protrudes backward while pushing and opening the door portion 15 of the airbag cover 13. After this, the airbag 26 extends and expands upward along the column cover lower face 8a while being transversely and vertically unfolded.

Figure 8A:
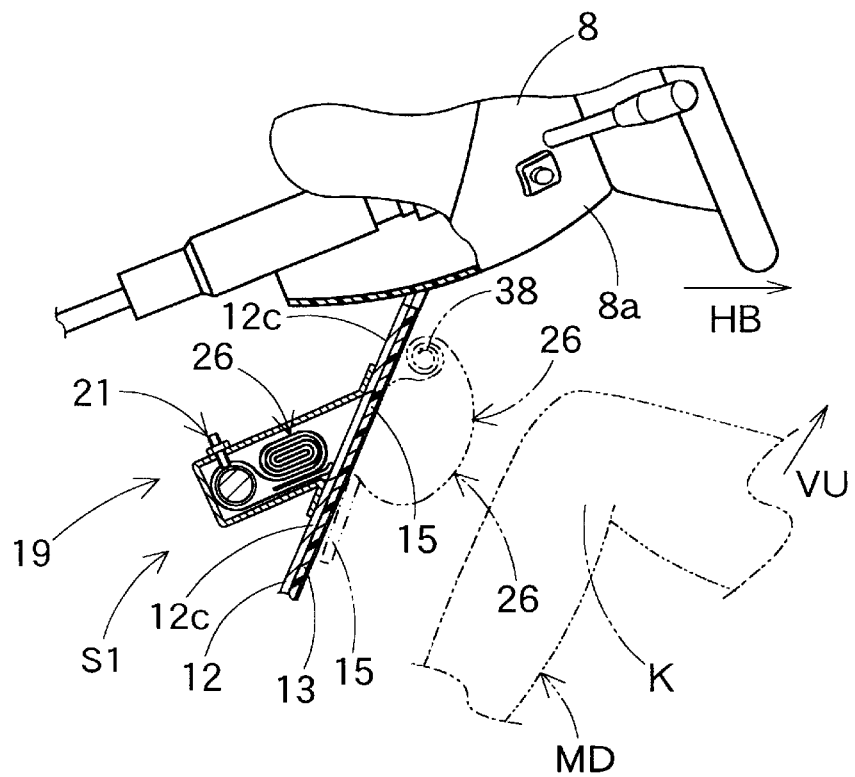
FIGS. 8A and 8B are schematic vertical section views illustrating the state of the knee protecting airbag device of the first embodiment during extending and expanding of the airbag, where the plane of the section extends in the longitudinal direction of the vehicle.
Figure 8B:
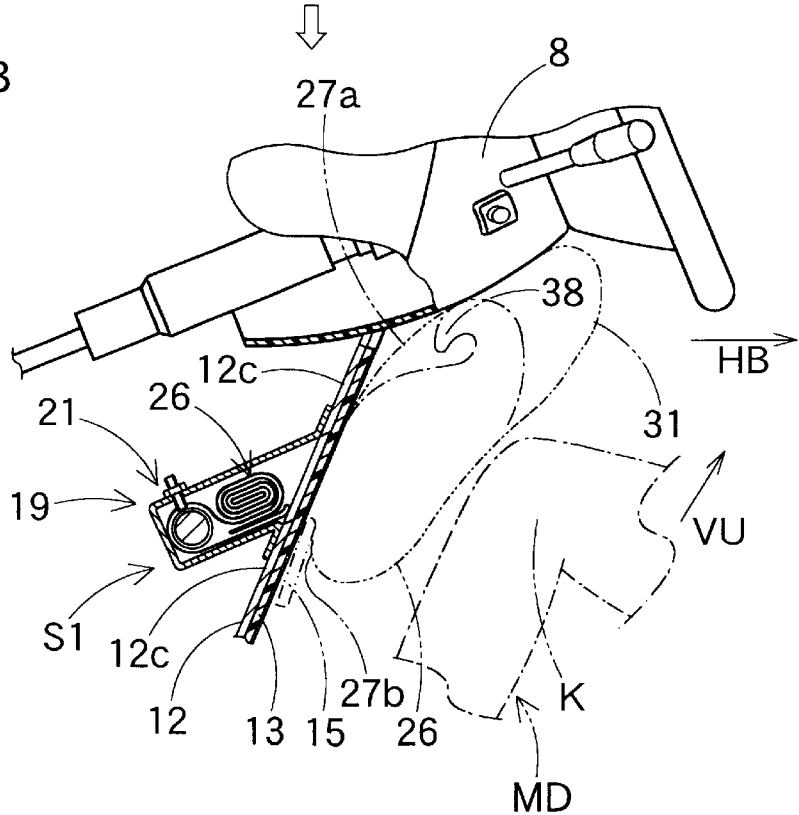
Figure 10A:
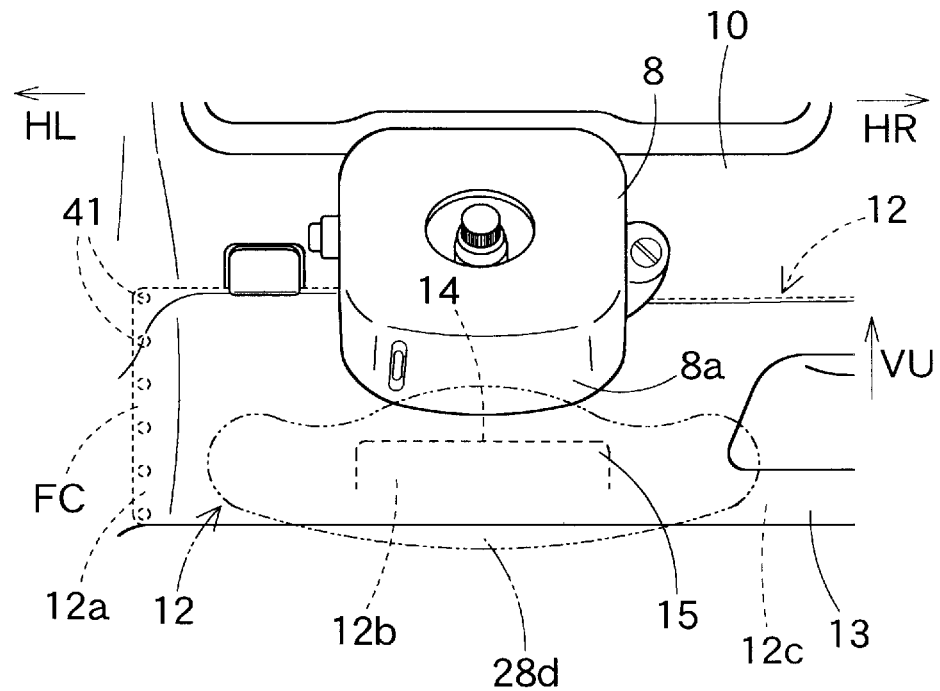
FIGS. 10A and 10B are schematic front elevations as viewed from the rear of the vehicle for illustrating the extension and expansion of the airbag in the knee protecting airbag device of the first embodiment.
Figure 10B:
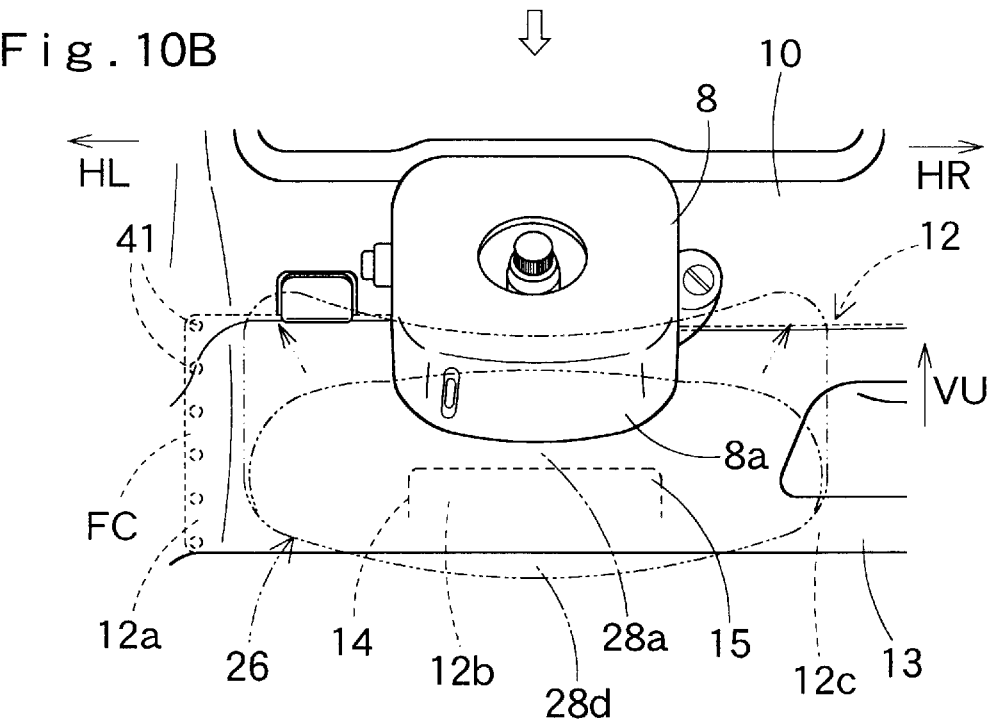

At the initial stage of the extension and expansion of the airbag 26, the lower central portion 28b confronting the inflator at the central portion 28a of the passenger side wall portion 28 is pushed by the inflating gas G discharged from the inflator 21, to protrude at first toward the side of the driver MD at the rear HB, as shown in FIGS. 8A, 9A and 10A. At this time, as the lower central portion 28b protrudes, the folded portions 38, 37 and 37 move to the rear HB of the vehicle to break the breakaway portion 14 and then to open the door portion 15 of the airbag cover 13.

Simultaneously, joining positions 28d below the joining positions 28c leading to the lower central portion 28b also protrude toward the driver MD side (see FIG. 9A). As the inflating gas G flows in, the folded portions 37 near the lower joining position 28d are unfolded. The folded portions 37 are individually arranged, when vertically folded, on the side of the vehicle side wall portion 27 of the left and right joining positions 28c of the passenger side wall portion 28. Therefore, the folded portions 37 near the lower joining position 28d are suppressed as much as possible from protruding toward the driver MD. As shown in FIGS. 9A and 9B, more specifically, the folded portions 37 are unfolded leftward HL and rightward HR while being widely extended from the lower joining position 28d toward the column cover 8 (toward the holding member 12). Then, the airbag lower expansion portion 30 completes the extension and expansion.

After this, the protrusion of the central portion 28a of the passenger side wall 28 toward the driver MD proceeds upward VU from the lower central portion 28b. Simultaneously, the folded portions 37 are unfolded upward VU from the vicinity of the lower joining position 28d. As a result, the transversely folded portion 38 extends and expands while being unfolded along the lower face 8a of the column cover 8. Thus, the airbag upper expansion portion 31 completes its extension and expansion.

Figure 11:
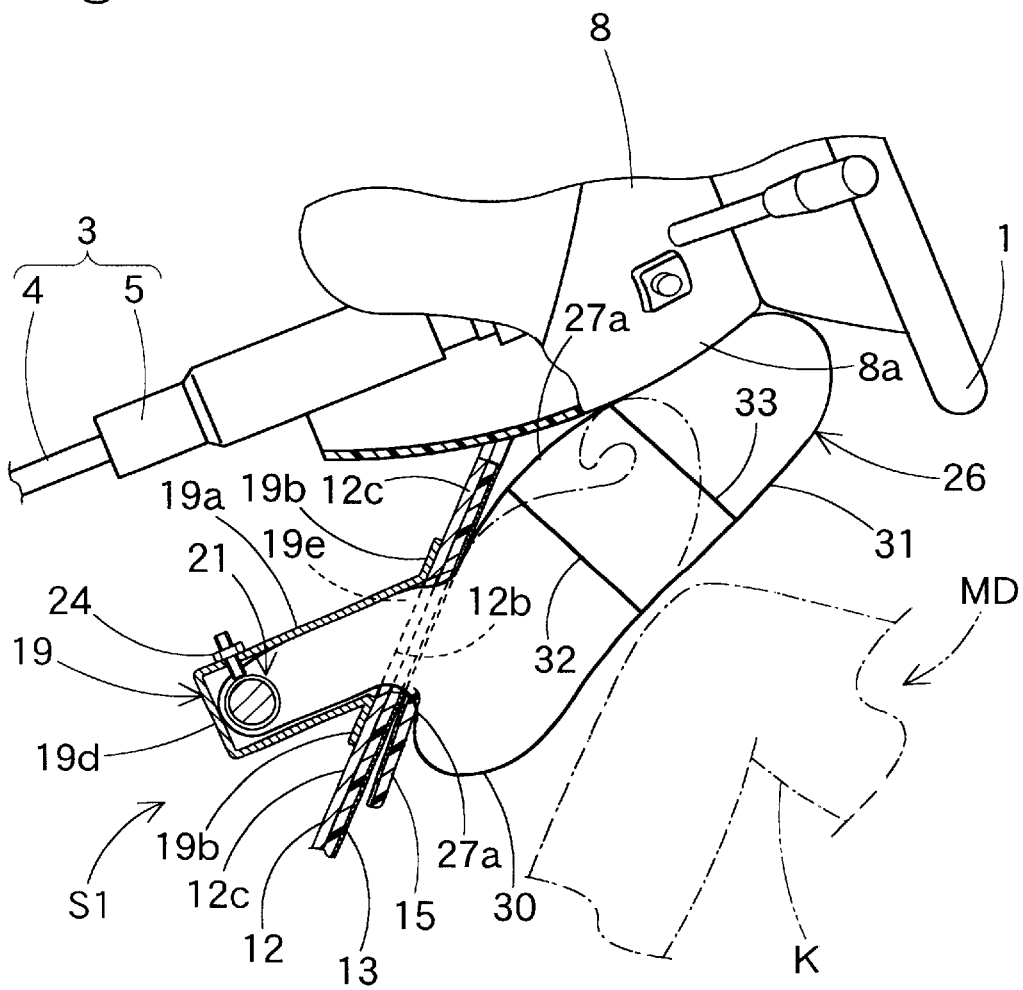
FIG. 11 is a schematic vertical section view showing the state in which the airbag has completed its extension and expansion in the knee protecting airbag device according to the first embodiment, where the plane of the section extends in the longitudinal direction of the vehicle.

In the illustrated embodiment, the vehicle front-facing side (or the vehicle side wall portion 27) of the extending and expanding airbag 26 is supported, at its portions 27a, 27b, 27c and 27d extending and expanding vertically and transversely from the communication hole 12b of the holding member 12, through the airbag cover 13, as shown in FIGS. 8A and 8B to 10A and 10B, by the support face 12c arranged on the periphery of the communication hole 12b. Moreover, the support face 12c supports the door portion 15, which is pushed and opened by the protruding airbag 26, as shown in FIG. 11.

In the airbag device S1 of the illustrated embodiment thus far described, the case 19 housing the folded airbag 26 and the inflator 21 are held by the holding member 12, which is below the column cover 8. The airbag device S1 is mounted on the vehicle by using the mounting portions 12a formed in the holding member 12. Therefore, the airbag device S1 can be mounted on the vehicle when the mounting portions 12a formed on the left and right ends of the holding member 12 holding the case 19 are mounted and fixed on the left and right specified frame portions FC and FR, highly rigid structural members in the vehicle. In the airbag device S1 of the illustrated embodiment, the mounting portions 12a of the holding member 12 are formed, as shown in FIG. 4, at positions spaced transversely from the lower position of the steering column 3 or the position of the case 19. Therefore, the work to mount the mounting portions 12a and 12a on the frame portions FC and FR can be done at positions spaced transversely from below the steering column 3. In the airbag device S1 of the illustrated embodiment, more specifically, the positions of the mounting portions 12a are transversely spaced from below the steering column 3 to provide the needed installation space. Therefore, the work to mount the airbag device S1 on the vehicle is easier than that of the case in which the case 19 is mounted and fixed directly on the column tube 5 or a structural member of the vehicle, at a position below the steering column 3.

Of course, the holding member 12 holding the case 19 is mounted on the frame portions FC and FR by using the mounting portions 12a so that it is held in a stable manner even if it houses the airbag 26 and the inflator 21.

In the first embodiment, the forward face (i.e., the vehicle side wall portion 27) of the airbag 26, after being extended and expanded, is supported through the airbag cover 13 by the support face 12c of the holding member 12. Even when the extended and expanded airbag 26 interferes with the knees K of the driver MD, therefore, it does not move forward but protects the knees K of the driver MD properly and stably.

In the airbag device S1 of the first embodiment, therefore, it is possible to provide stable support of the case 19 and the airbag 26 and to facilitate the work to mount the airbag device S1 on the vehicle.

In the illustrated embodiment, the case 19 housing the folded airbag 26 and the inflator 21 is assembled with the holding member 12 to form the airbag assembly SA1. Therefore, the airbag 26, the inflator 21, the case 19 and the holding member 12 can be transported and stored in the assembled state. As a result, it is easy to handle the individual parts such as the airbag 26 and the inflator 21 before they are mounted on the vehicle.

In the airbag device S1 thus far described, the holding member 12 is mounted and fixed on the frame portions FC and FR of the vehicle. However, the mounting portion of the vehicle for mounting and fixing the holding member 12 should not be so limited. The holding member need not be directly connected and fixed to a structural member such as the frame portion of the vehicle, if the holding member is supported in a stable manner.

Figure 12:
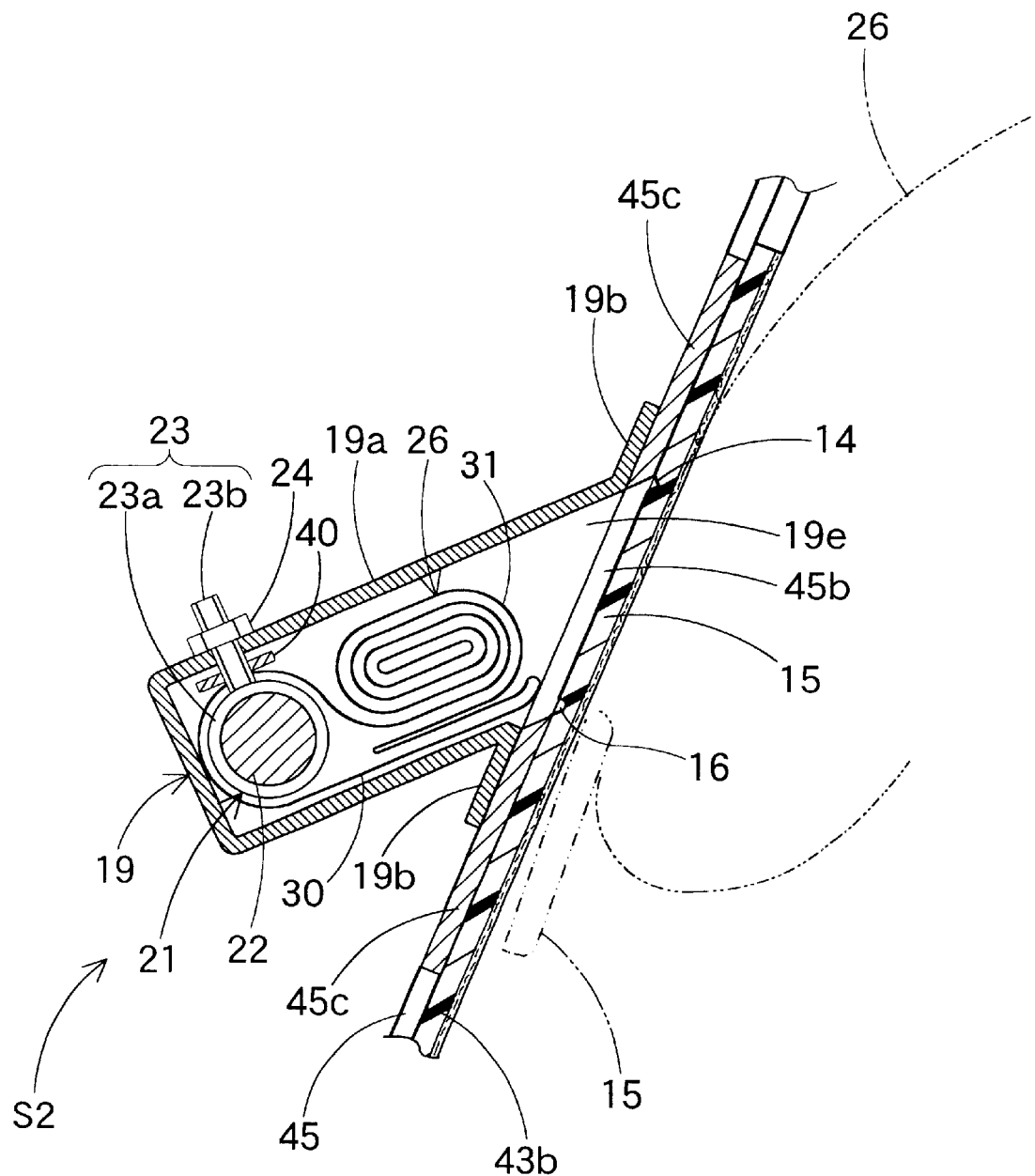
FIG. 12 is a schematic vertical section view of a knee protecting airbag device according to a second embodiment of the invention, where the plane of the section extends in the longitudinal direction of the vehicle.
Figure 13:
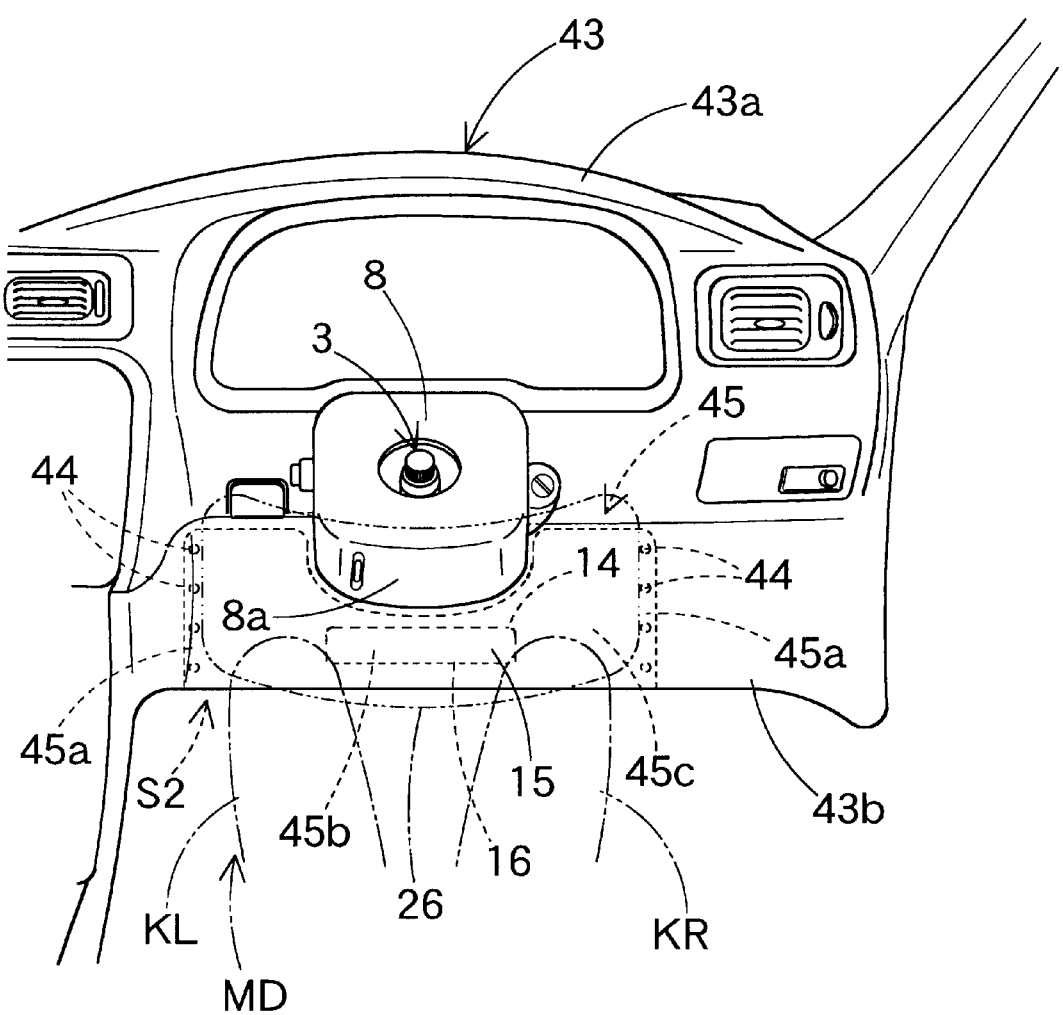
FIG. 13 is a schematic front elevation view showing the operation of the knee protecting airbag device of the second embodiment as viewed from the rear of the vehicle.

The mounting portion can be the lower panel 43b of a dashboard 43, as in the airbag device S2 of a second embodiment shown in FIGS. 12 and 13. In the second embodiment, the dashboard 43 comprises an upper panel 43a and the lower panel 43b. A holding member 45 is mounted and fixed on the lower panel 43b, which serves as the mounting portion. In predetermined portions of the lower panel 43b, more specifically, there are connected a plurality of bolts (e.g., eight in the illustrated embodiment) which protrude toward the front. The holding member 45 is mounted and fixed on the lower panel 43b by fastening mounting portions 45a, formed on the two transverse ends of the holding member 45, by the bolts 44. The holding member 45 is provided, like the aforementioned holding member 12 in the airbag device S1, with a communication hole 45b and a support face 45c, which is arranged on the periphery of the communication hole 45b. The communication hole 45b communicates with the opening 19e of the case 19. The support face 45c can support the front side face of the extending and expanding airbag 26. The support face 45c is made transversely wider than the airbag 26, when the airbag 26 has extended and expanded, so that the support face 45c can support the front face of the airbag 26, as shown in FIG. 13. The door portion 15 is integrated with the lower panel 45b by arranging the breakaway portion 14, which has an inverted U-shape, around its peripheral edges and by arranging the hinge portion 16 on its lower edge.

The construction of the airbag device S2 of the second embodiment, except for the dashboard 43 and the holding member 45, is similar to that of the aforementioned airbag device S1 of the first embodiment. Therefore, same members will not be explained, and will be designated by the same reference numerals.

If the airbag device S2 is given the construction thus far described, the mounting portions 45a of the holding member 45 are formed at specified positions spaced leftward and rightward from the lower position of the steering column 3, or the position of the case 19, as shown in FIG. 13. Even if the holding member 45 is mounted on the lower panel 43b, as described above, the work to mount the mounting portions 45a on the lower panel 43b are done at positions spaced transversely from the position below the steering column 3 so that the work can be simplified.

Figure 14:
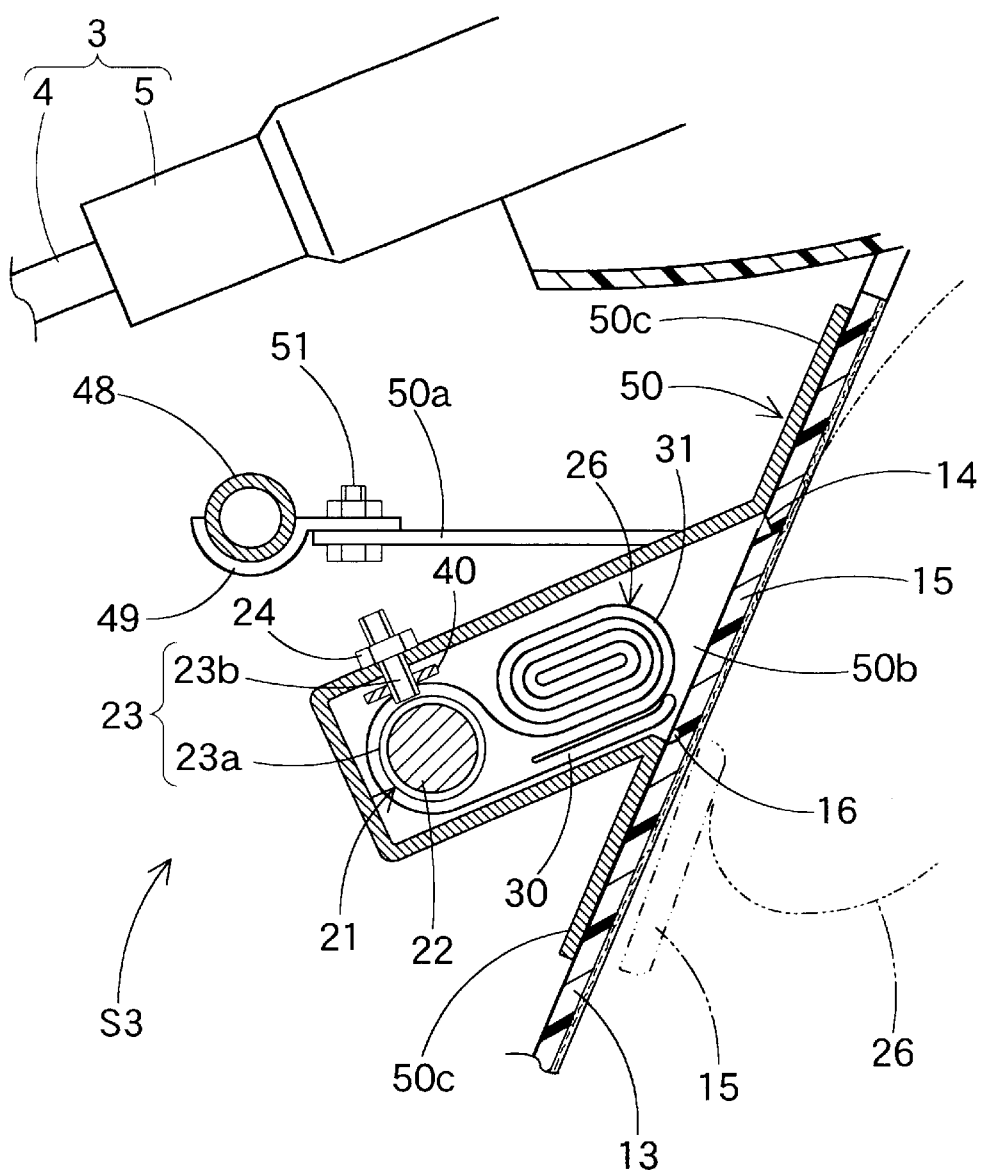
FIG. 14 is a schematic vertical section view of a knee protecting airbag device according to a third embodiment of the invention, where the plane of the section extends in the longitudinal direction of the vehicle.
Figure 15:
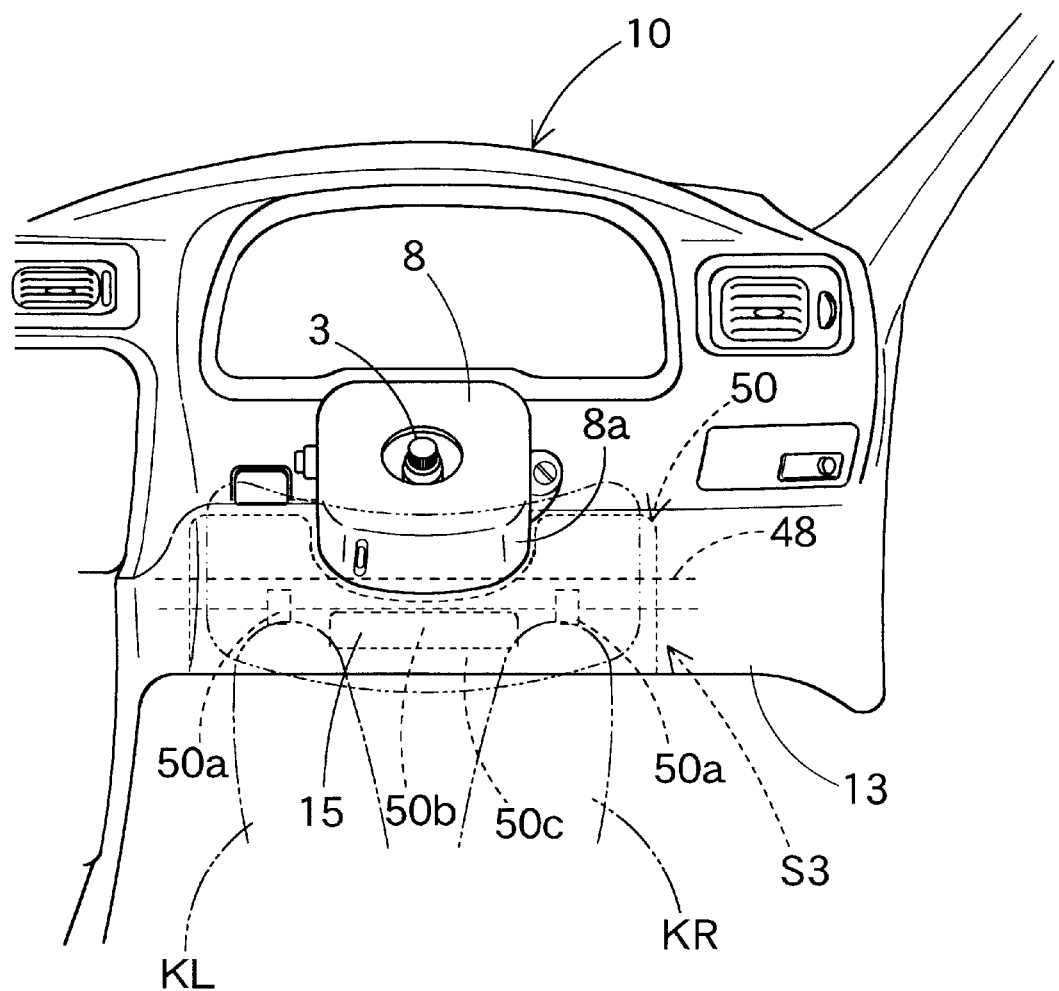
FIG. 15 is a schematic front elevation view showing the operation of the knee protecting airbag device of the third embodiment as viewed from the rear of the vehicle.

Moreover, the mounting portion may be a dashboard reinforcement 48, which is a structural member of the vehicle, as in an airbag device S3 of a third embodiment, as shown in FIGS. 14 and 15. The dashboard reinforcement 48 is formed into a pipe shape and is arranged below the steering column 3 to intersect the steering column 3 generally perpendicularly. A holding member 50 is provided with a plurality of (e.g., two in the illustrated embodiment) mounting plates 50a protruding forwardly. The holding member 50 is mounted and fixed on the dashboard reinforcement 48 by fixing the front end portion of each mounting plate 50a on a mounting plate portion 49, which is fixed on the dashboard reinforcement 48 by a bolt 51. The holding member 50 is integrated with the case 19 by a die-casting method, as shown in FIG. 14. The holding member 50 is provided, like the foregoing holding members 12 and 45, with a communication hole 50b and a support face 50c arranged on the periphery of the communication hole 50b. The support face 50c is made transversely larger than the airbag 26, when the airbag 26 is extended and expanded, as shown in FIG. 15.

The construction of the airbag device S3 of the third embodiment, except for the holding member 50, is similar to that of the aforementioned airbag device S1 of the first embodiment. Therefore, common members will be omitted from description by designating them by common reference numerals.

In the case of the aforementioned construction of the airbag device S3, the mounting portions 50a and 50b of the holding member 50 are formed at positions spaced transversely from the specified position below the steering column 3, or the position of the case 19, as shown in FIG. 15. Even if the holding member 50 is mounted on the dashboard reinforcement 48, as described above, the work to mount the mounting portions 50a and 50a on the dashboard reinforcement 48 is done at positions spaced transversely from the position below the steering column 3 and is thus simplified.

In the airbag device S3 of the third embodiment, the airbag assembly is made by housing the airbag 26 and the inflator 21 in the case 19, which is integrated with the holding member 50, and by mounting and fixing the airbag cover 13 on the holding member 50. This airbag assembly is mounted on the vehicle by using the mounting portions 50a.

Figure 16:
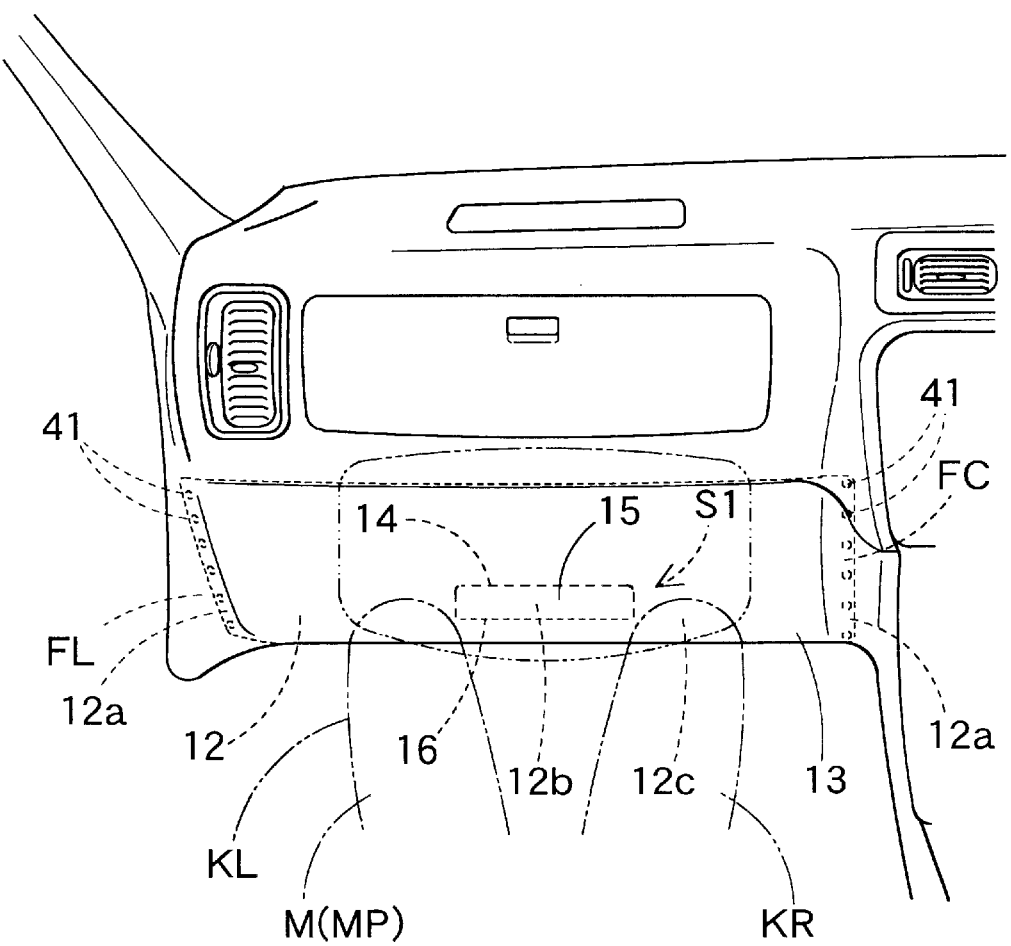
FIG. 16 is a schematic front elevation view taken from the rear of the vehicle showing the state in which the knee protecting airbag device of the first embodiment is arranged in front of a passenger's seat.

The first to third embodiments have been described by exemplifying the airbag devices S1 to S3, which are arranged on the in front of the driver MD to protect the knees of the driver MD. In order to protect the knees of a passenger MP seated on the passenger's seat, however, the airbag device S1 may be arranged in front of the passenger MP seated on the passenger seat, as shown in FIG. 16. In the illustrated example, the mounting portions 12a formed at the left and right ends of the holding member 12 for holding the case are each connected and fixed to the left and right frame portions FL and FC, which serve as the mounting portions of the vehicle, by the bolts 41. The frame portion FL is a front body pillar in the body of the vehicle, and the frame portion FC is a center brace in the body of the vehicle.

In the airbag devices S1 to S3 of the first to third embodiments, the mounting portion of the vehicle for mounting and fixing the holding members 12, 45 and 50 need not be limited to that described. The mounting portion may be the column tube 5 or the like. In the holding members 12, 45 and 50, the mounting portions 12a, 45a and 50a are formed at specified positions spaced transversely from the case 19. However, the positions for forming the mounting portions should not be so limited and may be located, for example, to be vertically spaced from the case 19.

A knee protecting airbag device S4 capable of achieving the second object of the invention will now be described.

The knee protecting airbag device S4 of a fourth embodiment is arranged below the steering column 3 and in front of the driver MD, as shown in FIGS. 17 to 20, to protect the knees K of the driver MD, or the passenger M.

The construction of the vehicle mounted airbag device S4 of the fourth embodiment, other than the dashboard 112, is similar to that of the airbag device S1 of the first embodiment. Therefore, common members will not be described and will be designated by common reference numerals.

The knee protecting airbag device S4 comprises a folded airbag 26A, an inflator 141, an airbag cover 130, and a knee panel 116, which serves as the holding member. In the airbag device S4 of this embodiment, the airbag 26A, the inflator 141 and the airbag cover 130 are assembled with the knee panel 116 to make an airbag assembly SA2 (see FIGS. 25 and 26). The airbag assembly SA2, which is integrated by assembling the individual parts, is mounted on the vehicle.

The knee panel 116 is made of sheet metal and is provided with a body portion 117, which has a flat shape, and a housing portion 123, as shown in FIGS. 18 to 22. The housing portion 123 houses the folded airbag 26A and the inflator 141.

The housing portion 123 is formed into a bottomed box shape having an opening 123a that slopes downward toward the rear. In this embodiment, the housing portion 123 is formed into a generally rectangular box shape. The housing portion 123 has a bottom wall portion 126 of a generally rectangular shape and a peripheral wall portion 124 of a generally rectangular tubular shape. In the peripheral wall portion 124 surrounding the opening 123a, mounting holes 127 and 128 of larger and smaller diameters for mounting the inflator 141 are individually formed in side wall portions 124a and 124b. The mounting hole 127 is constructed to receive the later-described cylindrical body portion 141a of the inflator 141. The mounting hole 127 can support the outer circumference of the body portion 141a on its inner circumference. The mounting hole 128 is too small to receive the body portion 141a of the inflator 141 but allows a screw portion 141c of the inflator 141 to pass. The inflator 141 is mounted in the housing portion 123 in the following manner. First, the inflator 141 is inserted into the mounting hole 127 from the outside of the housing portion 123 such that the screw portion 141c protrudes from the mounting hole 128. After this, a nut 142 is threaded on the screw portion 141c.

Figure 19:
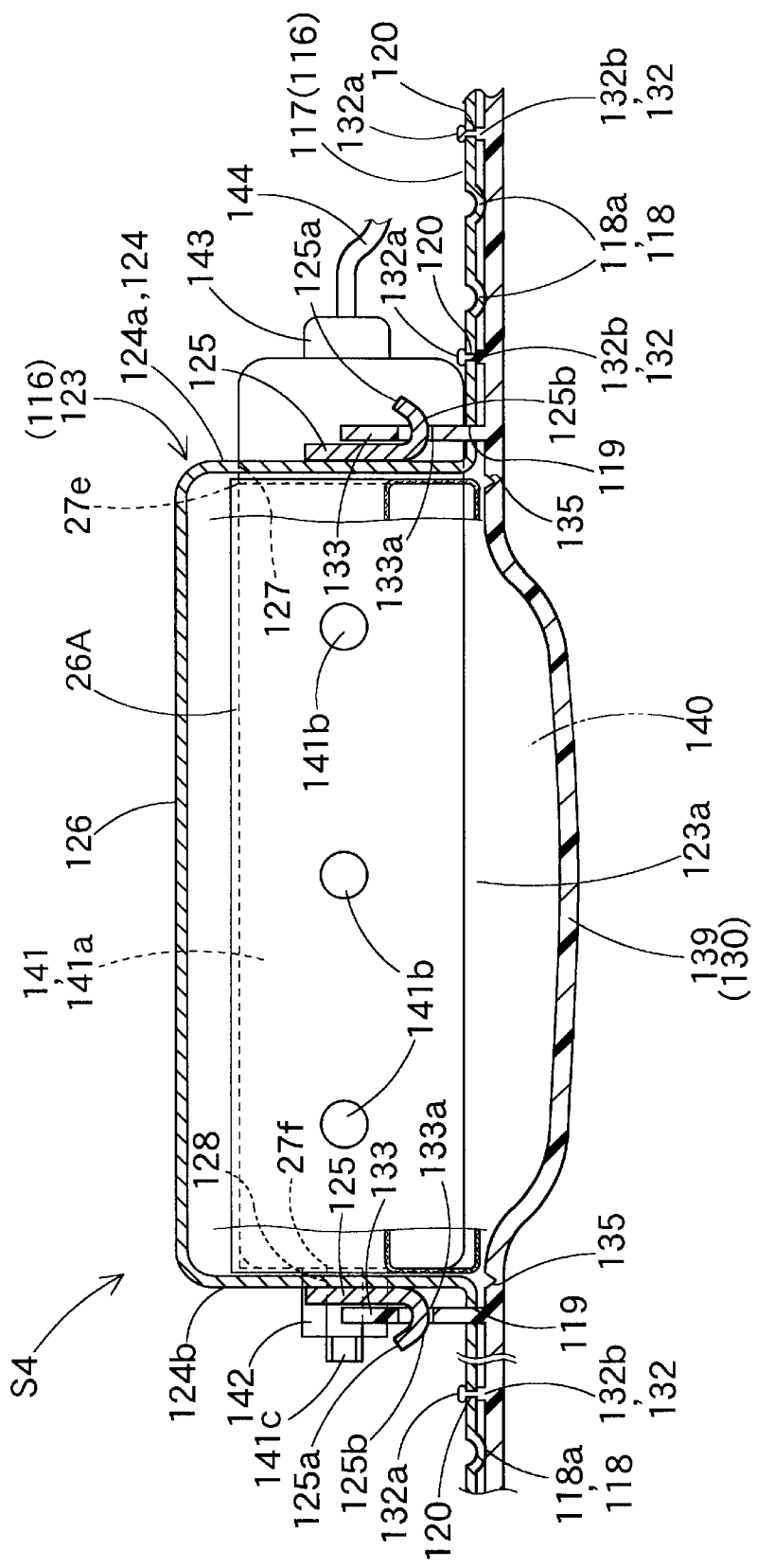
FIG. 19 is a section view taken along plane XIX—XIX of FIG. 18.

On the outer circumference of the peripheral wall portion 124, there are fixed a plurality of hooks 125, which have a generally J-shaped section. Each hook 125 has a retaining hook portion 125a at a top end. The retaining hook portion 125a is inverted to the bottom wall portion 126 side. In this embodiment, there are nine hooks 125. Specifically, four hooks 125 are arranged at positions (on the lower portion of the peripheral wall portion 124) along the later-described hinge portion 137 in the air bag cover 130. Three hooks 125 are arranged at positions (on the upper side of the peripheral wall portion 124) along the leading edge 139a of the later-described door portion 139 of the airbag cover 130. As shown in FIG. 19, hooks 125 are arranged, respectively, on the sides of the peripheral wall portion 124.

The body portion 117 is formed into a generally rectangular shape extending from the periphery of the opening 123a of the housing portion 123. The body portion 117 is positioned in front of the left and right knees K (KL and KR) of the seated driver MD. At the four corners of the periphery in the body portion 117, there are arranged mounting members 121 for connecting the body portion 117 to the body 101 of the vehicle. In the vicinity of the upper edge of the opening 123a in the body portion 117, there is a recess 117a for the protruding lower face 8a of the column cover 8. The upper edge of the opening 123a in the body portion 117 is curved to protrude toward the rear in a manner to match the curve of the column cover lower face 8a. Between the periphery of the opening 123a and the outer periphery of the body portion 117, there are ribs 118a for increasing the rigidity of the body portion 117. The rear-facing surface of each rib 118a forms a support portion 118 for supporting the later-described general portion 131 of the airbag cover 130.

Along the periphery of the housing portion opening 123a of the body portion 117, there is a plurality of through holes 119. The opening of each through hole has a generally rectangular shape. The through holes 119 permit mounting members 133 to pass and to be retained on the hooks 125 in the airbag cover 130. The through holes 119 are arranged on the body portion 117 corresponding to the retaining hook portions 125a along the peripheral wall portion 124.

On the left and right sides, apart from the housing portion 123, in the body portion 117, there are mounting holes 120, which extend through the body portion 117. The mounting holes 120 are for mounting the airbag cover 130 on the knee panel 116 by a thermal caulking method. This airbag cover 130 is mounted on the knee panel 116 in the following manner. First, the later-described mounting leg portions 132 of the airbag cover 130 are inserted into the individual mounting holes 120. After this, the leading ends 132a of the individual mounting leg portions 132 are melted and radially enlarged so that they are prevented, after solidifying, from coming out of the mounting holes 120. In short, the airbag cover 130 is mounted on the knee panel 116 by using the mounting leg portions 132 and the hooks 125.

Figure 20:
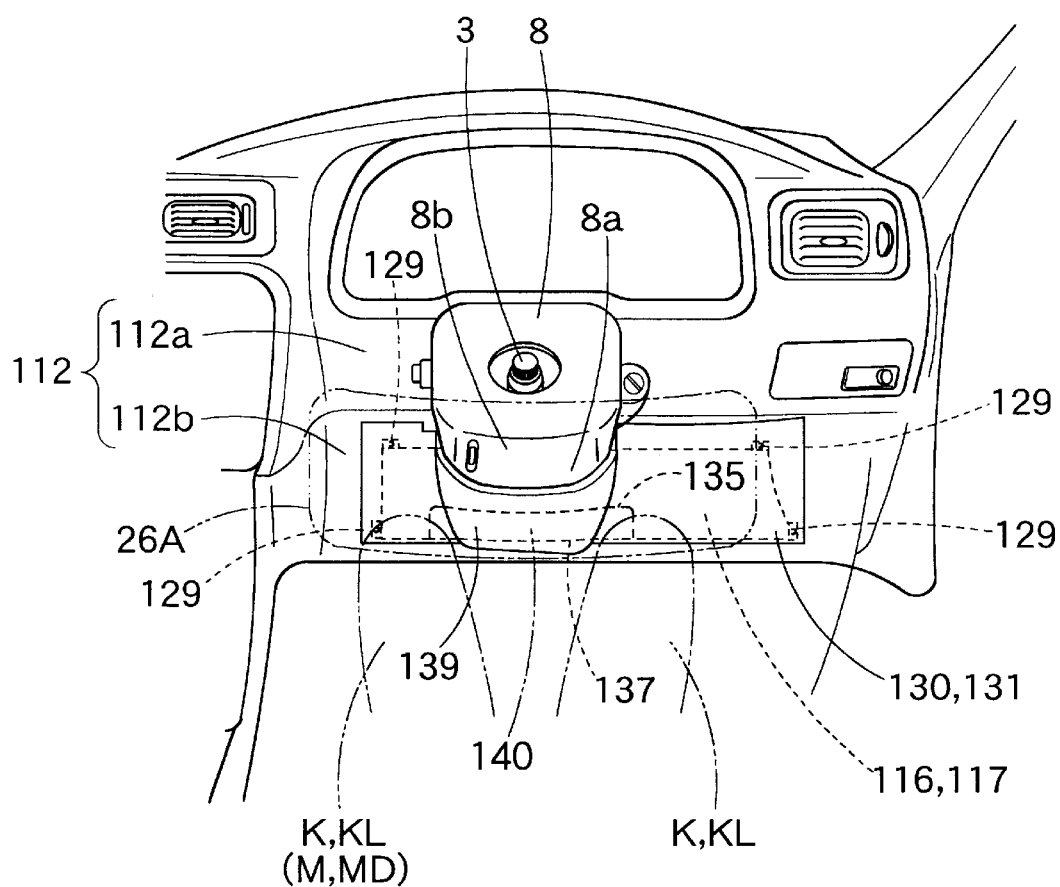
FIG. 20 is a schematic front elevation view showing the operation of the knee protecting airbag device of the fourth embodiment as viewed from the rear of the vehicle.
Figure 21:
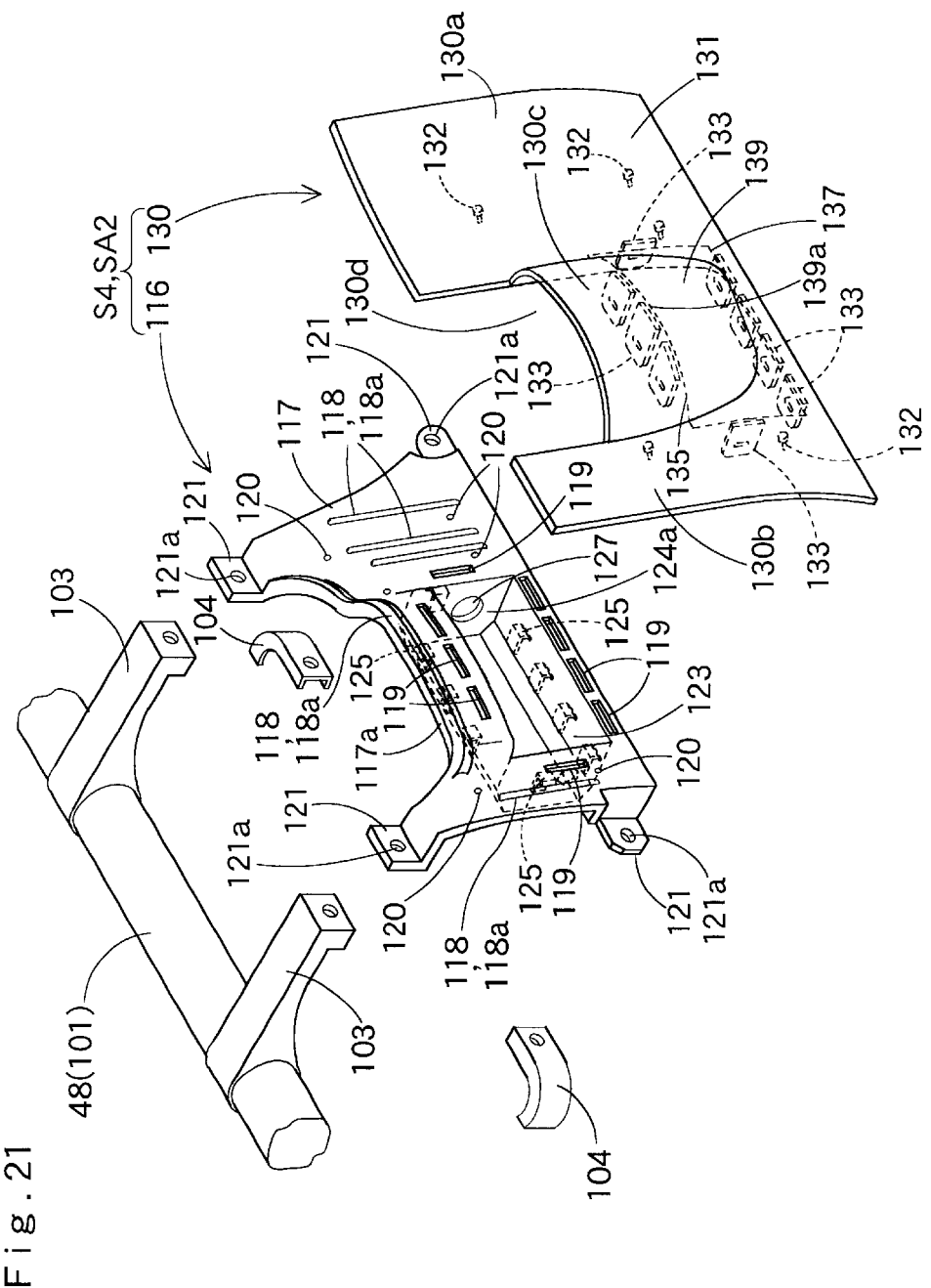
FIG. 21 is an exploded front perspective view of a knee panel to be used as a holding member and an airbag cover of the fourth embodiment.

In the individual joining members 121 of the knee panel 116, there are joint holes 121a for mounting the knee panel 116 on the body 101 by bolts 129 (see FIG. 20). For mounting the individual joining members 121, brackets 103 and 104 are located at the body 101. The brackets 103 and 104 serve as kinetic energy absorbing members for absorbing the kinetic energy of the knees K of the driver MD. When the airbag 26A completes extension and expansion and is pushed by the knees K of the driver MD, the airbag 26A cannot absorb all the kinetic energy of the knees K, if the passenger side wall portion 28 of the airbag 26A contacts the vehicle side wall portion 27, when pushed by the knees K. At this time, the brackets 103 and 104 plastically deform and absorb the forward energy from the knees K. The brackets 103 and 104 elastically deform if the knees K of the passenger MD interfere with the knee panel 116 while the airbag 26A is in the unexpanded state. The brackets 103 are connected to the dashboard reinforcement 48 on the side of the body 101. The brackets 104 are connected to an unillustrated center brace or front body pillar of the body 101.

In the illustrated embodiment, the knee panel 116, the body portion 117, and the housing portion 123 are pressed into one unit. However, the knee panel 116 may be suitably formed by welding sheet metal.

The airbag cover 130 is made of a thermoplastic elastomer such as polyolefin. The airbag cover 130 is given a larger external shape than that of the knee panel 116, as shown in FIGS. 18 to 22, so that the airbag cover 130 covers the rear-facing side of the knee panel 116.

The airbag cover 130 is arranged on the side of the lower panel 112b on the periphery of the column cover 8 in the dashboard 112, which is composed of an upper panel 112a and a lower panel 112b. The airbag cover 130 covers the lower periphery of the column cover 8 protruding from the dashboard 112. For this purpose, the airbag cover 130 is provided near the center, as viewed from the vehicle rear, with a recessed portion 130d which allows the column cover 8 to protrude toward the rear of the vehicle. Below the recessed portion 130d in the airbag cover 130, there is a raised portion 130c which is curved toward the rear of the vehicle to match the curvature of the lower face 8a of the column cover. On the left and right sides of the raised portion 130c in the airbag cover 130, there are flat portions 130a and 130b, which extend to cover the left and right sides of the body portion 117 of the knee panel 116.

The airbag cover 130 comprises the door portion 139, for covering the opening 123a of the housing portion 123, and the general portion 131, for covering the rear side of the body portion 117.

The door portion 139 is arranged below the raised portion 130c. The door portion 139 is formed into a generally rectangular plate shape for covering an area slightly greater than that of the opening 123a. Along an inverted U-shaped portion of the outer periphery of the door portion 139, there is a breakaway portion 135, which is relatively thin and connected to the general portion 131 such that the door portion 139 may be opened downward. The breakaway portion 135 is formed to have continuous or interrupted grooves on the front face such that it can be easily broken when the door portion 139 is pushed by the expanding airbag 26A.

On the lower edge side of the door portion 139, the hinge portion 137, which provides a pivot for the door portion 139 when the breakaway portion 135 is broken, is formed to allow the door portion 139 to open. The hinge portion 137 is an integral hinge, and the hinge portion 137 is thinner than the general portion 131 and the door portion 139 but does not break when the airbag expands.

In the vicinity of the entire periphery of the housing portion opening 123a in the general portion 131, the mounting members 133 protrude forward. Each of the mounting members 133 extends through an associated through hole 119 in the body portion 117 of the knee panel 116. Each mounting member 133 is formed into a generally rectangular plate shape. In each mounting member 133, there is formed a retaining hole 133a, which has a rectangular shape. The retaining hole 133a is held by the retaining hook portion 125a of the hook 125.

Figure 22:
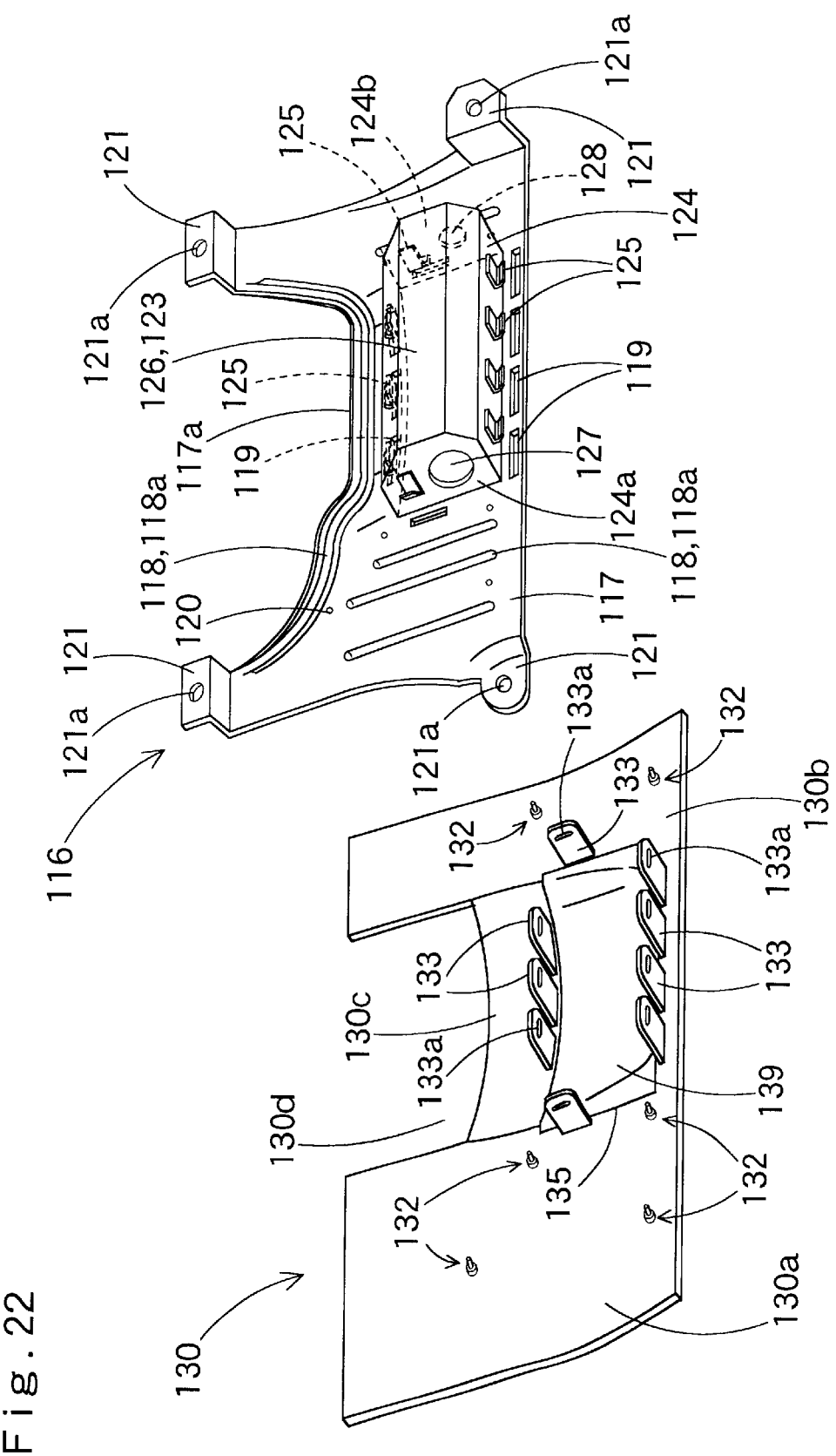
FIG. 22 is an exploded rear side perspective view of the knee panel to be used as the holding member and the airbag cover in the fourth embodiment.
Figure 23:
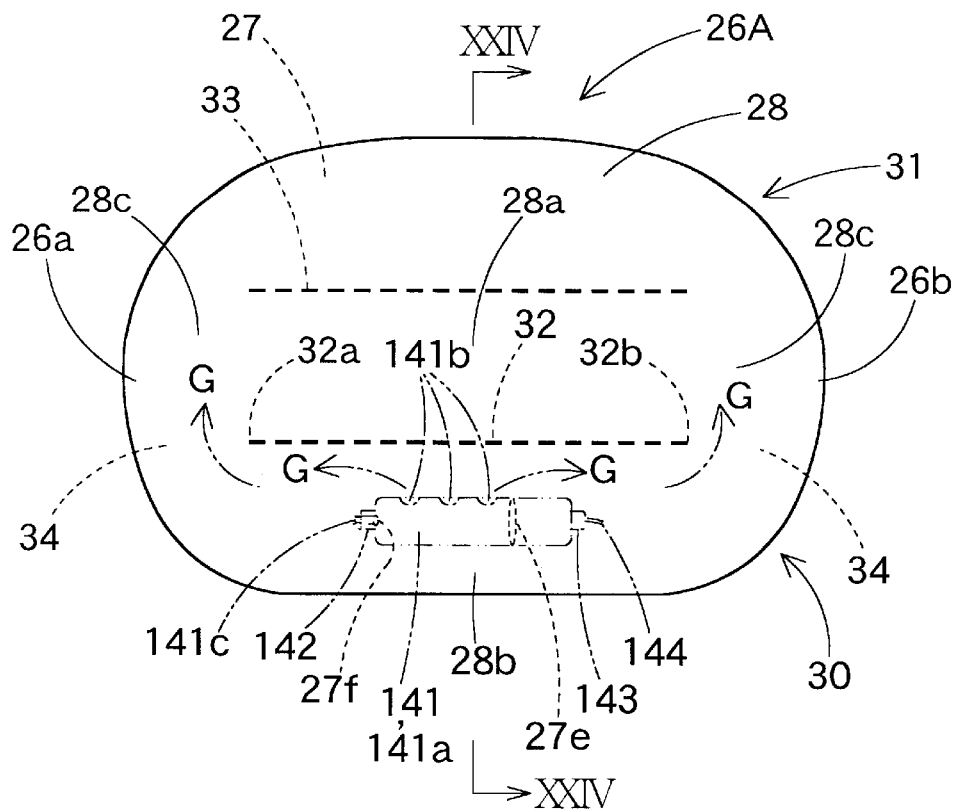
FIG. 23 is a front elevation view of the airbag of the fourth embodiment.
Figure 24:
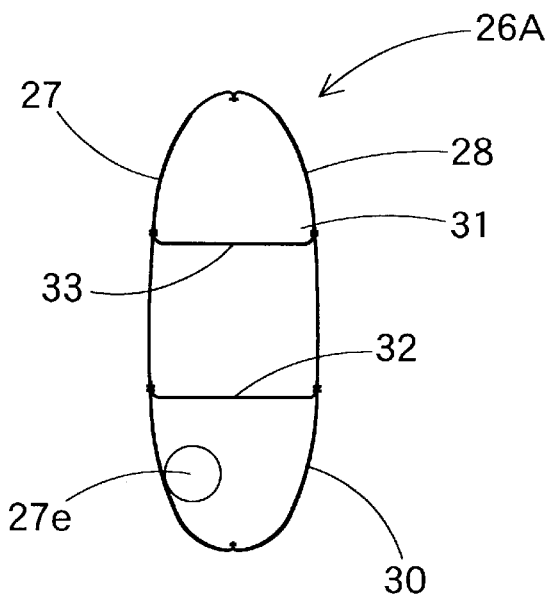
FIG. 24 is a schematic section view taken along plane XXIV—XXIV of FIG. 23.
Figure 25:
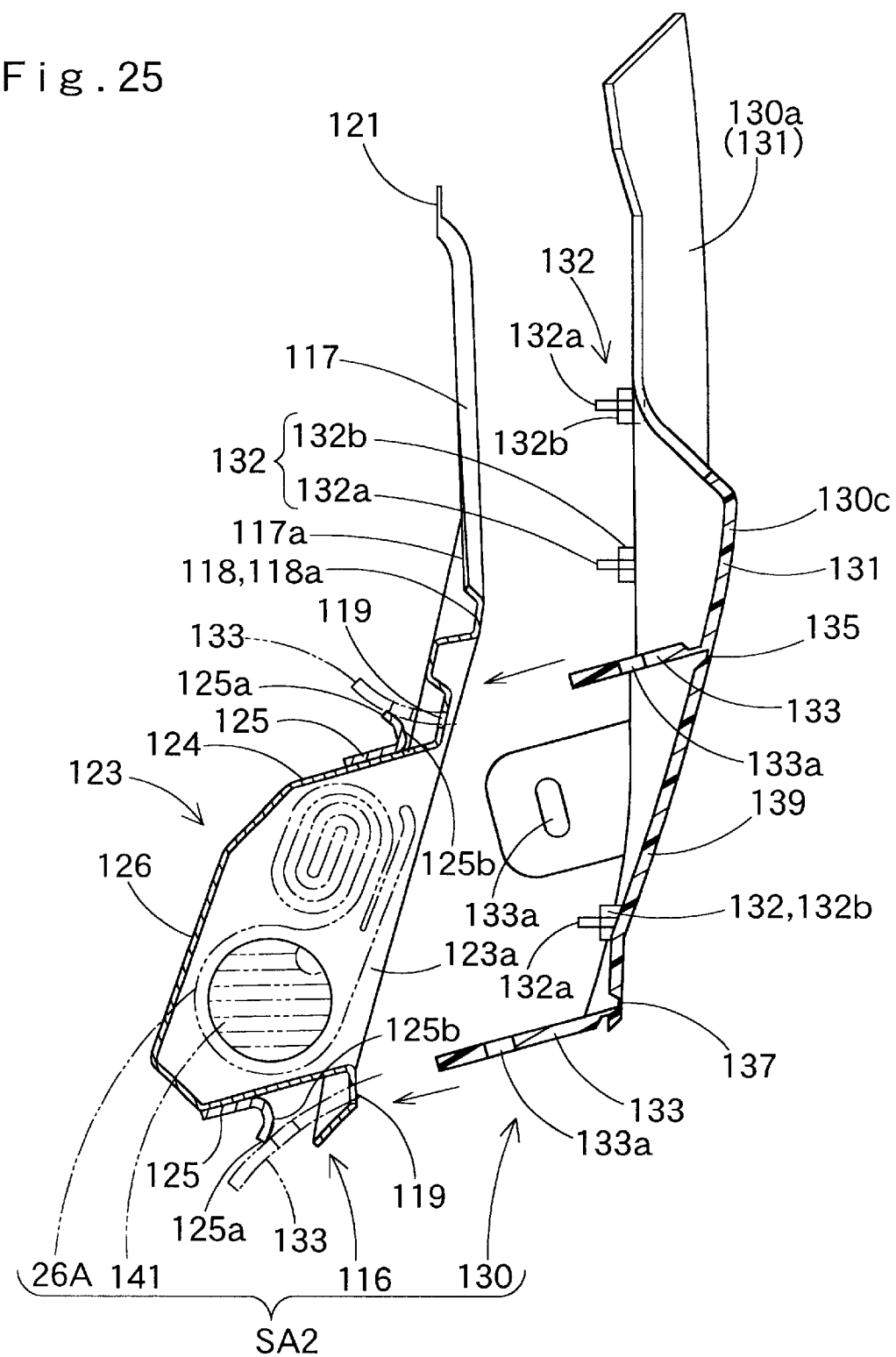
FIG. 25 is a sectional view showing the state in which the airbag cover of the fourth embodiment is mounted on the knee panel, and the knee panel serves as the holding member.
Figure 26:
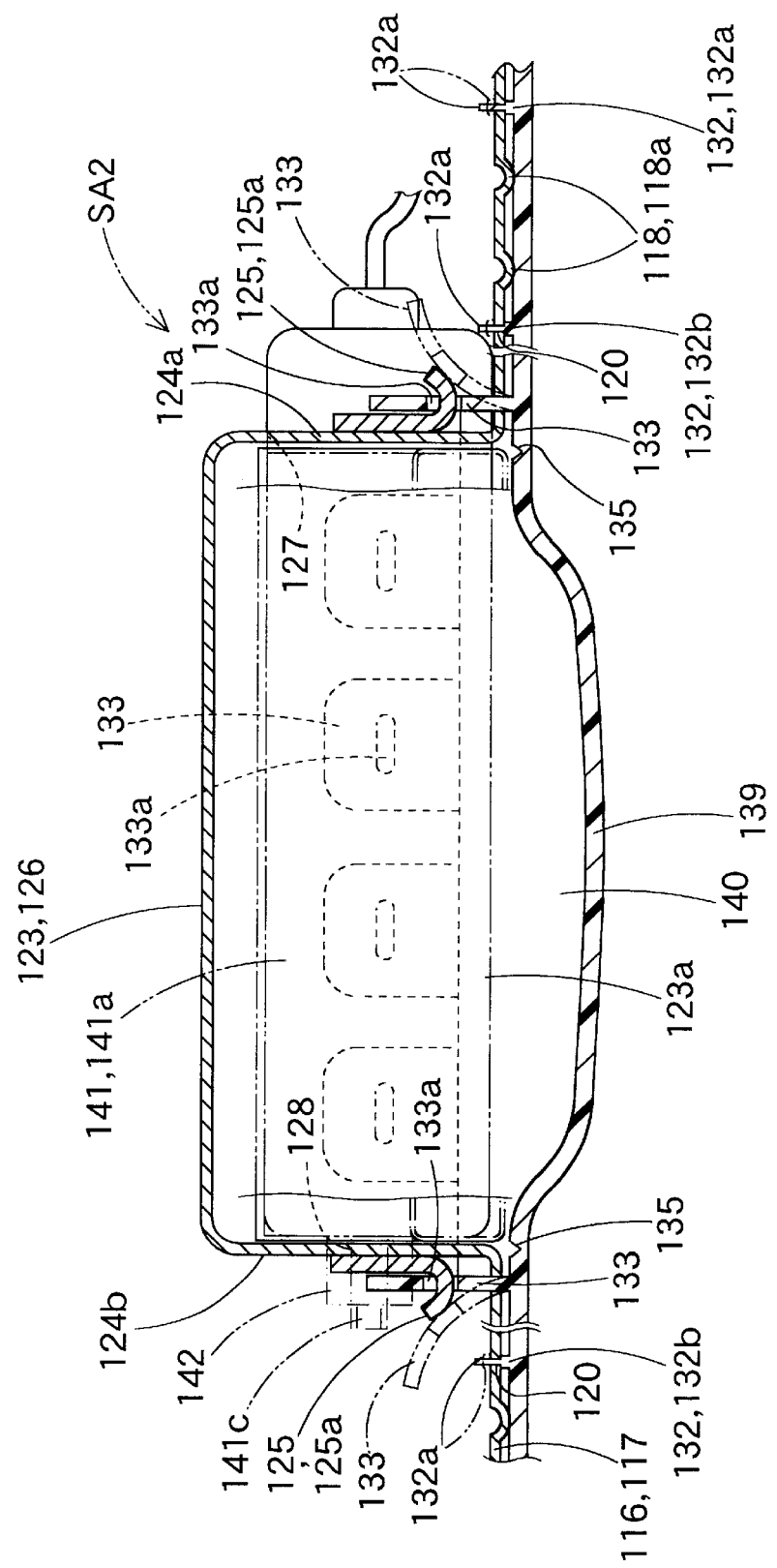
FIG. 26 is a sectional view showing the state in which the airbag cover used in the fourth embodiment is mounted on the knee panel as the holding member.

At predetermined positions of the general portion 131, on the other hand, there are formed mounting leg portions 132. Each mounting leg portion 132 is thermally caulked and retained in a mounting hole 120 in the body portion 117 of the knee panel 116. As shown in FIGS. 22 and 25, each mounting leg portion 132 is formed to have a rod shape before it is thermally caulked to permit insertion into the mounting hole 120. As shown in FIGS. 19 and 26, each mounting leg portion 132 is provided at its leading end with a head portion 132a, which is deformed after being thermally caulked. At the proximal end of each mounting leg portion 132, there is formed a root portion 132b, which has a cylindrical cross section. The root portion 132b abuts against the body portion 117 when the head portion 132a is thermally caulked and fixed in the mounting hole 120.

Figure 17:
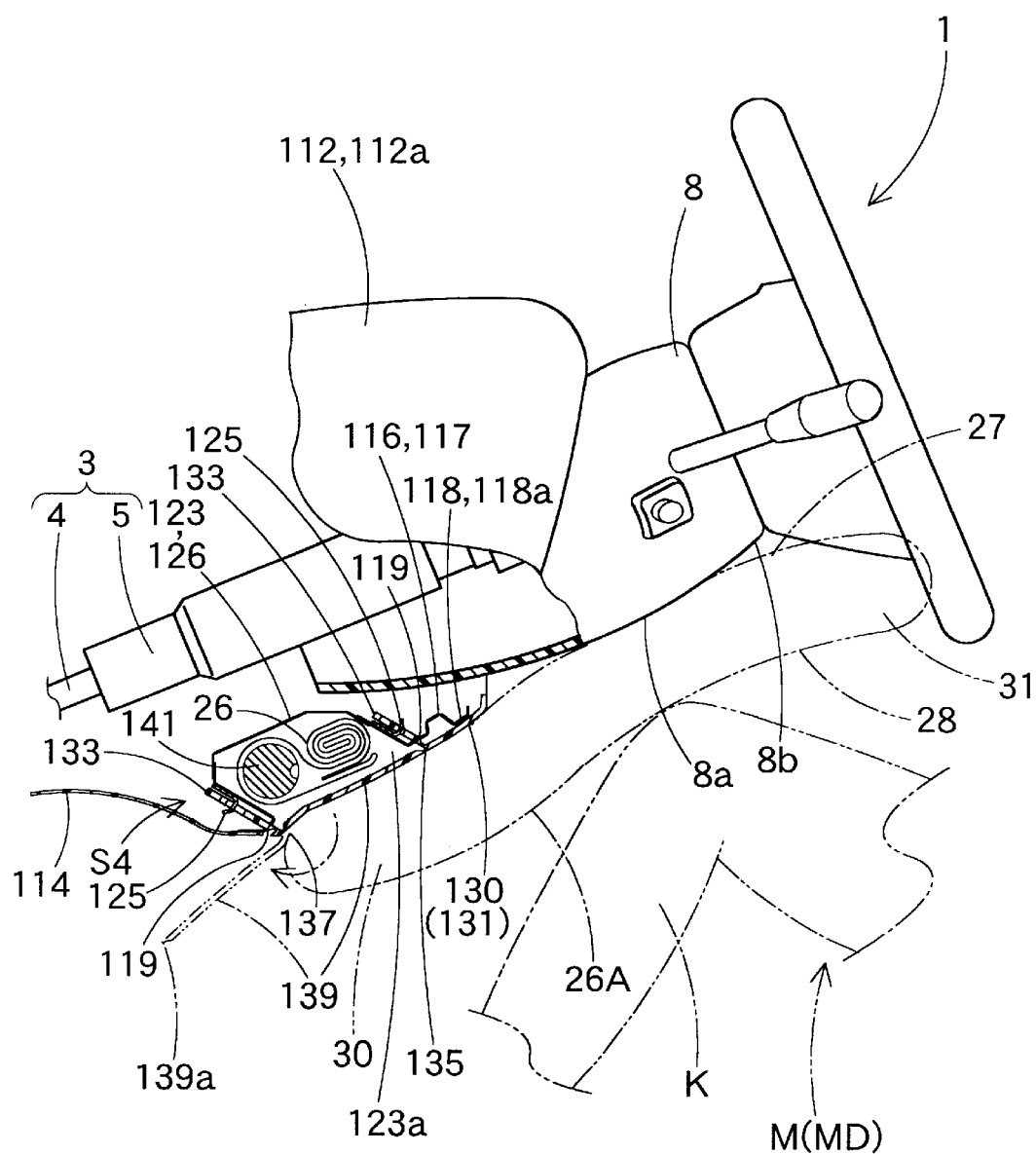
FIG. 17 is a schematic vertical section view showing the operation of a knee protecting airbag device according to a fourth embodiment of the invention, where the plane of the section extends in the longitudinal direction of the vehicle.
Figure 18:
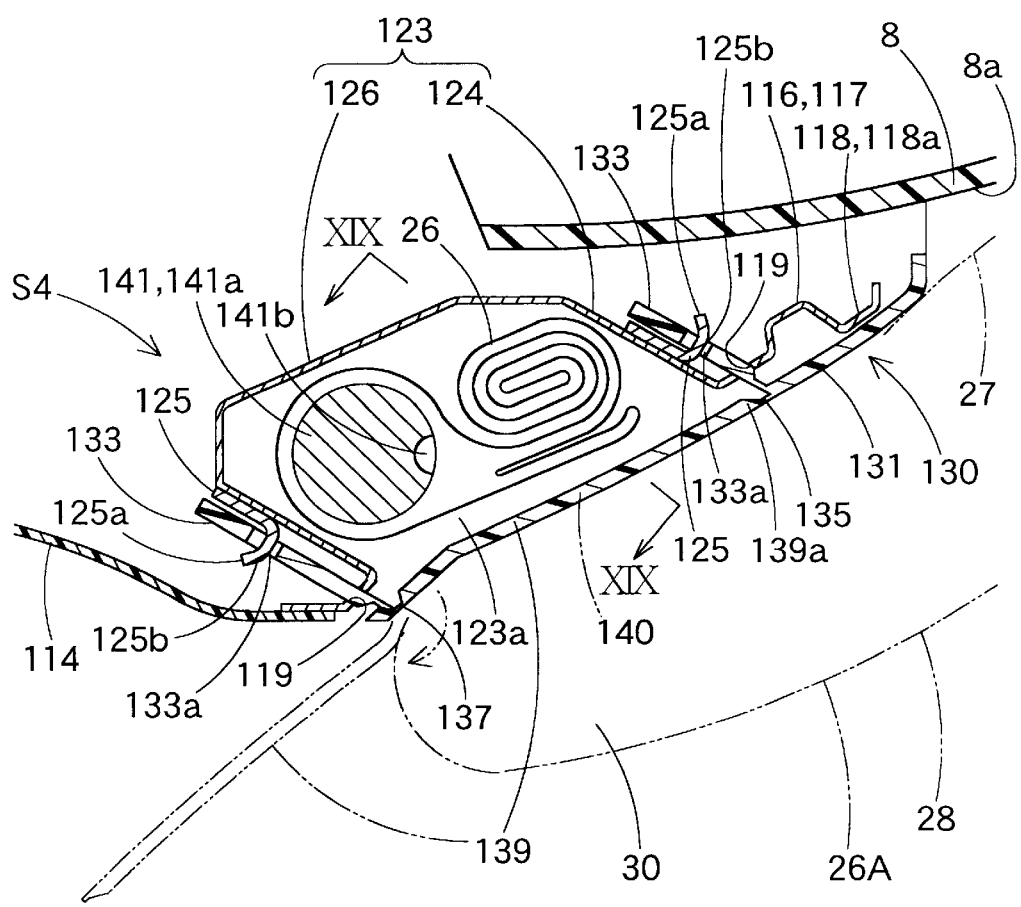
FIG. 18 is a schematic vertical section view of the knee protecting airbag device of the fourth embodiment in the longitudinal direction of the vehicle.

The inflator 141 is, as shown in FIGS. 17 to 19, a cylinder-type inflator that is capable of discharging inflating gas G when fed with an electric signal. The inflator 141 has a cylindrical body portion 141a provided with gas discharge ports 141b. In the inflator 141, a threaded portion 141c protrudes from one end of the body portion 141a. The inflator 141 is held in the following manner in the housing portion 123, as has been described above. Specifically, the inflator 141 is inserted into the housing portion 123 in the knee panel 116 from the mounting hole 127, and the nut 142 is fastened on the threaded portion 141c, which protrudes from the mounting hole 128. Then, the end face of the body portion 141a that corresponds to the screw portion 141c is pressed against the periphery of the mounting hole 128 of the housing portion 123. At this time, the end of the body portion 141a that is opposite from the screw portion 141c is supported on the inner circumference of the mounting hole 127. The inflator 141 extends, when housed in the housing portion 123, through the later-described mounting holes 27e and 27f of the airbag 26A.

Like the inflator in the airbag device S1 of the first embodiment, the inflator 141 is activated when fed with the electric signal from the control device for activating the unillustrated airbag device mounted on the steering wheel 1, simultaneously with the airbag device for the steering wheel. On the end of the body portion 141a that protrudes out of the housing portion 123, there is arranged a connector 143 which is connected with a lead wire 144, and the lead wire 144 is connected with the airbag activating circuit.

The airbag 26A has a construction similar to the airbag 26 in the airbag device S1 of the first embodiment. Therefore, a description of the airbag 26A will be omitted. In the lower side of the vehicle side wall portion 27 in the airbag 26A, there are formed two mounting holes 27e and 27f. The internal diameter of the mounting hole 27e is substantially equal to the external diameter of the body portion 141a to permit insertion of the body portion 141a of the inflator 141. The internal diameter of the mounting hole 27f is smaller than the external diameter of the body portion 141a but permits passage of the screw portion 141c. The airbag 26A is mounted on the knee panel 116 in the following manner. First, the inflator body portion 141a is inserted into the mounting hole 27e of the airbag 26A, and the screw portion 141c is inserted into the mounting hole 27f. At this time, the inner circumferences of the mounting holes 27e and 27f are supported by the body portion 141a and the screw portion 141c of the inflator 141. The airbag 26A is mounted on the knee panel 116 by using the inflator 141, which is housed in the housing portion 123.

The following is a description of the installation of the airbag device S4 on the vehicle. Like the airbag 26 in the air bag device S1 of the first embodiment, the airbag 26A is first folded. The airbag 26A is wrapped, after being folded, with the unillustrated breakable wrapping film so that it will not become loose. After this, the airbag 26A is housed in the housing portion 123 such that the mounting holes 127 and 27e and the mounting holes 128 and 27f match each other. The wrapping film is broken in advance at the portions of the mounting holes 27e and 27f.

After this, the end of the inflator 141 corresponding to the screw portion 141c is inserted from the mounting holes 127 and 27e into the airbag 26A, which is housed in the housing portion 123. The nut 142 is fastened on the screw portion 141c, which protrudes from the mounting holes 27f and 128, and the end of the body portion 141a that corresponds to the screw portion 141c is pushed through the periphery of the mounting hole 27e of the airbag 26A to contact with the inner circumference of the housing portion 123. Then, the inflator 141 and the airbag 26A can be mounted in the housing portion 123.

Then, the airbag cover 130 is mounted on the knee panel 116. For this, as shown in FIGS. 25 and 26, the mounting members 133 are inserted at first into the corresponding through holes 119 from the rear side of the knee panel 116. Simultaneously, the rounded rod-shaped head portions 132a of the mounting leg portions 132 are inserted into the corresponding mounting holes 120.

At this time, the individual mounting members 133 are elastically deformed to separate from the housing portion 123, as indicated by double-dotted lines in FIGS. 25 and 26, by engaging curved guide faces 125b on the rear side of the retaining hook portions 125a of the hooks 125. When the retaining holes 133a meet the positions of the retaining hook portion 125a, the mounting members 133 are restored, and the retaining hook portions 125a are fitted into the retaining holes 133a. In other words, the periphery of the retaining holes 133a is automatically held by the object-catching tips 125a merely by inserting the mounting members 133 into the through holes 119.

The head portions 132a of the mounting leg portions 132 that protrude from the individual mounting holes 120 are heated and thermally caulked to larger diameters, and the root portions 132b of the mounting leg portions 132 abut against the periphery of the mounting holes 120, so that they are retained on the periphery of the mounting holes 120 on the front face of the body portion 117 of the knee panel 116. As a result, the airbag cover 130 can be mounted on the knee panel 116 to form the airbag assembly SA2.

When the airbag assembly SA2 is connected by fastening the individual joining members 121 of the body portion 117 on the brackets 103 and 104 on the body 101 by the bolts 129, the knee protecting airbag device S4 is then mounted on the vehicle.

After the airbag device S4 is mounted on the vehicle, the lead wire 144 is connected with the airbag activating circuit, and the upper panel 112a and the lower panel 112b of the dashboard 112 and an under cover 114 (see FIGS. 17 and 18) are mounted on the vehicle.

Figure 27A:
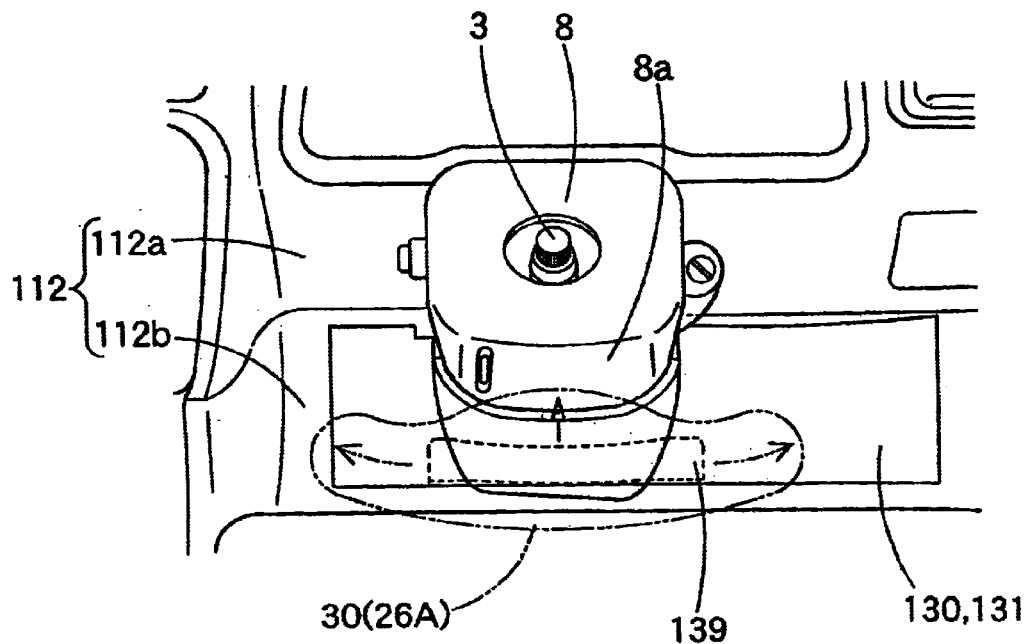
FIG. 27A is a schematic front elevation view taken from the rear of the vehicle for illustrating the extension and expansion of the airbag in the knee protecting airbag device of the fourth embodiment.
Figure 27B:
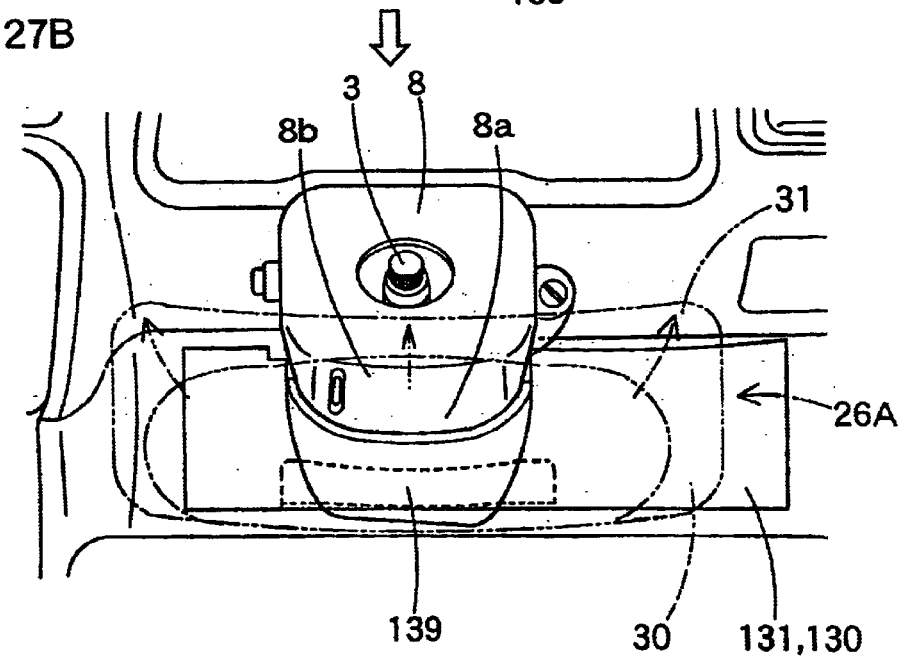
FIG. 27B is a schematic front elevation view taken from the rear of the vehicle for further illustrating the extension and expansion of the airbag in the knee protecting airbag device of the fourth embodiment.
Figure 28:
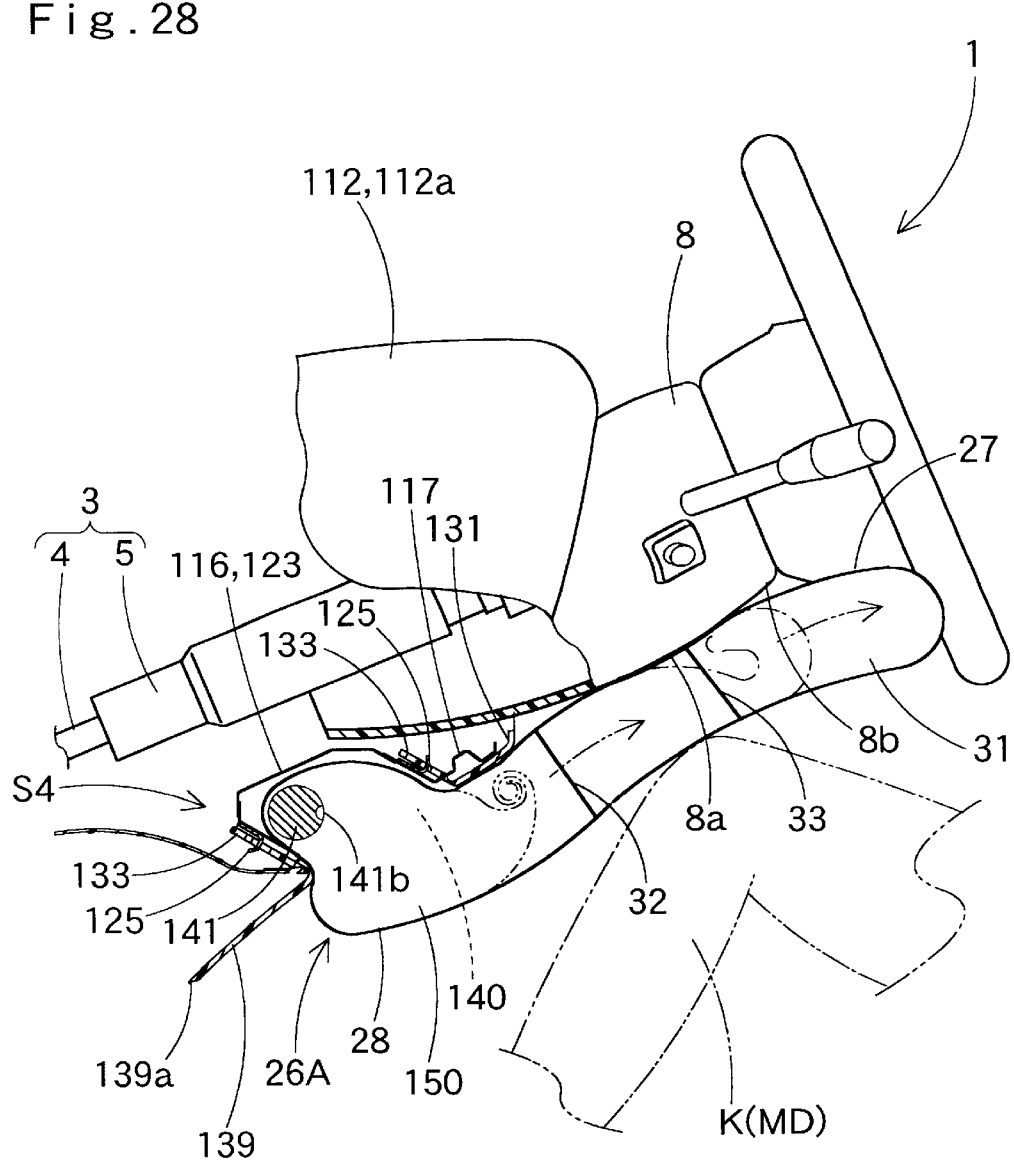
FIG. 28 is a schematic vertical section view where the plane of the section extends in the longitudinal direction of the vehicle showing the state in which the airbag has completed its extension and expansion in the knee protecting airbag device of the fourth embodiment.

If the predetermined electric signal is inputted to the inflator 141 after the airbag device S4 is mounted on the vehicle, the inflating gas G is discharged from the gas discharge ports 141b to inflate the airbag 26A. Then, the airbag 26A breaks the unillustrated wrapping film and pushes the door portion 139 of the airbag cover 130 thereby to break the breakaway portion 135, so that the door portion 139 is opened downward about the hinge portion 137. As a result, the airbag 26A protrudes rearward from the opening 123a of the housing portion 123 through an opening 140 of the airbag cover 130. The airbag 26A extends and expands largely upward (see FIGS. 27 and 28) along the column cover lower face 8a while being transversely and vertically unfolded.

At the airbag cover 130 in the airbag device S4 of this embodiment, the mounting members 133 located near the periphery of the opening 123a in the general portion 131 are mounted on the housing portion 123 through the through holes 119 of the knee panel 116. During the extending and expanding of the airbag 26A, therefore, the breakaway portion 135 and the hinge portion 137 of the general portion 131 at the portions near the periphery of the opening 123a hardly move relative to the housing portion 123. As a result, the pushing force of the airbag 26A acts properly to break the breakaway portion 135 smoothly. In addition, the hinge portion 137 for providing the pivot when the door opens hardly moves relative to the housing portion 123, so that it can stabilize the opening action of the door portion 139. Therefore, the door portion 139 can smoothly open when pushed by the airbag 26A, even if the airbag cover 130 is made of a synthetic resin such as a thermally plastic elastomer.

In the fourth airbag device S4, therefore, the door portion 139 can be smoothly opened by the pushing force of the airbag 26A, even when the airbag cover 130, which has the integrated door portion 139, is mounted on the knee panel 116 (which serves as the holding member) in front of the knees K of the driver MD.

To provide smooth breakage of the breakaway portion 135 and the smooth opening action of the door portion 139, the mounting members 133 may be arranged at the periphery of the opening 123a in the vicinity of the breakaway portion 135 on the leading edge 139a side of the opening door portion 139, which is opposite to the hinge portion 137, and in the vicinity of the hinge portion 137.

However, the smooth breakage of the breakaway portion 135 and the stable opening action of the door portion 139 can be better provided, if the mounting members 133 are arranged on the entire periphery of the generally rectangular opening 123a in the housing portion 123 as in the illustrated embodiment.

In the case of the illustrated embodiment, one door portion 139 is opened to allow the airbag 26A to protrude from the opening 140. However, the shape of the door portion should not be so limited, and the opening 123a of the housing portion 123 may be covered with two door portions such as double-hinged doors. In this case, the breakaway portion is arranged in the shape of the letter "H," either upright or rotated ninety degrees, as viewed from the rear of the vehicle. In such a case, the hinge portions are arranged between the ends of the vertical lines of the letter "H". If the breakaway portion is formed in the shape of the letter "H" when rotated by ninety degrees, the hinge portions are arranged between the ends of the horizontal lines of the character. In these cases, it is desired that the mounting members are arranged at least on the periphery of the housing opening in the vicinity of the hinge portions.

If the mounting members 133 are arranged only one side of the periphery of the opening 123a of a generally rectangular shape (e.g., on the side of the wall portions 124a and 124b), one suitably enlarged mounting member 133 may be arranged such that it can provide the mounting strength. Alternatively, a plurality of mounting members 133 may be employed (on the upper side or lower side of the periphery of the opening 123a).

Furthermore, the individual mounting members 133 of the airbag cover 130 of the illustrated embodiment are merely inserted into the through holes 119 in the periphery of the opening 123a of the knee panel 116 so that the body portion 117 of the knee panel 116 is not reduced in its frontal area. Thus, in an unexpanded state of the airbag 26A, even if the two knees K (KL and KR) of the driver MD interfere with the body portion 117, the knee panel 116 can engage the two left and right knees KL and KR over a wide area. In this mode, the body portion 117 of the knee panel 116 can support the front side of the airbag 26A when the airbag 26A has completed its expansion through the general portion 131 of the airbag cover 130, so that the airbag 26A, when expanded, is supported in a stable manner by the body portion 117 of the knee panel 116.

In the knee protecting airbag device S4 of the fourth embodiment, the airbag 26A, the inflator 141, the airbag cover 130 and the knee panel 116 can be integrated in advance into the airbag assembly SA2. If the airbag assembly SA2 is formed in advance, therefore, the airbag 26A and its associated parts can be transported and stored in the assembled state. As a result, the individual members are easily handled before they are mounted on the vehicle.

In the airbag device S4 of the fourth embodiment, the individual hooks 125 of the housing portion 123 are inserted into the retaining holes 133a of the individual mounting members 133 of the airbag cover 130 to retain the mounting members 133 with the retaining hook portions 125a, so that the mounting members 133 can be completely mounted on the housing portion 123. It is, therefore, possible to reduce the number of steps of and the cost of mounting the airbag cover 130 on the knee panel 116. Especially since, in the illustrated embodiment, the individual mounting members 133 are automatically fastened merely by inserting them into the through holes 119, and the periphery of the retaining holes 133a are retained on the retaining hook portions 125a so that the number of mounting steps is reduced. If this method is not used, the individual mounting members 133 may be mounted on the housing portion 123 by using bolts, nuts or rivets without providing the hooks 125.

In the airbag device S4 of the fourth embodiment, the brackets 103 and 104, which act as energy absorbing members, are arranged on the body 101 for connecting the joining portions 121 of the knee panel 116. When the airbag 26A is completely depressed so that the kinetic energy of the knees K cannot be further absorbed by the airbag 26A, the brackets 103 and 104 are plastically deformed to absorb the forward kinetic energy of the knees K. The brackets 103 and 104 are plastically deformed in the unexpanded state of the airbag 26A, even if the knees K of the driver MD interfere with the knee panel 116. Therefore, the knees K of the driver MD can be properly protected by lessening the impact.

Figure 29:
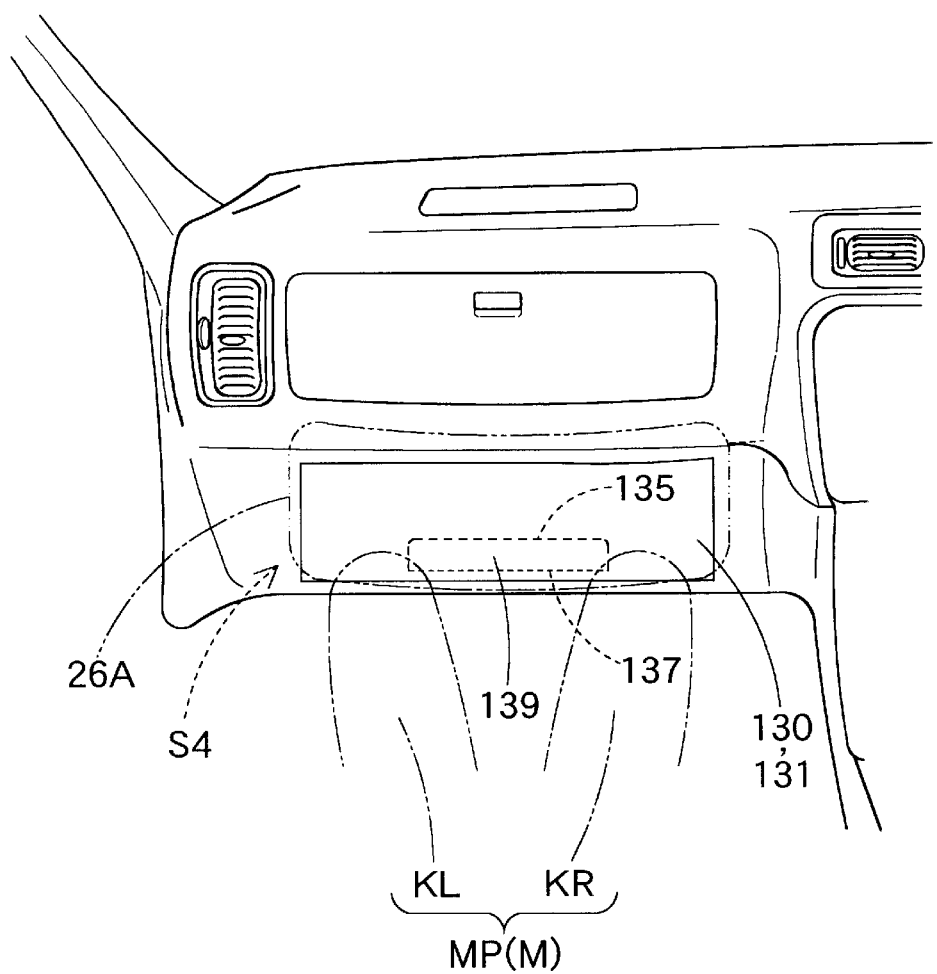
FIG. 29 is a schematic front elevation view taken from the rear of the vehicle showing the state in which the knee protecting airbag device of the fourth embodiment is arranged in front of the passenger's seat.

The fourth embodiment has been described by exemplifying the airbag device S4, which is in front of the seated driver MD to protect the knees K of the driver MD. In order to protect the knees of the passenger MP seated on the passenger's seat, however, the airbag device S4 may be in front of the passenger MP seated on the passenger's seat, as shown in FIG. 29.

The following is a description of a knee protecting airbag device S5 that is capable of achieving the third object of the present invention.

Figure 30:
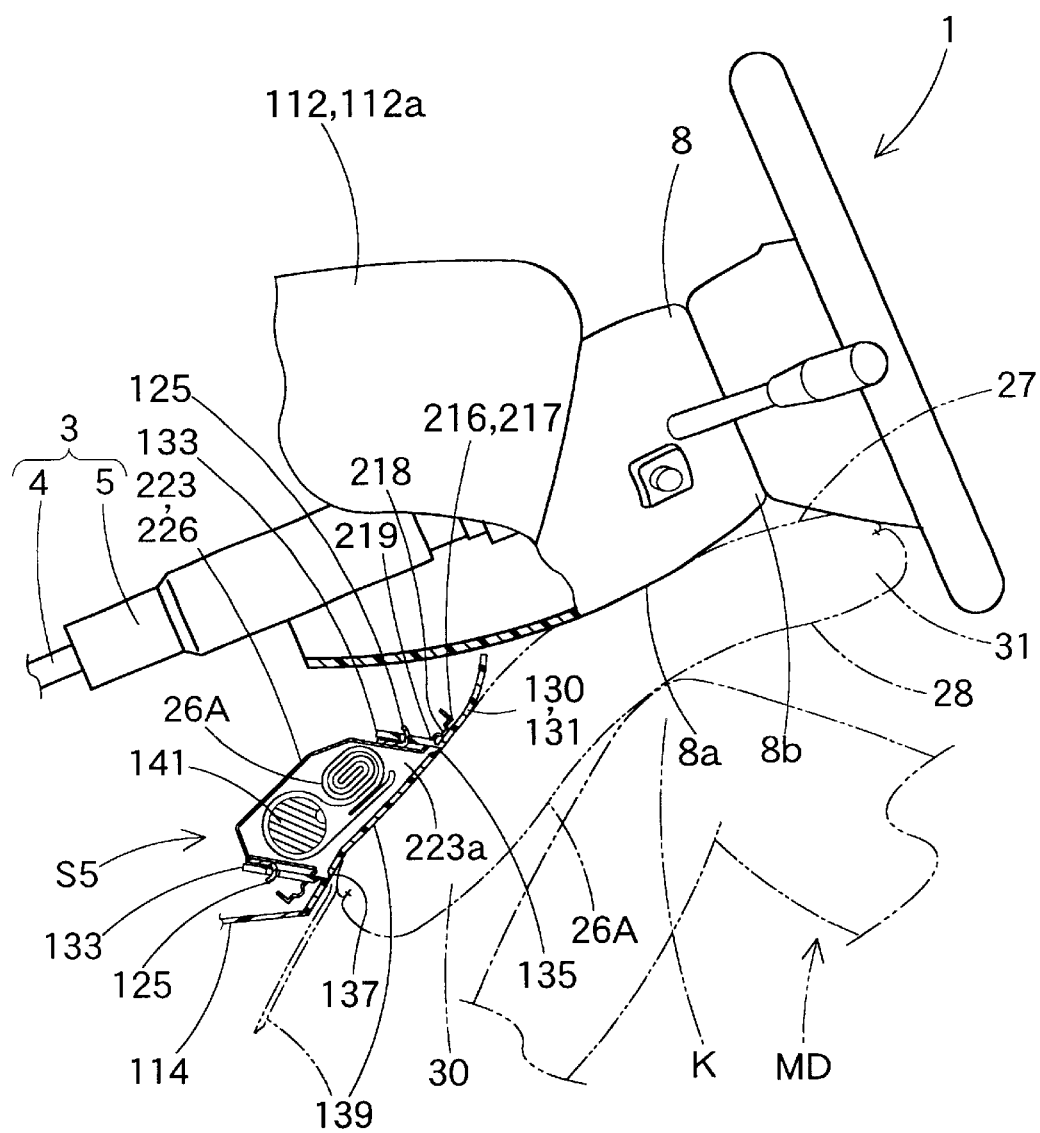
FIG. 30 is a schematic vertical section view in which the plane of the section extends in the longitudinal direction of the vehicle showing the operation of a knee protecting airbag device according to a fifth embodiment of the invention.
Figure 31:
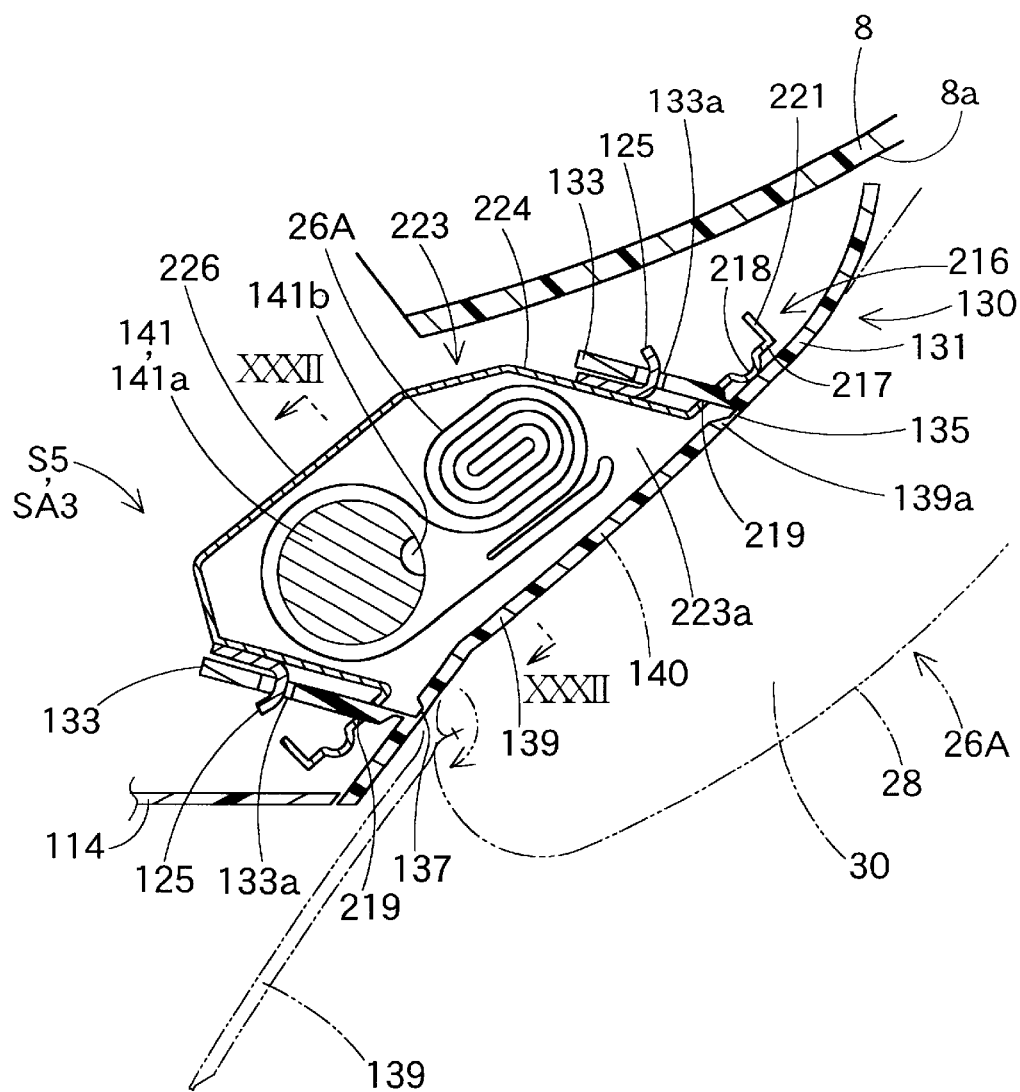
FIG. 31 is a schematic vertical section view of the knee protecting airbag device of the fifth embodiment, where the plane of the section extends in the longitudinal direction of the vehicle.

As shown in FIG. 30, the construction of this airbag device S5, other than the knee panel 216, which serves as the holding member, is similar to that of the airbag device S4 of the fourth embodiment. Therefore, common members will not be described and will be referred to by common reference numerals.

The knee protecting airbag device S5 comprises the folded knee protecting airbag 26A, the inflator 141, a case 223 for housing the airbag 26A and the inflator 141, the airbag cover 130 for covering the vehicle rear side in the opening 223a of the case 223, and a knee panel 216. The case 223 is provided with the opening 223a which allows the airbag 26A, when extending and expanding, to protrude toward the rear. In the illustrated embodiment, an airbag assembly SA3, or airbag module, comprises the airbag 26A, the inflator 141 and the case 223 (or the knee panel 216) and the airbag cover 130. In this embodiment, the case 223 is formed integrally with the knee panel 216 by pressing one metal sheet. Of course, the case 223 and the knee panel 216 may be formed separately and assembled by using bolts, nuts and rivets or welding.

The case 223 is formed into a bottomed box shape having a rear-facing opening 223a, as shown in FIGS. 31, 32, 34 and 35. In this embodiment, the case 223 is formed into a generally parallelepiped box shape including a bottom wall portion 226 of a generally rectangular shape and a peripheral wall portion 224 of a generally rectangular tubular shape. In the peripheral wall portion 224 of the case 223, mounting holes 227 and 228, one made large and one made small, for mounting the inflator 141, are arranged in wall portions 224a and 224b, which are spaced apart in the transverse direction. The mounting hole 227 is formed to receive the body portion 141a of the inflator 141 and can support the outer circumference of the body portion 141a on its inner circumference. The mounting hole 228 is given an internal diameter that is too small for the body portion 141a of the inflator 141 but can allow the threaded portion 141c of the inflator 141 to pass. The inflator 141 is mounted in the case 223 in the same way that it is mounted in the housing portion 123 in the airbag device S4 of the fourth embodiment.

The hooks 125 are fixed on the peripheral wall portion 224 as in the housing portion 123 in the airbag device S4 of the fourth embodiment.

The knee panel 216, or holding member, comprises, as shown in FIGS. 31 to 35, a plate-shaped portion 217 and four mounting portions 222. The plate-shaped portion 217 extends vertically and transversely from the periphery of the opening 223a of the case 223. The plate-shaped portion 217 is formed into generally rectangular shape to cover widely the area in front of the left and right knees K (KL and KR) of the seated driver MD. The plate-shaped portion 217 is arranged on the front side in the region of the lower expansion portion 30 of the airbag 26A, when the airbag 26A has completed its expansion. The individual mounting portions 222 are arranged at the four corners of the periphery of the plate-shaped portion 217.

From the periphery of the opening 223a to the outer periphery of the plate-shaped portion, there are formed ribs 218 for improving the bending rigidity of the plate-shaped portion 217. In the case of the illustrated embodiment, the ribs 218 are formed into a U-shaped cross section and are formed integrally with the plate-shaped portion 217 by pressing it. The ribs 218 support the general portion 131 of the airbag cover 130 on the rear-facing side.

The plate-shaped portion 217 is bent forward at its outer periphery and is provided with a flange portion 221 for improving its bending rigidity.

The ribs 218 and the flange portion 221 are constructed by setting the number, shapes and positions to shorten the deformation stroke of the plate-shaped portion 217 at the time the plate bends forward to absorb the kinetic energy of the knees K smoothly. In the case of the illustrated embodiment, the bending deformation load of the plate-shaped portion 217 is set such that the plate-shaped portion 217 may start plastic deformation when the airbag 26A is pushed flat at one portion by the knees K against its internal pressure, when expanded. At this time, the vehicle side wall portion 27 of the airbag 26A comes into abutment against the general portion 131 of the airbag cover 130, and the passenger side wall portion 28 comes into contact with the column cover side wall portion 27.

In the periphery of the opening 223 in the plate-shaped portion 217, on the other hand, there are formed a plurality of through holes 219. The individual mounting members 133 of the airbag cover 130 are inserted into the through holes 219 to retain the mounting members 133 on the individual hooks 125.

In the left and right sides, apart from the case 223, in the plate-shaped portion 217, there are mounting holes 220. The mounting holes 220 are for attaching the airbag cover 130 to the knee panel 216 by thermal caulking, as described above. The airbag cover 130 is mounted on the knee panel 216 like the airbag cover 130 mounted on the knee panel 116 in the airbag device S4 of the fourth embodiment.

Figure 32:
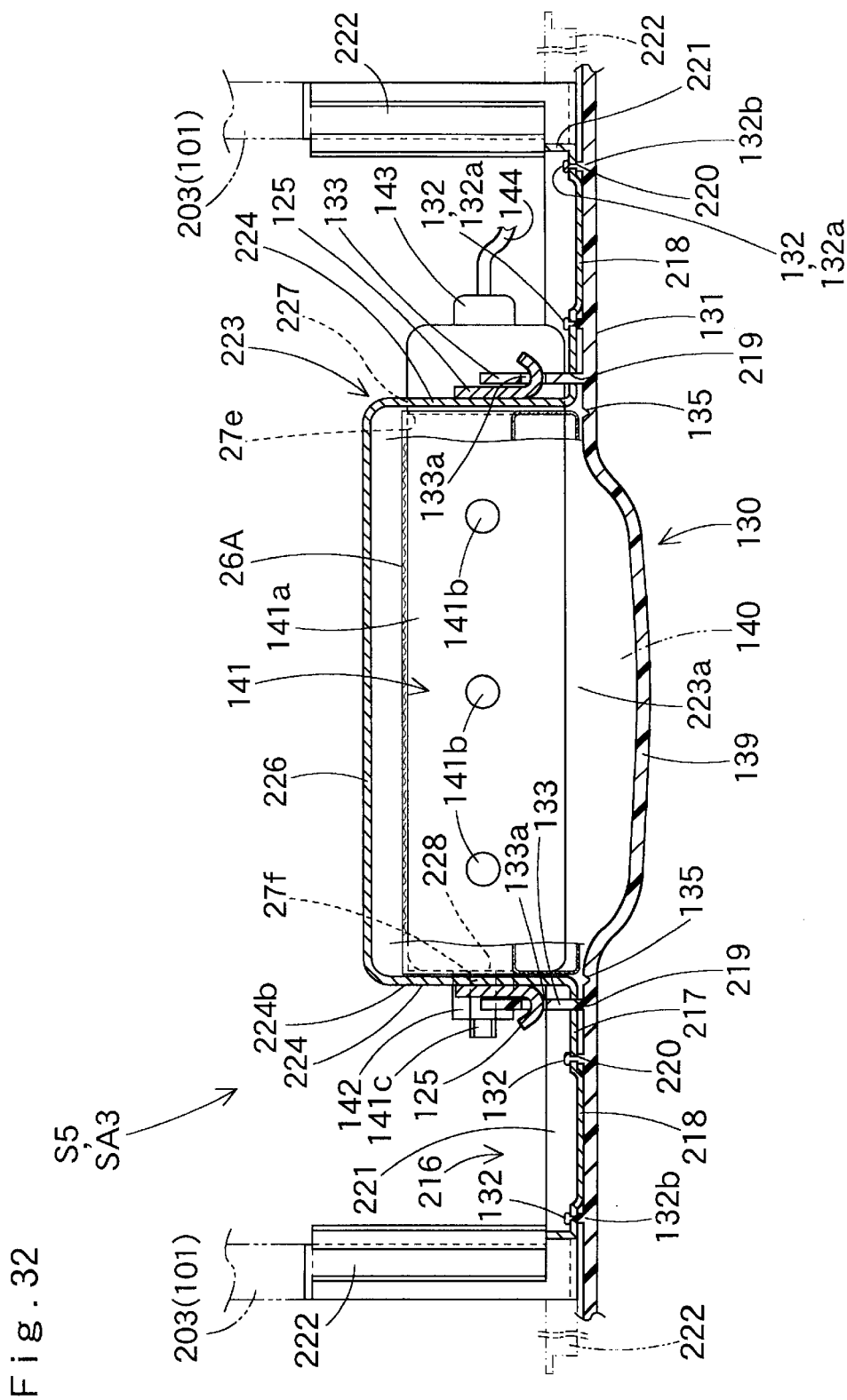
FIG. 32 is a schematic section view taken along the plane XXXII—XXXII of FIG. 31.
Figure 33:
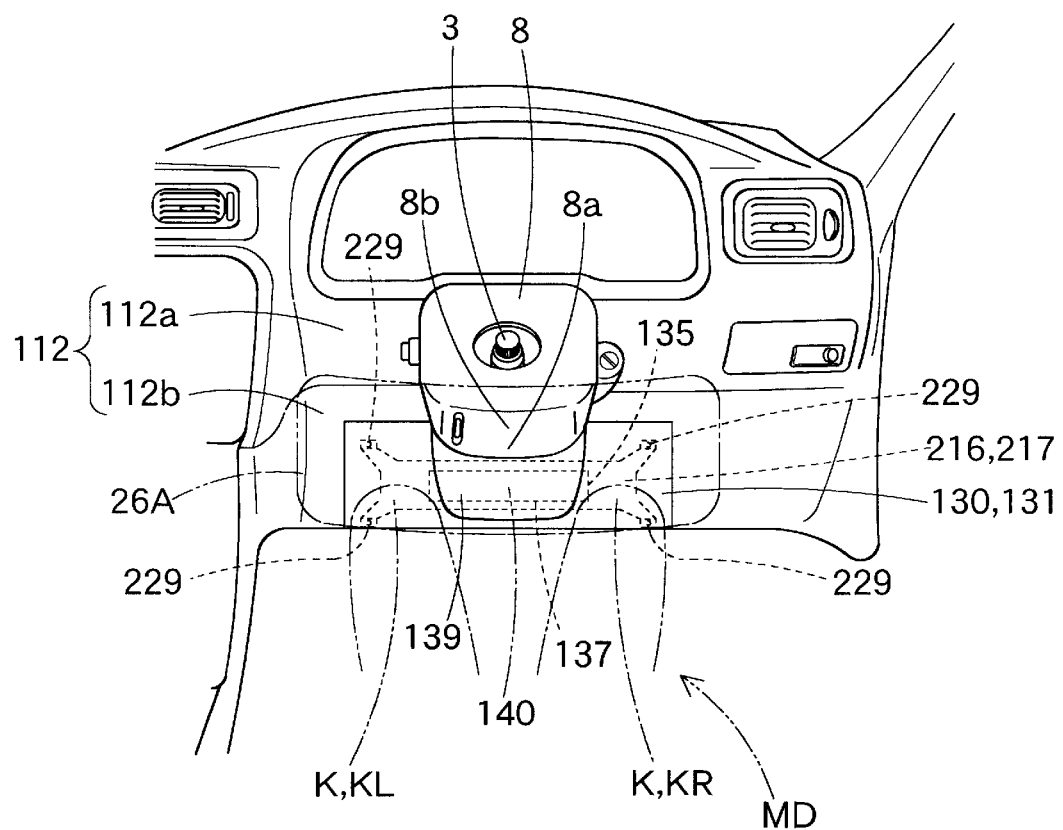
FIG. 33 is a schematic front elevation view taken from the rear side of the vehicle showing the operation of the knee protecting airbag device of the fifth embodiment.
Figure 34:
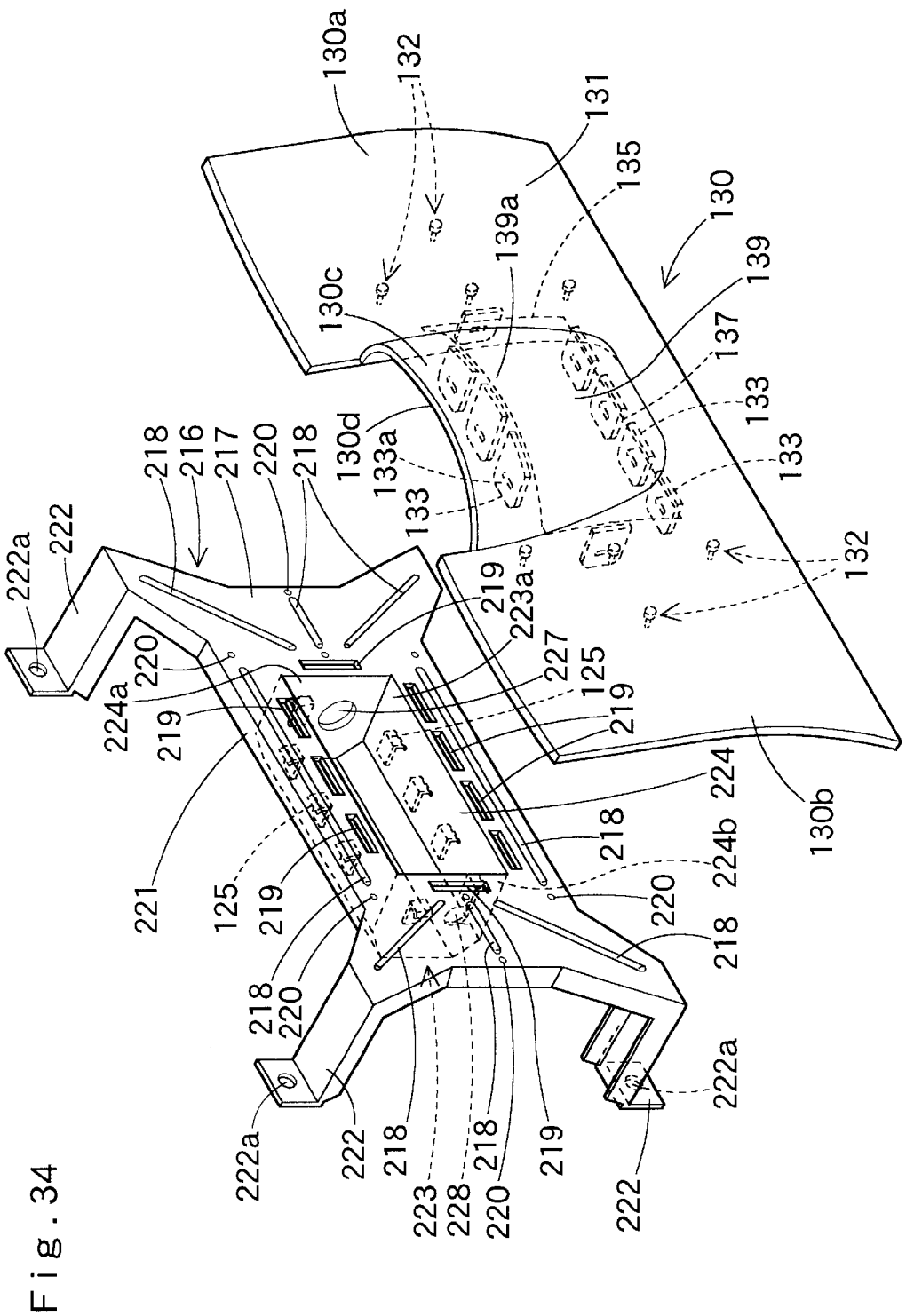
FIG. 34 is an exploded perspective front view of a knee panel to be used as a holding member and an airbag cover in the fifth embodiment.
Figure 35:
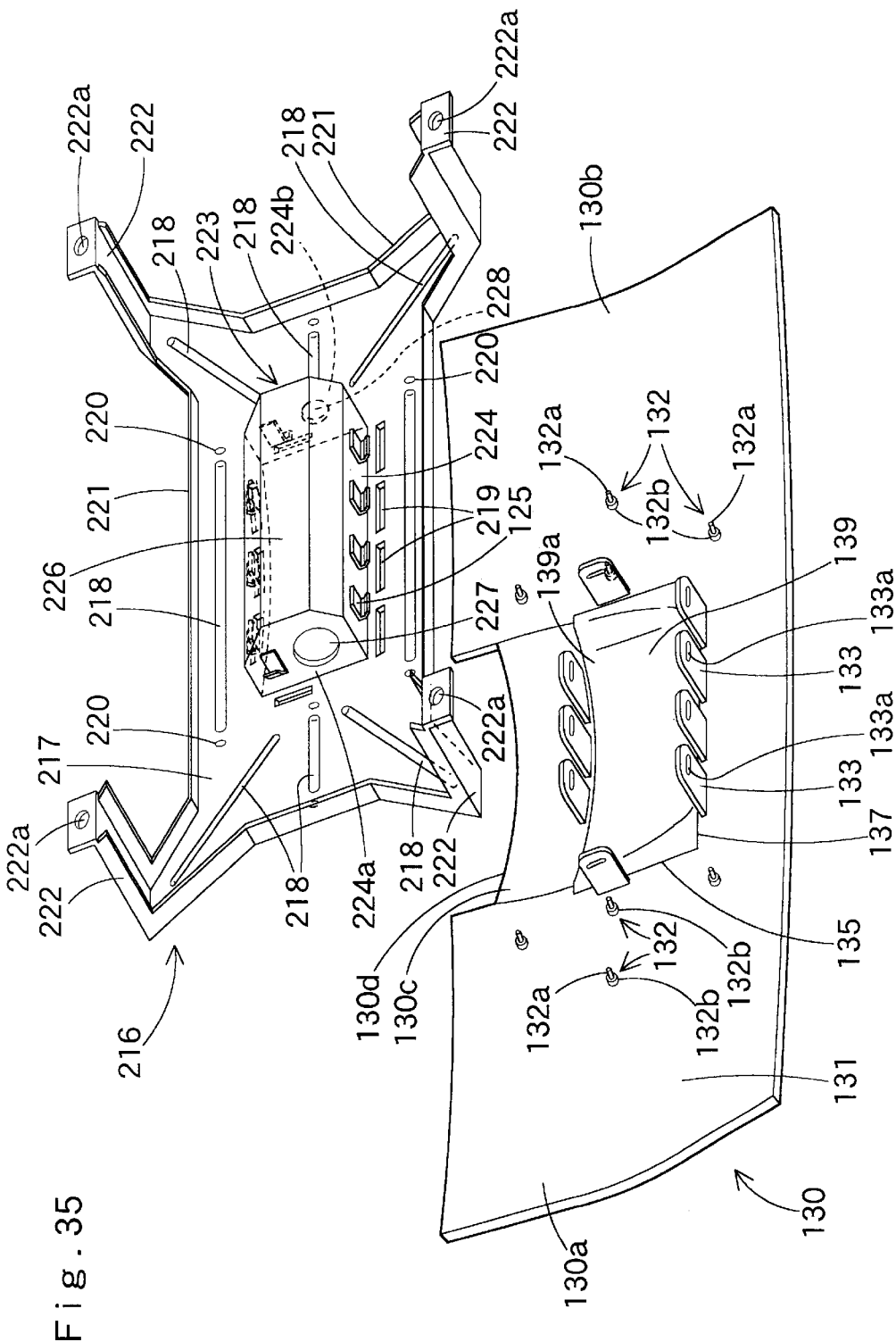
FIG. 35 is a rear exploded perspective view of a knee panel to be used as the holding member and an airbag cover in the fifth embodiment.
Figure 36:
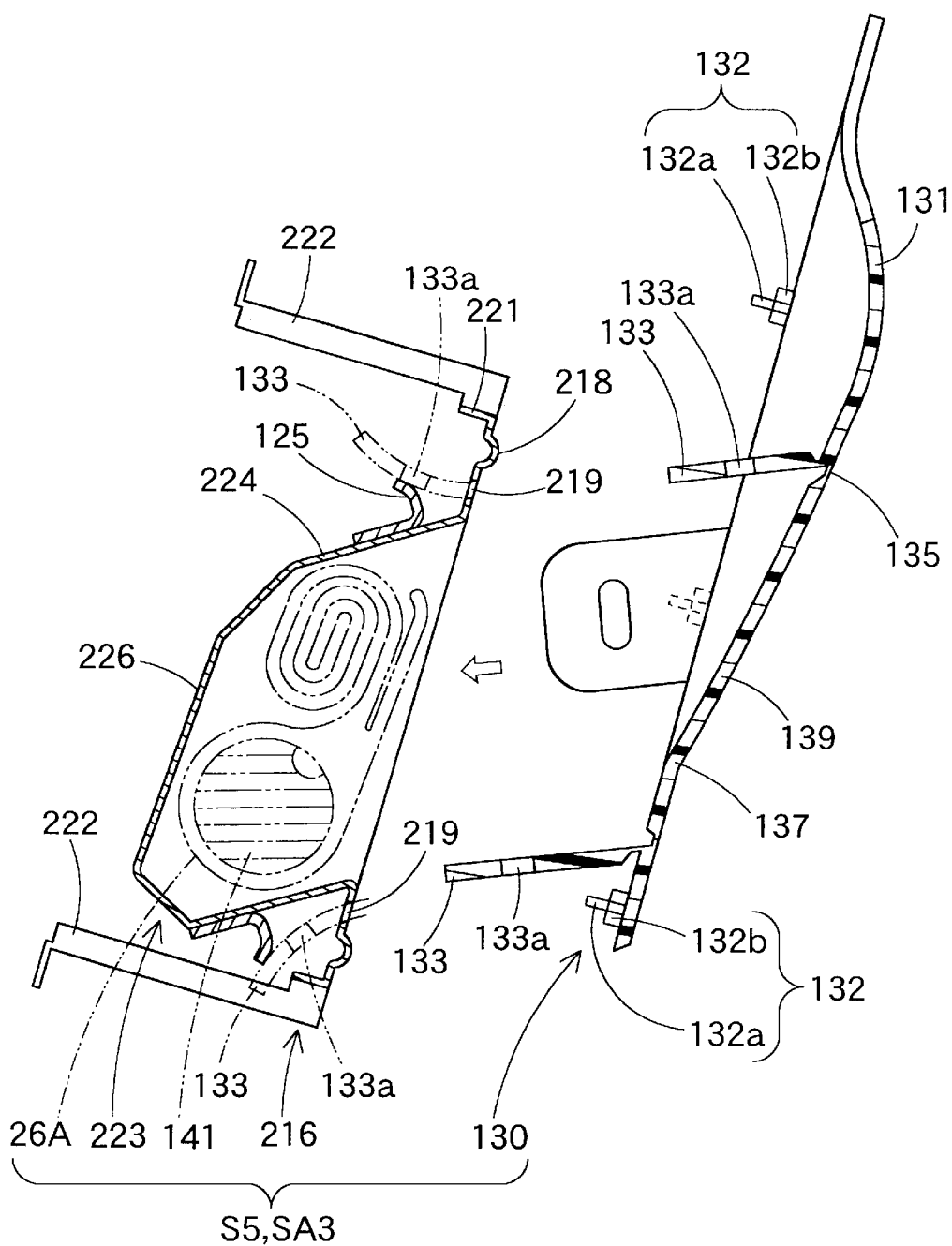
FIG. 36 is a cross sectional view showing the state in which the airbag cover of the fifth embodiment is mounted on the knee panel, and the knee panel serves as the holding member.
Figure 37A:
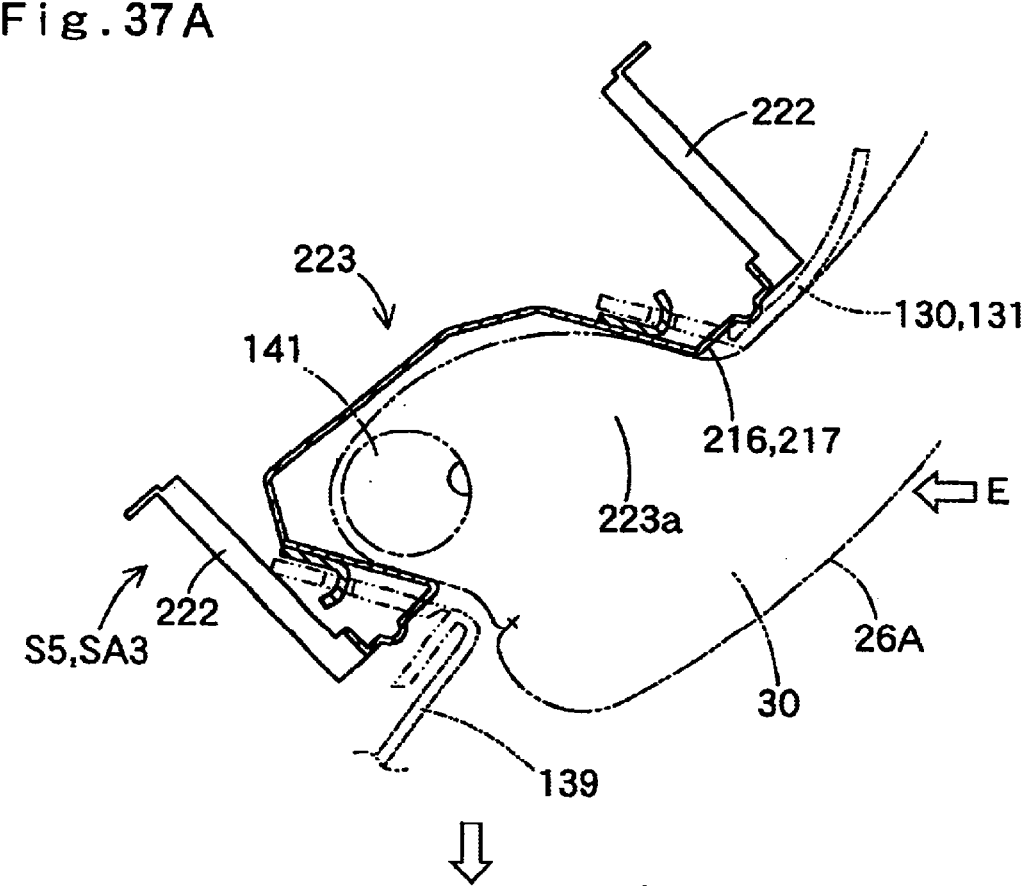
FIGS. 37A and 37B are schematic cross sectional views for illustrating the deformed state of the plate portion of the knee panel of the fifth embodiment.
Figure 37B:
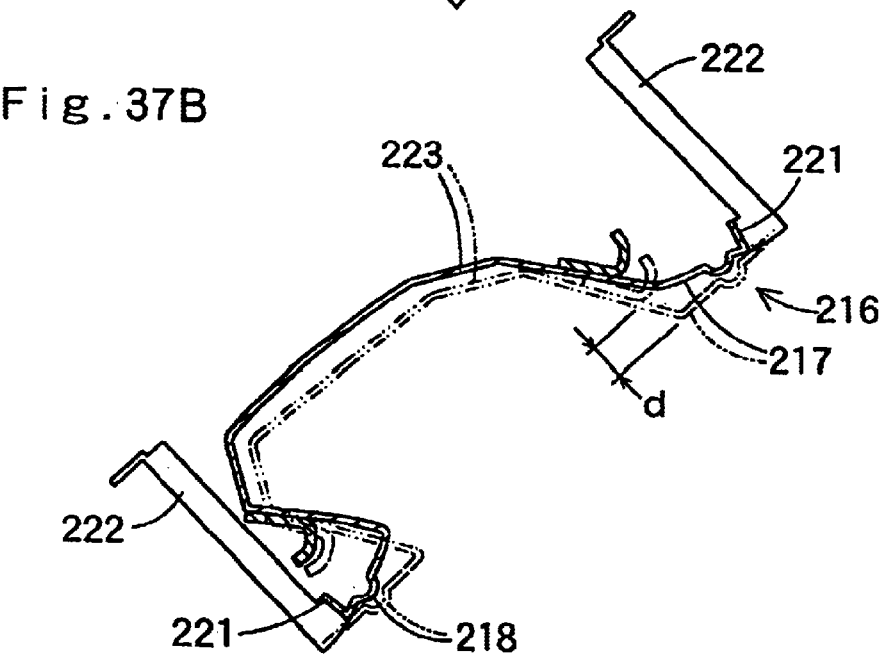

Each of the mounting portions 222 of the knee panel 216 is provided with a joint hole 222a for mounting it on the body 101 by a bolt 229 (FIG. 33). On the body 101 for mounting the mounting portions 222, there are arranged brackets 203 (FIG. 32). The brackets 203 are connected to rigid portions such as the unillustrated dashboard reinforcement, center brace or front body pillar of the body 101.

The airbag device S5 can be mounted on the vehicle like the airbag device S4 of the fourth embodiment. Specifically, the airbag 26A and the inflator 141 are mounted in the case 223, and the airbag cover 130 is mounted on the knee panel 216 like the airbag device S4. As a result, the airbag assembly SA3 is an airbag module.

When the individual joining members 222 of the plate-shaped portion 217 in the knee panel 216 are connected to the brackets 203 on the body 101 by the bolts 229, the knee protecting airbag device S5 is mounted on the vehicle.

In the airbag device S5 of the fifth embodiment, when the airbag 26A is extended and expanded, the knees K are cushioned by the expanded lower expansion portion 30. At this time, if the lower expansion portion 30 of the airbag 26A is flattened at one position so that the kinetic energy E of the knees K cannot be completely absorbed by the lower expansion portion 30, the plate-shaped portion 217 of the knee panel 216, which serves as the holding member, receives the pushing force of the knees K through the airbag 26A and through the general portion 131 of the airbag cover 130. As a result, the plate-shaped portion 217 of the knee panel 216 is plastically bent and deformed to absorb the excessive kinetic energy of the knees K.

The plate-shaped portion 217 of the knee panel 216 extends from the periphery of the opening 223a of the case 223 so that it may be arranged toward the front of the vehicle in the area of the lower expansion portion 30 of the airbag, when the airbag has completed its expansion. Therefore, the kinetic energy of the knees K can be properly absorbed by the plate-shaped portion 217 through the lower expansion portion 30 of the airbag 26A, when the airbag has completed its expansion.

Of course, the plate-shaped portion 217 of the knee panel 216 is extended from the periphery of the opening 223a of the case 223 such that it is arranged toward the front of the vehicle in the area of the lower expansion portion 30 upon completion of the expansion. In other words, the plate-shaped portion 217 of the knee panel 216 is arranged with a large flat area vertically and transversely. Even with a small deformation stroke d at the time of absorbing the kinetic energy E, therefore, the kinetic energy of the knees K can be sufficiently absorbed by the plate-shaped portion 217 of the knee panel 216.

In the knee panel 216, which serves as the holding member, the portions to be fixed on the vehicle body are the mounting portions 222 arranged near the periphery of the plate-shaped portion 217, and the mounting portions 222 do not obstruct the deformation of the plate-shaped portion 217.

The plate-shaped portion 217 of the knee panel 216 does not extend longitudinally, like the mounting brackets of the prior art. Specifically, the plate-shaped portion 217 of the knee panel 216 is extended from the periphery of the opening 223a of the case 223 and arranged in the flat shape vertically and transversely such that it may be arranged toward the vehicle front in the area of the airbag lower expansion portion 30, upon completion of the airbag expansion. Even if there is less space in front of the airbag assembly SA3, therefore, it is easy to install the airbag assembly SA3.

In the knee protecting airbag device S5 of the fifth embodiment, therefore, the kinetic energy E of the knees K can be absorbed, even when such energy cannot be received by the airbag 26A, and the degree of mounting freedom on the vehicle can be improved.

In the airbag device S5 of the fifth embodiment, the ribs 218, which are capable of adjusting the absorption quantity of the kinetic energy by the knees K, are arranged on the plate-shaped portion 217 of the knee panel 216, and the flange portion 221, which is capable of adjusting the absorption quantity of the kinetic energy of the knees K, is also arranged on the periphery of the plate-shaped portion 217. By setting the number, shapes and positions of the ribs 218 and the flange portion 221, the absorption quantity of the kinetic energy can be easily adjusted to match the deformation stroke or the like of the plate-shaped portion 217.

In the illustrated embodiment, the mounting portions 222 of the knee panel 216 are formed to extend forward from the vicinity of the periphery of the plate-shaped portion 217. However, the mounting portions 222, which are arranged near the periphery of the plate-shaped portion 217 in the knee panel 216, need not be extended much forward from the periphery of the plate-shaped portion 217. If the airbag assembly SA3 can be mounted and fixed on a predetermined portion of the vehicle body, it can be arranged to extend transversely from the periphery of the plate-shaped portion 217, as indicated by double-dotted lines in FIG. 32, so that it can be located at a rigid portion such as the unillustrated dashboard reinforcement, center brace or front body pillar on the body 101. In this case, the airbag device S5 can be made shorter and more compact in the longitudinal direction of the vehicle to improve the degree of freedom for mounting on the vehicle.

In this embodiment, the plate-shaped portion 217 of the knee panel 216 is plastically bent and deformed at the time of absorbing the kinetic energy of the knees K. However, the mounting portion 222 may be constructed to buckle and be deformed such that the knee panel 216 can absorb more energy. In addition, the plate-shaped portion 217 may be modified to absorb the kinetic energy of the knees K not by plastic deformation but instead by brittle fracture, by employing a brittle material.

The fifth embodiment has been described by exemplifying the airbag device S5, which is located in front of the driver MD to protect the knees K of the driver MD. In order to protect the knees of the passenger of the passenger's seat, however, the airbag device S5 may be arranged at a position in front of the passenger seated on the passenger's seat.

The following is a description of knee protecting airbag devices S6 to S8, which are capable achieving the fourth object of the invention.

The construction of the vehicle for mounting the knee protecting airbag device S6 of the sixth embodiment is similar to that of the aforementioned airbag device S1 of the first embodiment, except for a dashboard 312. Therefore, the common members will not be described and will given common reference numerals.

The knee protecting airbag device S6 of the sixth embodiment is arranged below the steering column 3 on the front side of the driver MD, as shown in FIGS. 38 to 41, so that it is able to protect the knees K of the driver MD or the passenger M.

The knee protecting airbag device S6 comprises a folded airbag 26B, an inflator 337, a case 315 for housing the folded airbag 26B and the inflator 337, and an airbag cover 322. The case 315 is opened toward the rear of the vehicle.

The case 315 is made of a sheet metal. The case 315 includes a peripheral wall portion 316 of a generally rectangular tubular shape and a bottom wall portion 318 for closing the front side of the peripheral wall portion 316. On the outer peripheral faces of wall portions 316a and 316b, which are vertically opposite to each other, there are fixed a plurality of hooks 317, each of which roughly has a C-shape. Each of these hooks 317 has a retaining hook portion 317a at the top end. The retaining hook portion 317a is pointed toward the bottom wall portion 318. In this embodiment, four hooks 317 are arranged on the wall portion 316a, and three hooks 317 are arranged on the wall portion 316b. In the wall portion 316c of the peripheral wall portion 316, there is an insert hole 316e, which can hold the end portion of the later-described body 338 of the inflator 337 (see FIG. 40). In the bottom wall portion 318, there are insert holes 318a for receiving the later-described bolts 339f of the inflator 337. The case 315 is connected and fixed to the unillustrated dashboard reinforcement, which is arranged near the steering column 3, by using unillustrated brackets.

Figure 39:
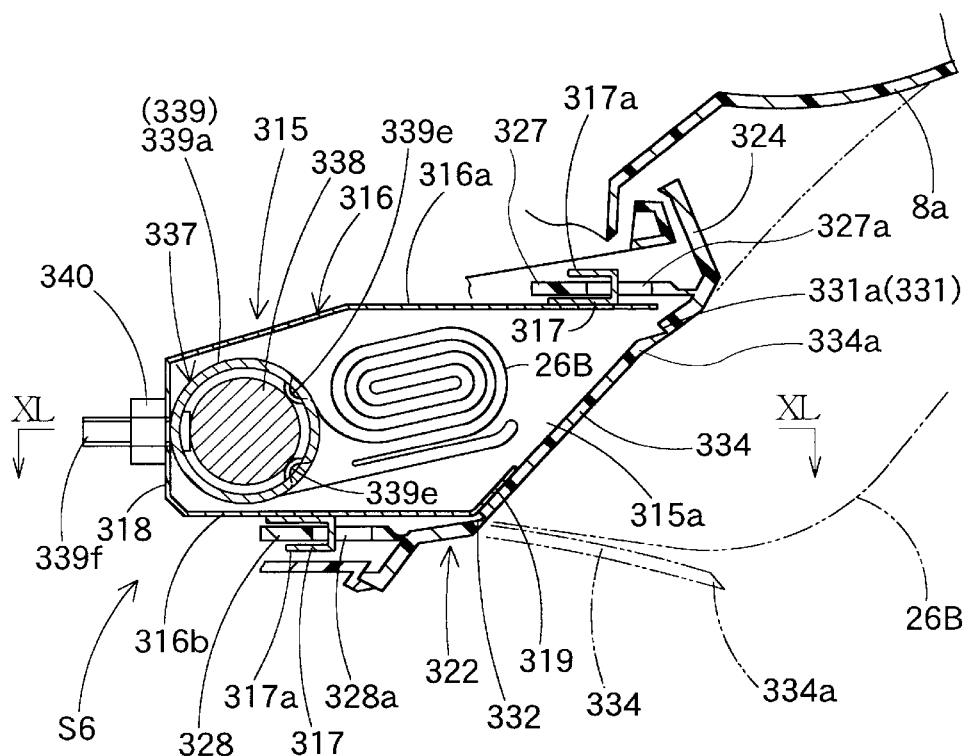
FIG. 39 is a schematic vertical section view of the knee protecting airbag device of the sixth embodiment where the plane of the section extends in the longitudinal direction of the vehicle.

Near the later-described door portion 334 of the airbag cover 322 in the case 315, there is a guide wall portion 319, which serves as extension promoting means. The guide wall portion 319 is constructed to extend from the rear edge of the wall portion 316b and to cover the lower side of the opening 315a. The guide wall portion 319 is arranged, as shown in FIG. 39, along the door portion 334 of the airbag cover 322. Specifically, the guide wall portion 319 is inclined to obliquely intersect a plane perpendicular to the longitudinal axis of the vehicle.

The airbag cover 322 is made of a thermoplastic elastomer such as polyolefin. The airbag cover 322 covers the rear side of the case 315.

The airbag cover 322 is arranged on the periphery of the column cover 8 on a lower panel 312b of the dashboard 312. The airbag cover 322 covers the lower periphery of the column cover 8, which protrudes from the dashboard 312. Therefore, as viewed from the rear of the vehicle, the airbag cover 322 protrudes downward with the column cover 8 and rearward. The airbag cover 322 is curved to match the curved face of the column cover lower portion 8a. Furthermore, the airbag cover 322 is integrally formed by an injection molding method or the like to include the door portion 334 for covering the opening 315a of the case 315 and a general portion 324 arranged around the door portion 334.

The door portion 334 is formed into a generally rectangular plate shape that is slightly larger than the opening 315a, for covering the opening. The door portion 334 includes a hinge portion 332 at its lower end for pivoting when the door portion opens. The door portion 334 has a thin breakaway portion 331 located along at an inverted U-shape portion of the outer periphery, However, the thin breakaway portion 331 does not include the hinge portion 332. The door portion 334 is inclined to intersect a vertical plane that is perpendicular to the longitudinal axis of the vehicle. In the door portion 334, more specifically, the upper end 334a is arranged toward the rear of the vehicle, and the hinge portion 332 is arranged toward the front of the vehicle. The hinge portion 332 is made of an integral hinge and is thinner than the general portion 324 and the door portion 334, but still within an unbreakable range. The breakaway portion 331 is formed to have continuous or interrupted grooves in the front face, so that it can be easily broken when the door portion 334 is pushed by the expanding airbag.

At portions of the general portion 324 near the periphery of the door portion 334, there are four side wall portions 327, 328, 329 and 330. The side wall portions 327, 328, 329 and 330 protrude forward on the outer peripheral side of the case 315. The upper side wall portion 327, which is arranged on the upper side of the case peripheral wall portion 316, and the lower sidewall portion 328, which is arranged on the lower side of the case peripheral wall portion 316, are mounting wall portions for mounting the airbag cover 322 on the case 315. The upper and lower side wall portions 327 and 328 are provided with retaining holes 327a and 328a, respectively, for retaining the retaining hook portions 317a of the hooks 317 on the peripheral wall portion 316.

The upper side wall portion 327 serves as extension promoting means, together with the hooks 317 of the case 315. The upper side wall portion 327 is arranged transversely above the upper end breakaway portion 331a, which is at the upper end of the door portion 334. Also, the upper side wall portion 327 is arranged along the upper breakaway portion 331a. The upper side wall portion 327 is retained on the peripheral wall portion 316 of the case 315 by using the hooks 317. In the illustrated embodiment, more specifically, the portion near the upper breakaway portion 331a on the upper end 334a of the door is firmly connected to the case 315 by the upper side wall portion 327 and the hooks 317. When the airbag 26B protrudes, therefore, the area of the upper end breakaway portion 331a does not move relative to the case 315 when pushed by the airbag 26B, so that the breakaway portion 331a can be smoothly broken by the airbag 26B.

At predetermined positions in the general portion 324, on the other hand, there are formed mounting leg portions 325, which extend in the forward direction. The mounting leg portions 325 are arranged to mount and fix the airbag cover 322 on the lower panel 312b. The mounting leg portions 325 are retained by the periphery of retaining holes 312e of the lower panel 312b. The lower panel 312b is provided with a housing recess 312c for housing the case 315. The retaining holes 312e are formed (see FIG. 40) in a flange portion 312d, which is formed at the periphery of the housing recess 312c of the lower panel 312b. At the proximal end of the mounting leg portion 325, there are formed ribs 325a. The ribs 325a abut, when the mounting leg portions 325 are retained in the retaining holes 312e, against the flange portion 312d of the lower panel 312b to support the general portion 324. In the illustrated embodiment, three mounting leg portions 325 are formed near each of the left and right edges of the general portion 324.

Figure 38:
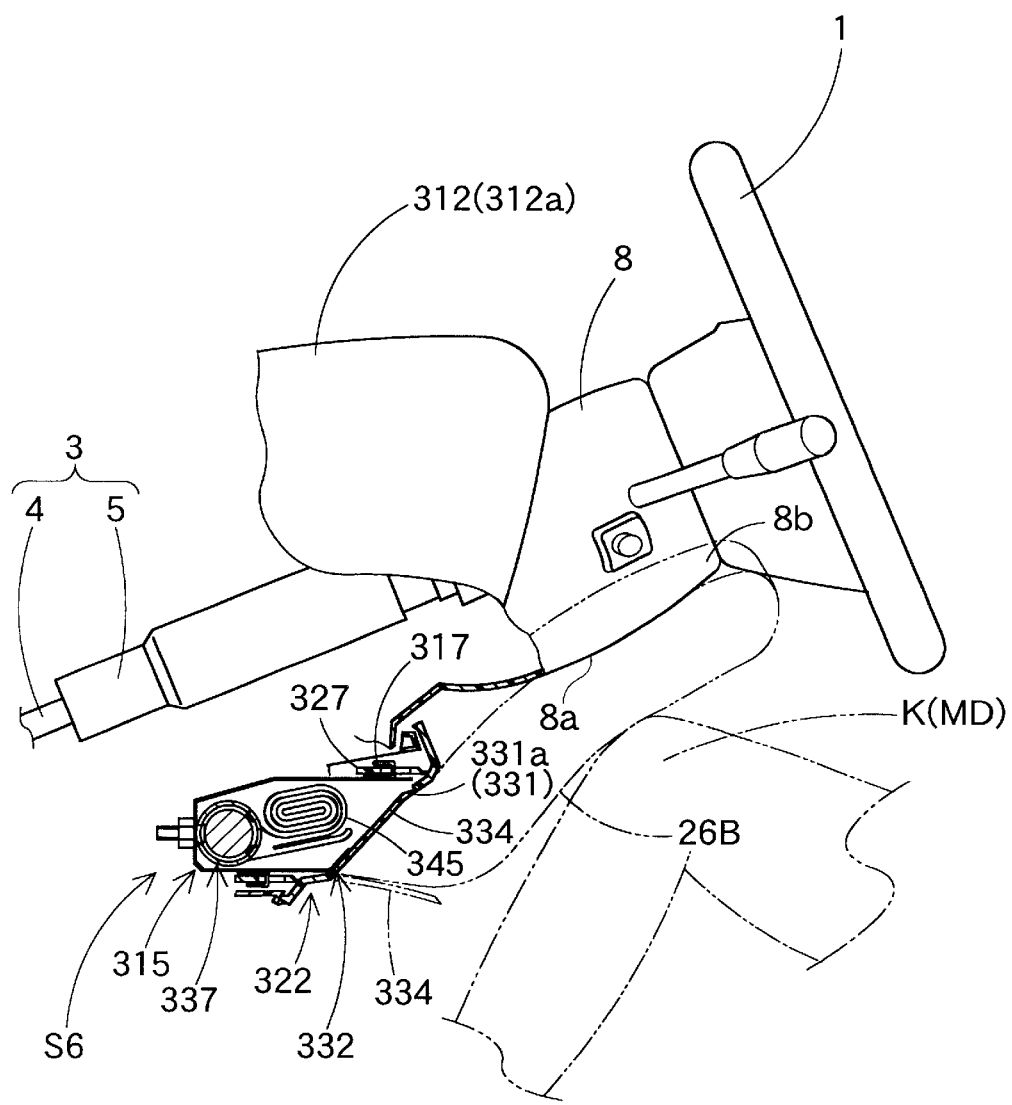
FIG. 38 is a schematic vertical section view showing the operation of the knee protecting airbag device according to a sixth embodiment of the invention where the plane of the section extends in the longitudinal direction of the vehicle.
Figure 40:
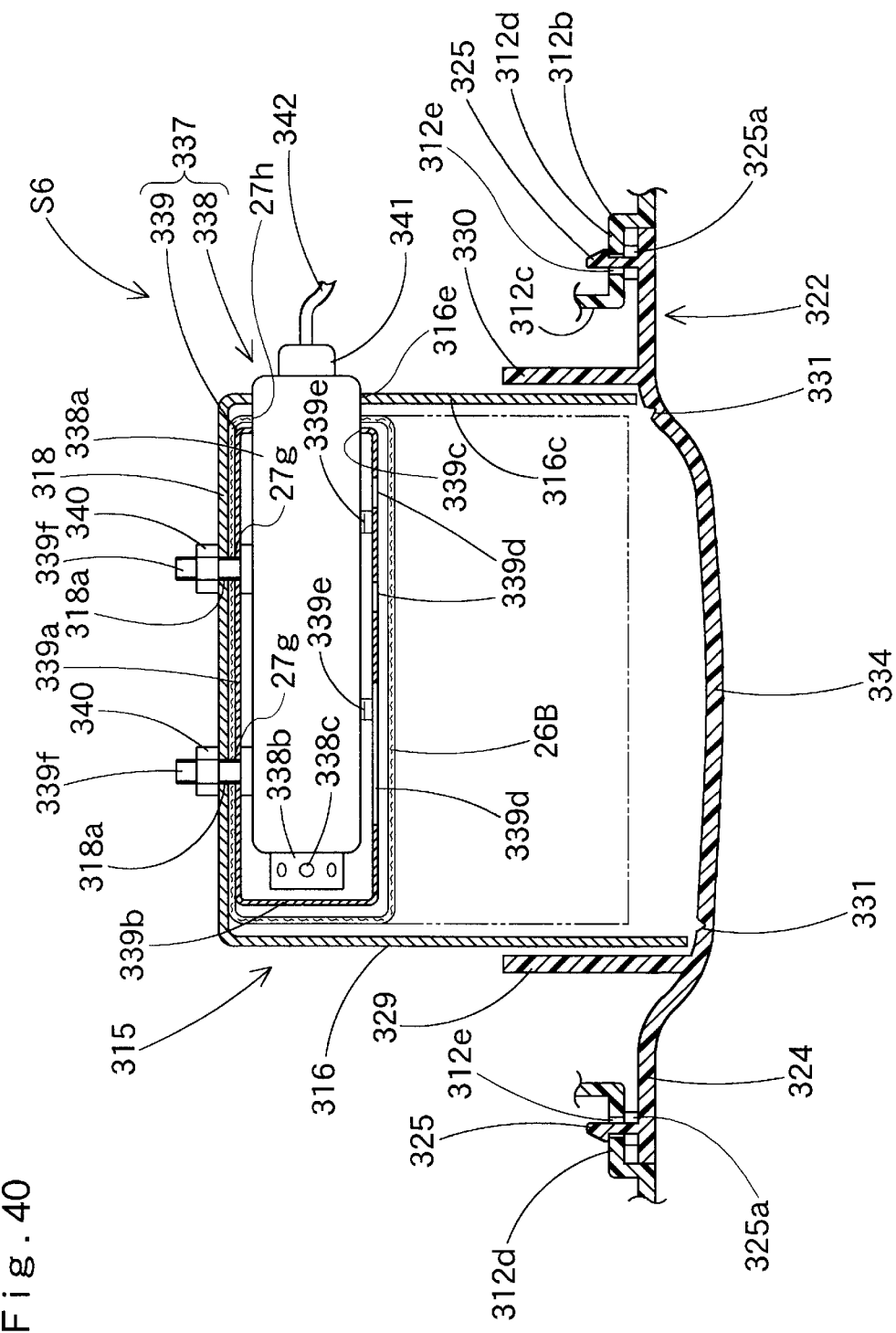
FIG. 40 is a sectional view of a portion taken along XL—XL of FIG. 39.
Figure 41:
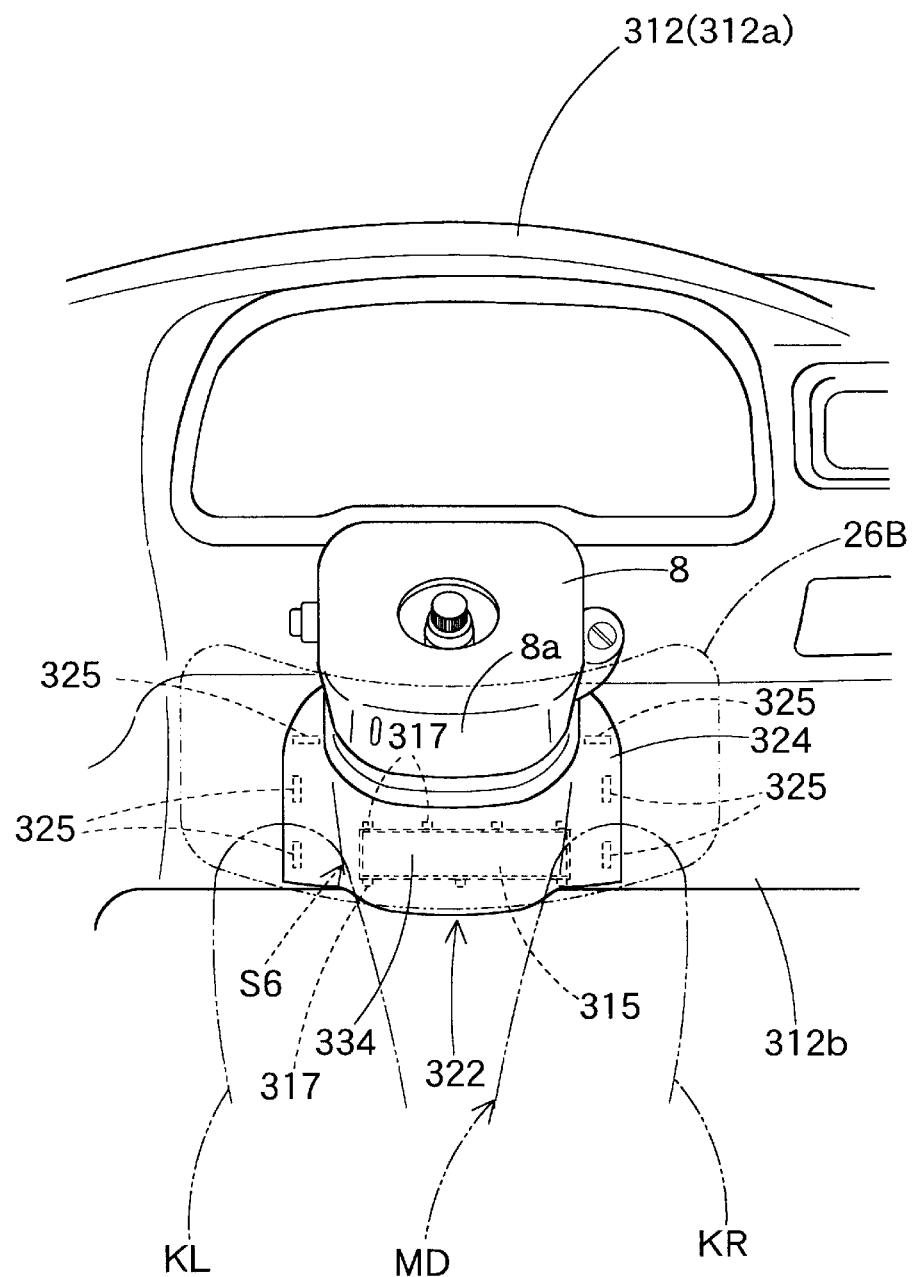
FIG. 41 is a schematic front elevation view taken from the rear of the vehicle showing the operation of the knee protecting airbag device of the sixth embodiment.

The inflator 337 is a cylinder-type inflator, such that its axis is arranged transversely of the vehicle, as shown in FIGS. 38 to 40. The inflator 337 is provided with the generally cylindrical body 338 and a bracket 339. The body 338 is provided with a cylindrical general portion 338a and a reduced diameter portion 338b, which protrudes from the end face of the general portion 338a. A plurality of gas discharge ports 338c are arranged in the outer circumference of the reduced diameter portion 338b. At the end face of the general portion 338a, which is spaced apart from the reduced portion diameter 338b, there is a connector 341, which is connected with a lead wire 342 for inputting an activating signal.

The bracket 339 is provided with a holding cylindrical portion 339a, which is formed of sheet metal into a generally cylindrical shape for covering the body 338, and a plurality of (e.g., two in the embodiment) bolts 339f, which protrude from the holding cylindrical portion 339a. The holding cylindrical portion 339a is provided on its leading end with a bottom portion 339b for covering the diametrically reduced portion 338b of the body 338. The holding cylindrical portion 339a is provided on the other end face with an insert hole 339c, for holding the general portion 338a of the body 338. In the holding cylindrical portion 339a, there are a plurality of gas outflow ports 339d for allowing the inflating gas discharged from the gas discharge ports 338c of the body 338 to flow out. The gas outflow ports 339d are opened in the rear surface of the holding cylinder portion 339a, as mounted on the vehicle. On the holding cylindrical portion 339a, there are clamping portions 339e for holding the body 338. Each of the clamping portions 339e is cut on two sides in the axial direction of the holding cylindrical portion 339a and is plastically deformed to bend into the holding cylindrical portion 339a. The body 338 is fixed in the holding cylindrical portion 339a by inserting the body 338 from the insert hole 339c with the diametrically reduced portion 338b leading and by pushing the individual clamping portions 339e further onto the outer circumferential side of the general portion 338a.

The inflator 337 is fed, together with the unillustrated airbag device mounted in the steering wheel 1, with the activating signal through the lead wire 342 when the airbag activating circuit detects a front collision of the vehicle.

The airbag 26B has a construction similar to that of the airbag 26 in the airbag device S1 of the first embodiment. Therefore, the construction will not be explained and common reference numbers will be used. In the lower side of the vehicle side wall portion 27 in the airbag 26B, there are through holes 27g, 27g and 27h. The holes 27g and 27g are used to receive the individual bolts 339f of the inflator 337. The hole 27h is used to receive the body 338 of the inflator 37. The airbag 26B is mounted in the case 315 by protruding the body 338 of the inflator 337 from the hole 27h to clamp the periphery of each hole 27g between the holding cylindrical portion 339a and the bottom wall portion 318 of the case 315.

The following is a description of the assembly of the airbag device S6. First, the airbag 26B is folded with the inflator 337 housed therein. At this time, the inflator 337 is housed in the airbag 26B by protruding the individual bolts 339f from the insert holes 27g and by protruding the proximal end of the inflator body 338 from the insert hole 27h. The airbag 26B is folded up like the airbag 26 in the airbag device S1 of the first embodiment.

Then, the airbag 26B is wrapped, after being folded up, with the unillustrated breakable wrapping film so that the airbag will not become loose. The bolts 339f of the inflator 337, which protrude from the insert holes 27g, and the end portion of the body 338, which protrudes from the insert hole 27h are also protruded from the wrapping film.

Next, the inflator 337 is housed together with the folded airbag 26B in the case 315 by extending the individual bolts 339f of the inflator 337 from the insert holes 318a and by extending the end portion of the inflator body 338 from the insert hole 316e. When nuts 340 are fastened on the individual bolts 339f, the inflator 337 and the airbag 26B can be housed in the case 315 and mounted in the case 315.

The unillustrated brackets of the case 315 are mounted on the dashboard reinforcement of the vehicle, on which an upper panel 312a and the lower panel 312b have already been mounted. The connector 341, which has the lead wire 342 connected therewith, is connected with the body 338 of the inflator 337. Next, the airbag cover 322 is pushed forward to insert and retain the individual mounting leg portions 325 in the retaining holes 312e of the lower panel 312b. Simultaneously, the hooks 317 of the case 315 are retained in the individual retaining holes 327a and 328a of the upper side wall portion 327 and the lower side wall portion 328 so that the airbag device S6 can be mounted on the vehicle.

If the activating signal is inputted through the lead wire 342 to the body 338 of the inflator 337 after the airbag device S6 is mounted on the vehicle, the inflating gas is discharged from the gas discharge ports 338c of the inflator 337. Then, the inflating gas flows into the airbag 26B through the gas outflow ports 339d of the bracket 339. Then, the airbag 26B expands and breaks the unillustrated wrapping film, and pushes the door portion 334 of the airbag cover 322 to break the breakaway portion 331. Then, the airbag 26B opens the door portion 334 downward on the hinge portion 332 so that it extends and inflates upward along the column cover lower face 8a, as indicated by double-dotted lines in FIGS. 38 and 41.

The airbag device S6 of the sixth embodiment is constructed such that the extension promoting means for quickly opening the door portion 334 is arranged near the door portion 334 of the airbag cover 322. The extension promoting means is the guide wall portion 319, which is arranged along the door portion 334 for covering the lower side of the case opening 315a. Near the area of the upper end breakaway portion 331a formed on the upper end 334a of the door portion 334, there is the upper wall portion 327 (or the mounting wall portion) serving as extension promoting means, which is mounted and fixed on the peripheral wall portion 316 by the hooks 317.

Therefore, the airbag 26B, which is extended and expanded by feeding the inflating gas from the inflator 337, can be guided toward the upper end 334a of the door portion 334 by the guide wall portion 319. As a result, the upper end breakaway portion 331a on the upper edge 334a of the door portion 334 is broken at the beginning of the expansion of the airbag 26B by the protruding airbag 26B, so that the door portion 334 can be smoothly opened downward from the upper end 334a.

The portion near the area of the upper end breakaway portion 331a is firmly connected to the case 315 by the upper side wall portion 327 and the hooks 317 so that the area of the upper end breakaway portion 331a is not moved relative to the case 315 by the pushing force of the airbag 26B when the airbag 26B protrudes. By the pushing force of the airbag 26B, therefore, it is possible to smoothly break the upper end breakaway portion 331a on the upper end 334a, or the opening starting side, of the door portion 334. Thus, the remaining breakaway portion 331 is broken smoothly.

As a result, in the airbag device S6 of the sixth embodiment, the door portion 334 can be quickly opened to permit the airbag 26B to protrude quickly from the opening of the opened door portion 334, to extend and expand the airbag 26B.

In the airbag device S6 of the sixth embodiment, the door portion 334 can be opened with the largest opening size at the upper end 334a, because the door portion 334 opens downwardly. Specifically, the airbag 26B is easily allowed to protrude upward from the largest opened portion, which is at the upper end 334a of the door portion 334. By the opening action of the door portion 334, therefore, the airbag 26B can be guided upwardly so that it can be quickly extended and expanded in an upward direction.

In the airbag device S6 of the sixth embodiment, therefore, the airbag 26B can be quickly extended to properly protect the knees K of the driver MD as the passenger M.

In the airbag device S6 of the sixth embodiment, the airbag cover 322 is integrally molded to include the door portion 334, which includes the breakaway portion 331 around the door portion 334, and the general portion 324, which is around the door portion 334. Therefore, the door portion 334 causes no disharmony with the surrounding general portion 324 so that its design is excellent.

In the airbag device S6 of the sixth embodiment, the upper end 334a which is the first side of the door portion 334 to open, is arranged at the rear, or the side that is removed from the airbag 26B and the inflator 337. However, the guide wall portion and the upper side wall portion 327 near the upper end breakaway portion 331a, which serve as extension promoting means, are arranged in the vicinity of the door portion 334, so that the door portion 334 can be quickly opened to extend and expand the airbag 26B quickly.

In the airbag device S6 of the sixth embodiment, the lower side of the door portion 334 in the airbag cover 322 is arranged on the front so that a wide space can be provided in front of the knees K of the driver MD. Therefore, the airbag device S6 can be mounted on the vehicle without any interference with the toes or the like of the driver MD. If this point is not seen to be important, it is natural that the door portion 334 need not be inclined, arranging the upper end 334a side more toward the vehicle rear and by arranging the hinge portion 332 more toward the vehicle front. For example, the door portion may be arranged vertically.

Figure 42:
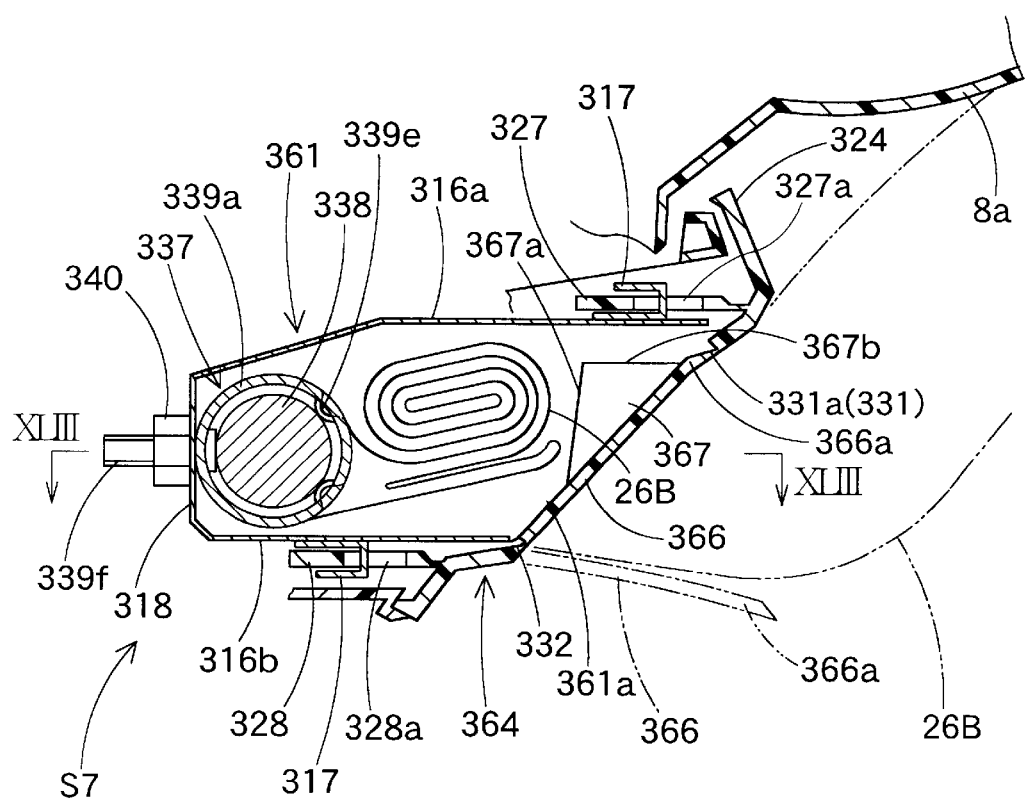
FIG. 42 is a schematic vertical section view of a knee protecting airbag device according to a seventh embodiment of the invention where the plane of the section extends in the longitudinal direction of the vehicle.
Figure 43:
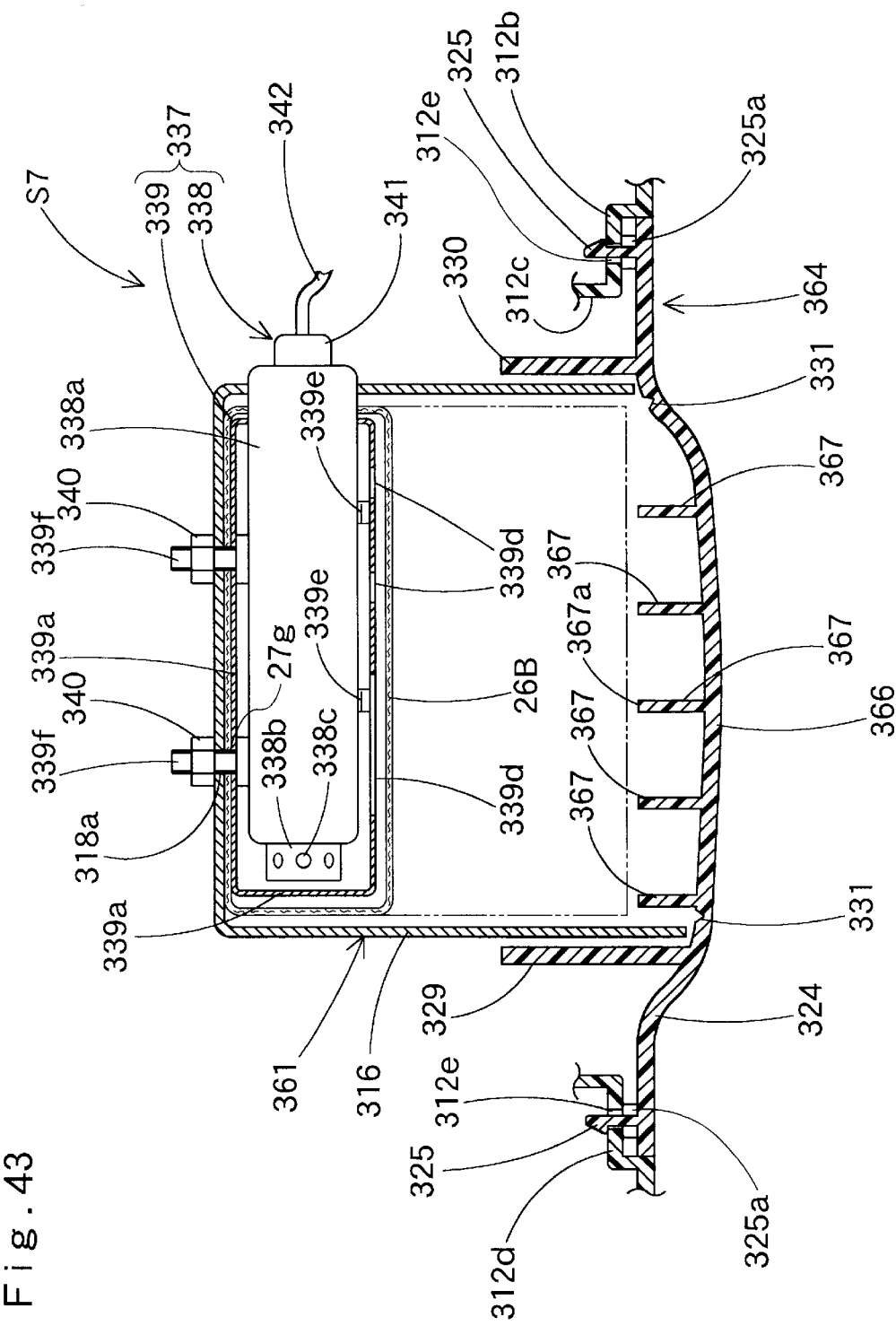
FIG. 43 is a section view taken along the plane XLIII—XLIII of FIG. 42.

The airbag device S7 of the seventh embodiment is shown in FIGS. 42 and 43. The construction of the airbag device S7 is similar, other than that of a case 361 and an airbag cover 364, to that of the aforementioned airbag device S6. Therefore, common members will not be explained and will be given common reference numbers.

The case 361 used in the airbag device S7 is constructed not to have the aforementioned guide wall portion 319 formed in the case 315, and the remaining construction is similar to that of the case 315. Therefore, the common members will not be explained and will be given common reference numbers.

The construction of the airbag cover 364 is similar, other than a door portion 366, to that of the aforementioned airbag cover 322. Therefore, common members will not be explained and will be given common reference numbers.

The door portion 366 of the airbag cover 364 is provided, as shown in FIGS. 42 and 43, with a plurality of (e.g., five in the embodiment) forwardly extending ribs 367 of a generally triangular plate shape. The ribs 367 are arranged in a row in the transverse direction of the vehicle. The front faces of the individual ribs 367 are easily pushed faces 367a and serve as extension promoting means. The easily pushed faces 367a are arranged in the vertical direction and are pushed by the airbag 26B when the airbag is deployed. On the other hand, the upper ends 367b of the individual ribs 367 are arranged at positions near the upper end 366a of the door portion 366 (or near the upper end breakaway portion 331a), as shown in FIG. 42. The ribs 367 are pushed on their easily pushed faces 367a rearward at the beginning of the expansion of the airbag 26B by the airbag 26B. As a result, the door portion 366, which is pushed at the easily pushed faces 367a by the airbag 26B, is opened quickly due to the quickly broken surrounding breakaway portion 331.

In the airbag device S7, the upper end 366a of the door is arranged towards the rear of the vehicle, and the hinge portion 332 is arranged toward the front of the vehicle. In other words, the door portion 366 is inclined with respect to a vertical plane that is perpendicular to the longitudinal axis of the vehicle.

With this construction of the airbag device S7, at the beginning of the expansion of the airbag 26B, the protruding airbag 26B pushes the easily pushed faces 367a of the ribs 367 backward to open the door portion 366. Normally, in the case of a knee protecting airbag device having no rib arranged on the door portion, the protruding airbag pushes the front face of the door portion to open the door portion. With the airbag device S7 having the aforementioned construction, however, the ribs 367 shorten the distance between the airbag 26B and the door portion 366 substantially. Therefore, the door portion 366 can be opened more quickly in comparison to a construction having no rib. As a result, the airbag 26B can be quickly protruded to extend and expand from the opening.

In the airbag device S7 of the seventh embodiment, the upper ends 367b of the ribs 367 are arranged near the upper end breakaway portion 331a. Therefore, the pushing force from the airbag 26B easily acts on the upper end breakaway portion 331a so that the upper end breakaway portion 331a can be smoothly broken by the protruding airbag 26B.

The device of this embodiment is constructed such that the plate-shaped ribs 367 are arranged in a row in the transverse direction of the vehicle. However, the shape and the number of arranged ribs should not be so limited. For example, the construction may be modified by arranging one rib, which has a generally T-shaped section and an enlarged, easily pushed face toward the front.

In the airbag device S7 of the seventh embodiment, the area of the upper end breakaway portion 331a on the upper end of the door portion 366 is firmly connected to the case 315 by the upper side wall portion 327. When the airbag 26B protrudes, therefore, the area of the upper end breakaway portion 331a is not moved relatively to the case 315, and the breakaway portion 331a can be smoothly broken by the pushing force of the airbag 26B. As a result, in the airbag device S7 of the embodiment, the door portion 366 can be quickly opened to extend the airbag 26B quickly.

Figure 44:
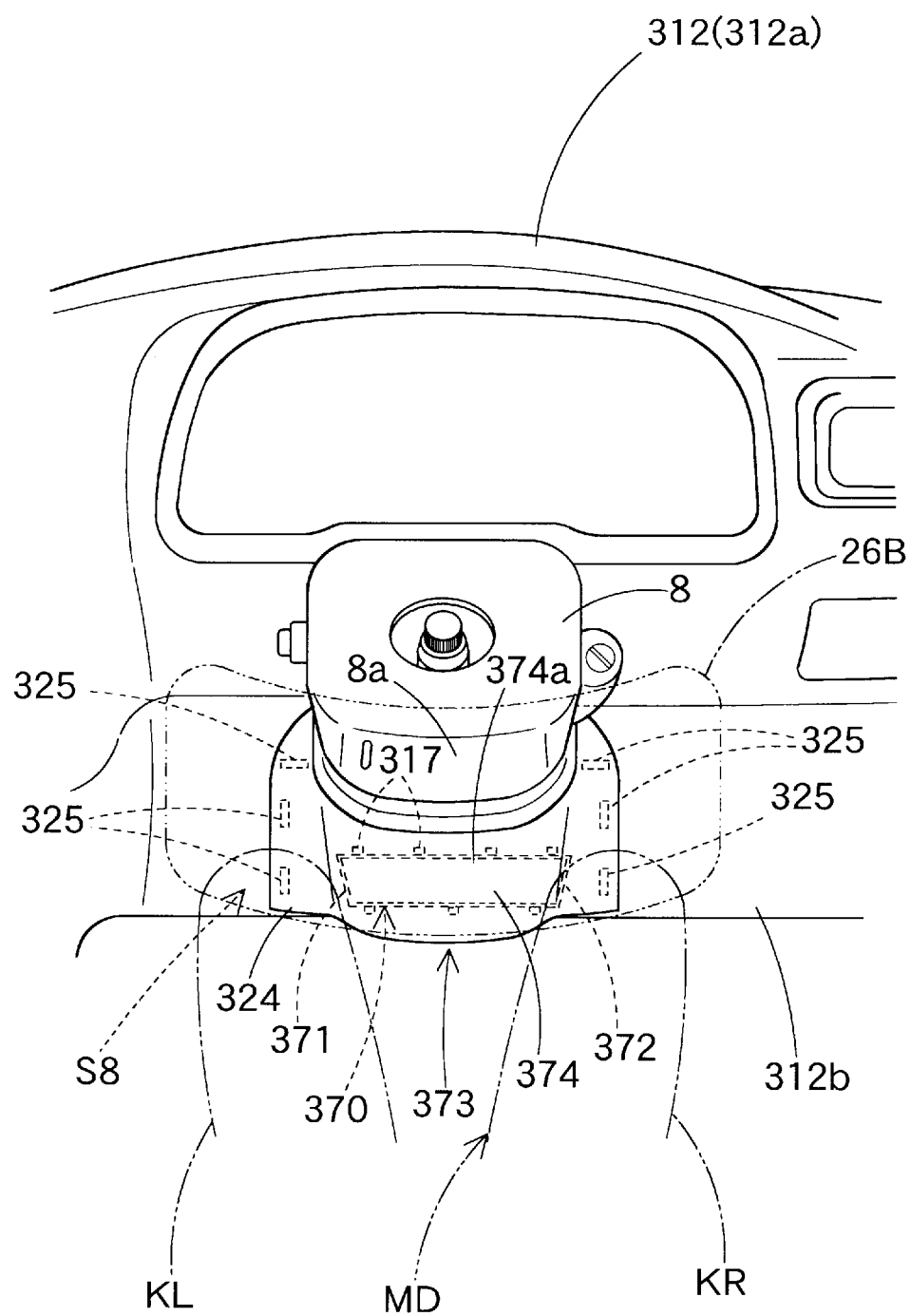
FIG. 44 is a schematic front elevation view taken from the rear of the vehicle showing the operation of a knee protecting airbag device according to an eighth embodiment of the invention.

Next, an airbag device S8 of an eighth embodiment is shown in FIG. 44. The construction of this airbag device S8 is similar, other than a case 370 and an airbag cover 373, to that of the aforementioned airbag device S6. Therefore, common members will not be explained and will have common reference numerals.

The case 370 is formed to have a generally trapezoidal shape in which the sectional shape in the transverse directions of the vehicle is wider on the upper end side, as shown in FIG. 44. The door portion 374 of the airbag cover 373 is formed into the generally trapezoidal shape, which is wider on its upper side according to the shape of a case opening 370a.

In the airbag device S8, more specifically, a left side wall portion 371 and a right side wall portion 372 of the case 370 are inclined such that they extend apart from each other. In other words, the left side wall portion 371 and the right side wall portion 372 are inclined so that the distance between the left side wall 371 portion and the right side wall portion 372 is greater at the top than at the bottom.

With this construction of the airbag device S8, the inflating gas discharged from the inflator is guided upward in the airbag 26B by the left side wall portion 371 and the right side wall portion 372 of the case 370. In other words, the airbag 26B can be guided toward the upper end 371a of the door portion 374. With the protruding of the airbag 26B, therefore, the door portion 374, which opens downward, can be smoothly opened from its upper end 374a. As a result, the airbag 26B can be quickly protruded to extend and expand from the opening of the door portion.

Figure 45:
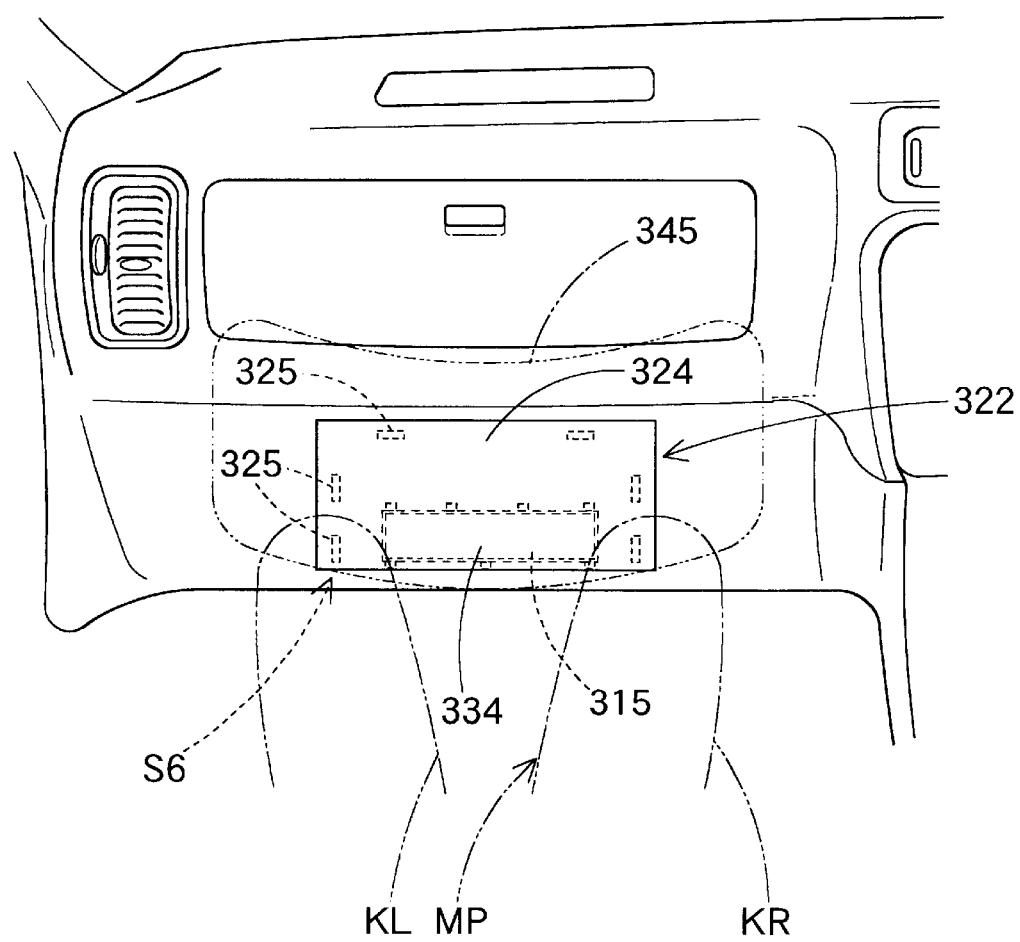
FIG. 45 is a schematic front elevation view taken from the rear of the vehicle showing the state in which the knee protecting airbag device of the sixth embodiment is arranged in front of the passenger's seat.

The sixth to eighth embodiments have been described by exemplifying the airbag devices S6 to S8 arranged on the front side of the driver MD to protect the knees of the driver MD. As shown in FIG. 45, however, the airbag:device S6 may be arranged in front of the passenger MP seated on the passenger's seat to protect the knees of the seated passenger MP.

The following is a description of knee protecting airbag devices S9 to S11, which are capable of achieving the fifth object of the invention.

The construction of a vehicle for mounting the knee protecting airbag device S9 of the ninth embodiment is similar to that of the aforementioned airbag device S1 of the first embodiment. Therefore, common members will not be described, and common members will be given common reference numerals.

Figure 46:
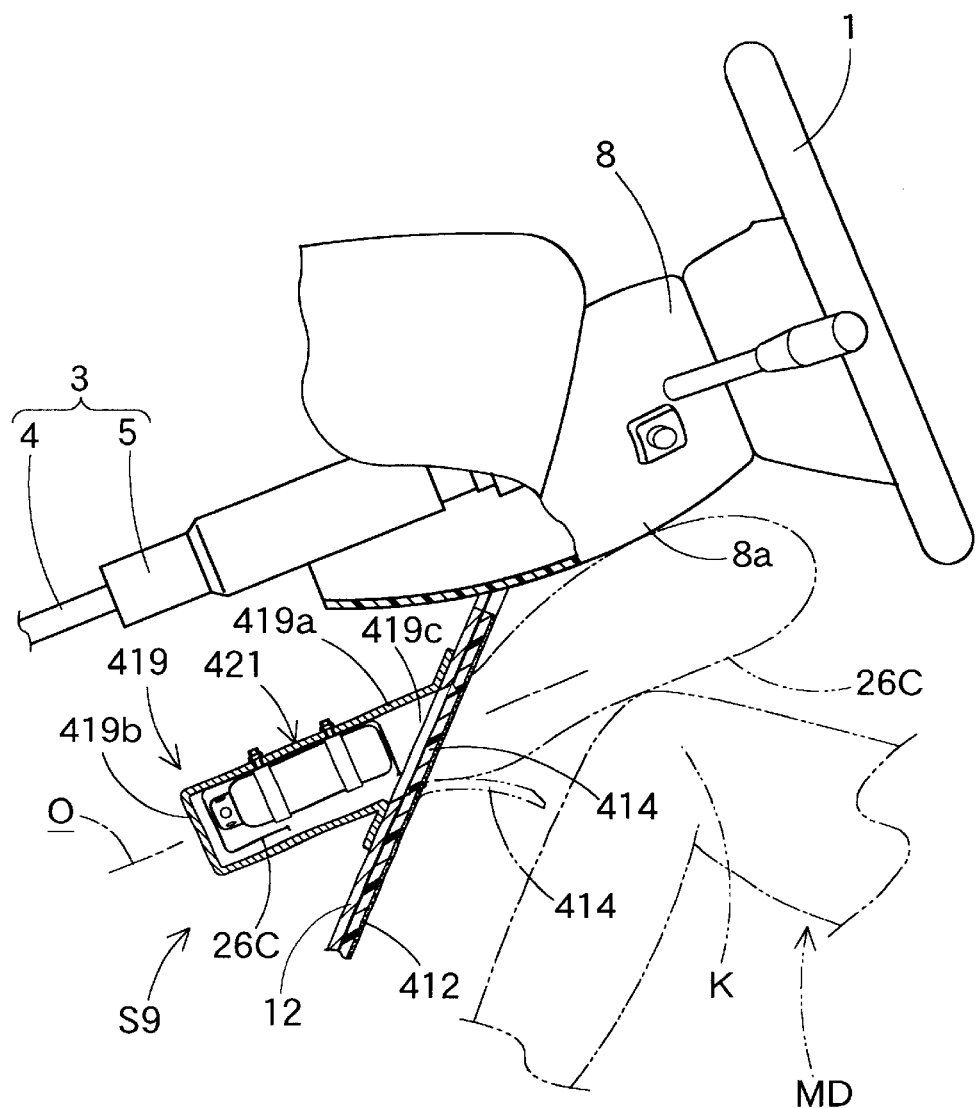
FIG. 46 is a schematic vertical section view showing the operation of a knee protecting airbag device according to a ninth embodiment of the invention, where the plane of the section extends in the longitudinal direction of the vehicle.
Figure 47:
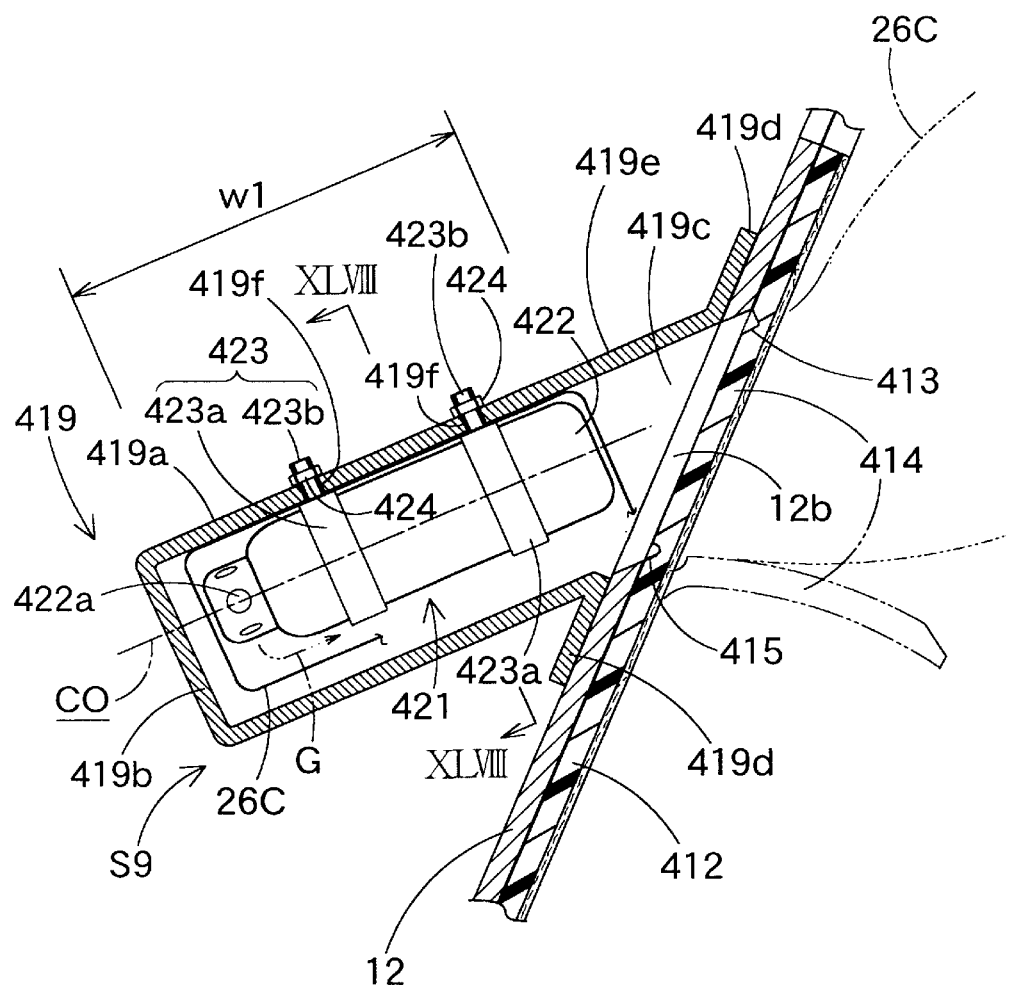
FIG. 47 is a schematic vertical section view of the knee protecting airbag device of the ninth embodiment in the longitudinal direction of the vehicle.
Figure 48:
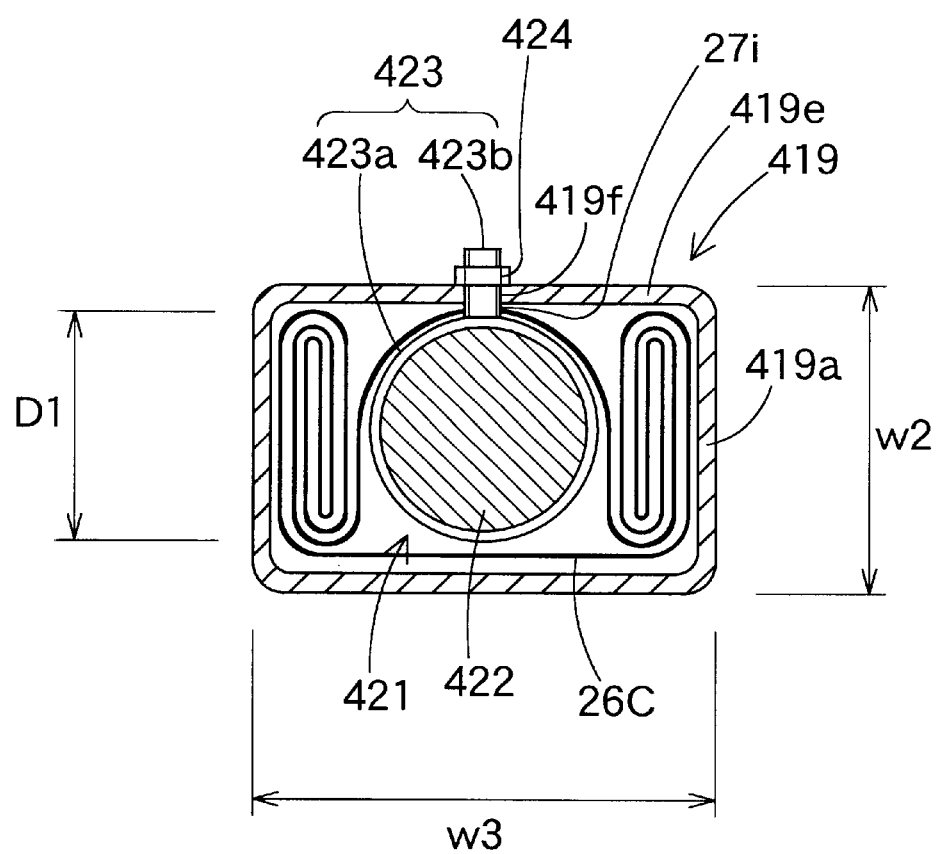
FIG. 48 is a section view taken along plane XLVIII—XLVIII of FIG. 47.
Figure 49:
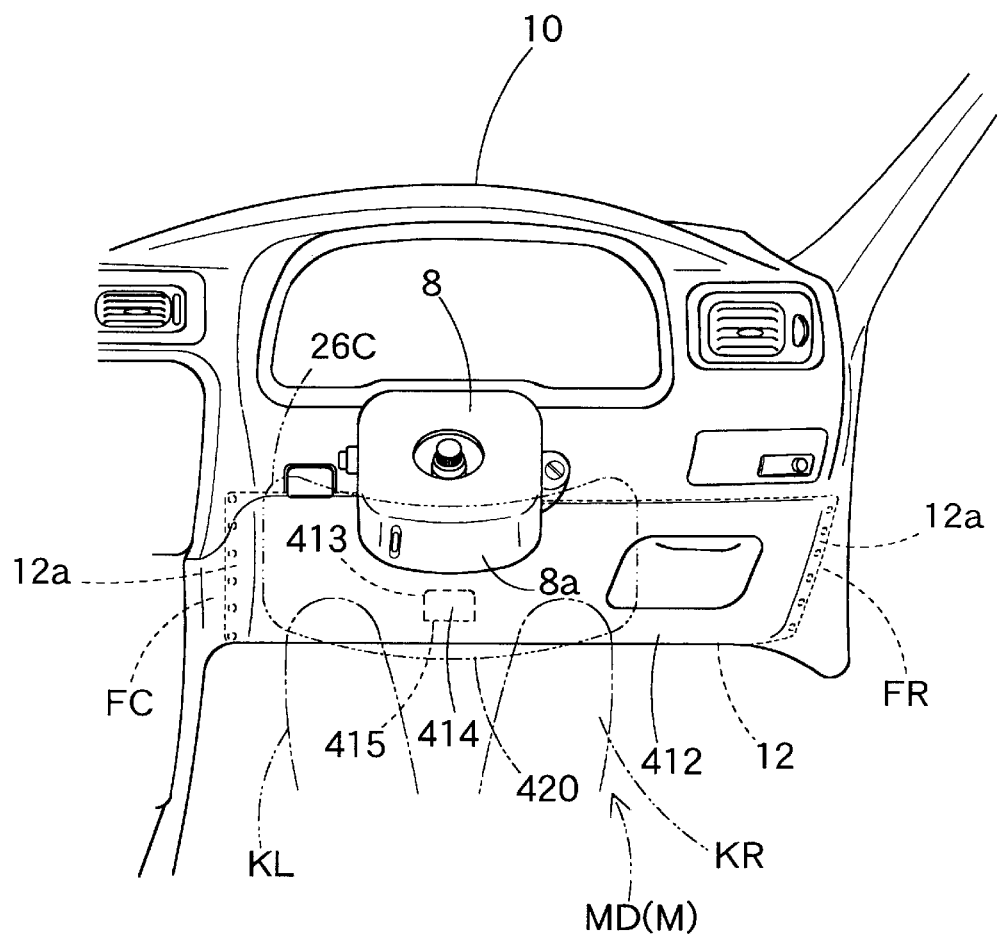
FIG. 49 is a schematic front elevation view taken from the rear of the vehicle showing the operation of the knee protecting airbag device of the ninth embodiment.

The knee protecting airbag device S9 of the ninth embodiment is shown in FIGS. 46 to 48. The airbag device S9 comprises a folded airbag 26C, an inflator 421, a case 419 for housing the airbag 26C and the inflator 421, and an airbag cover 412 for covering the folded airbag 26C. The airbag device S9 is mounted on the holding member 12 such that the case 419 is arranged to the front of the plate-shaped holding member 12. The construction of this holding member 12 is similar to that of the holding member 12 in the airbag device S1 of the first embodiment.

In this embodiment, the case 419 is made of sheet metal. The case 419 comprises, as shown in FIGS. 46 to 48, a peripheral wall portion 419a of a generally rectangular tubular shape and a bottom wall portion 419b of a generally rectangular shape. The bottom wall portion 419b closes the front of the peripheral wall portion 419a. On the periphery of the opening 419c on the rear side of the peripheral wall portion 419a, there is a flange portion 419d, which protrudes outward for mounting the case 419 on the holding member 12. In the embodiment, the case 419 is mounted and fixed on the holding member 12 by unillustrated bolts or the like using the flange portion 419d, as shown in FIGS. 46 to 49. As shown in FIG. 46, the case 419 is arranged such that the airbag 26C protrudes along the lower face 8a of the column cover 8 when the housed airbag 26C protrudes from the case 419. In other words, the case 419 is arranged such that the axis O of the peripheral wall portion 419a extends along the lower face 8a of the column cover 8 (or in the axial direction of the steering column 3).

In the upper side wall portion 419e of the peripheral wall portion 419a, there are mounting holes 419f, as shown in FIGS. 46 to 48. The mounting holes 419f are arranged to mount the inflator 421 in the case 419 by receiving the later-described bolts 423b of the inflator 421. The case 419 mounts and fixes the inflator 421 on the upper side wall portion 419e of the peripheral wall portion 419a, as shown in FIGS. 46 to 48. The folded airbag 26C is housed in the case 419 on the left and right sides of the inflator 421.

As shown in FIGS. 46 to 48, 50 and 51, the inflator 421 is a cylinder-type inflator, which discharges inflating gas G in response to an electric signal. The inflator 421 is provided with a generally cylindrical body 422 and two bracket portions 423 and 423. The inflator 421 is arranged in the case 419 such that its axis CO is substantially parallel to the axis O of the peripheral wall portion 419a of the case 419.

In the body 422, a plurality of gas discharge ports 422a for discharging the inflating gas are arranged at the front side. In this embodiment, the body 422 is activated simultaneously with the airbag device for the steering wheel by an electric signal coming from the control device for activating the unillustrated airbag device that is mounted on the steering wheel 1. Each of the bracket portions 423 comprises a retaining ring 423a made of sheet metal and a bolt 323b protruding from the retaining ring 423a. The retaining ring 423a is plastically deformable to a reduced diameter such that it can clamp the body 422. The inflator 421 is mounted and fixed on the case 419 in the following manner. Specifically, the body 422, which is assembled with the bracket portions 423, is arranged in the airbag 26C, and the bolts 423b are extended from the airbag 26C. Then, the bolts 423b are inserted into the mounting holes 419f of the case 419 and are fastened to the case 419 by nuts 424. The unillustrated lead wire is connected with the body 422.

In this embodiment, the airbag cover 412 is mounted and fixed on the rear face of the holding member 12, as shown in FIGS. 46 to 49. The airbag cover 412 also plays the role of an interior decorative portion to cover the vehicle rear side of the folded airbag 26C and to cover the face of the holding member 12 on the interior side. In the airbag cover 412, there is a door portion 414 of a generally rectangular plate shape, which is located at the position of the opening 419c of the case 419. The door portion 414 is pushed by the extending and expanding airbag 26C and opened into the vehicle. Around the door portion 414, there are a thin breakaway portion 413, which is in the shape of an inverted U, as viewed from the interior side, and a hinge portion 415 on the lower edge. The door portion 414 is pushed by the extending and expanding airbag 26C to break the breakaway portion 413 and opened downward to the interior of the vehicle.

The airbag 26C has a construction similar to that of the airbag 26 in the airbag device S1 of the first embodiment. Therefore, common members will not be explained and will be given common reference numbers. In the lower side of the vehicle side wall portion 27 in the airbag 26C, there are insert holes 27i and 27i for receiving the individual bolts 423b of the inflator 421. In the airbag 26C, two lower tethers 32A and 32A are arranged on the left and right sides of the inflator 421 (see FIGS. 50 and. 51).

The following is a description of the installation of the airbag device S9 on the vehicle. First, the airbag 26C is folded while housing the inflator 421 therein. At this time, the individual bolts 423b of the inflator 421 are extended from the individual insert holes 27i formed in the airbag 26C. The unillustrated lead wire extending from the body 422 is extended from the predetermined unillustrated insert hole in the airbag 26C. Moreover, the airbag 26C is wrapped, after being folded, with an unillustrated breakable wrapping film.

The individual bolts 423b are extended from the wrapping film and are assembled with unillustrated thin spring nuts.

Next, the folded airbag 26C is inserted, together with the inflator 421, into the case 419, and the individual bolts 423b are extended out of the case 419 through the individual mounting holes 419f of the case 419. By fastening the bolts 423b on the case 419 with the nuts 424, the folded airbag 26C and the inflator 421 are housed in the case 419. The unillustrated lead wire, which extends from the inflator body 422, is led from the wrapping film and from the unillustrated insert hole of the case 419.

Then, the case 419 is mounted and fixed on the holding member 12 by using the flange portion 419d to form the airbag assembly. The mounting portions 12a on the transverse ends of the holding member 12 are fixed by the bolts on the frame portions FC and FR of the vehicle, which are arranged on the left and right side. Then, the unillustrated lead wire is connected with the control circuit, and the dashboard 10. As a result, the airbag device S9 can be mounted on the vehicle, as shown in FIGS. 46 to 49.

Figure 50:
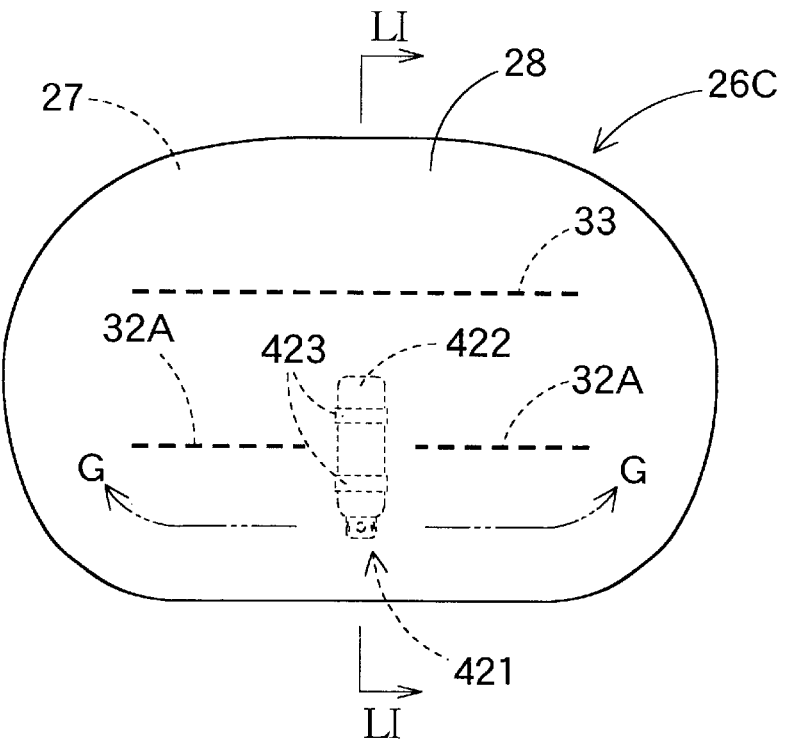
FIG. 50 is a front elevation view of an airbag of the ninth embodiment.
Figure 51:
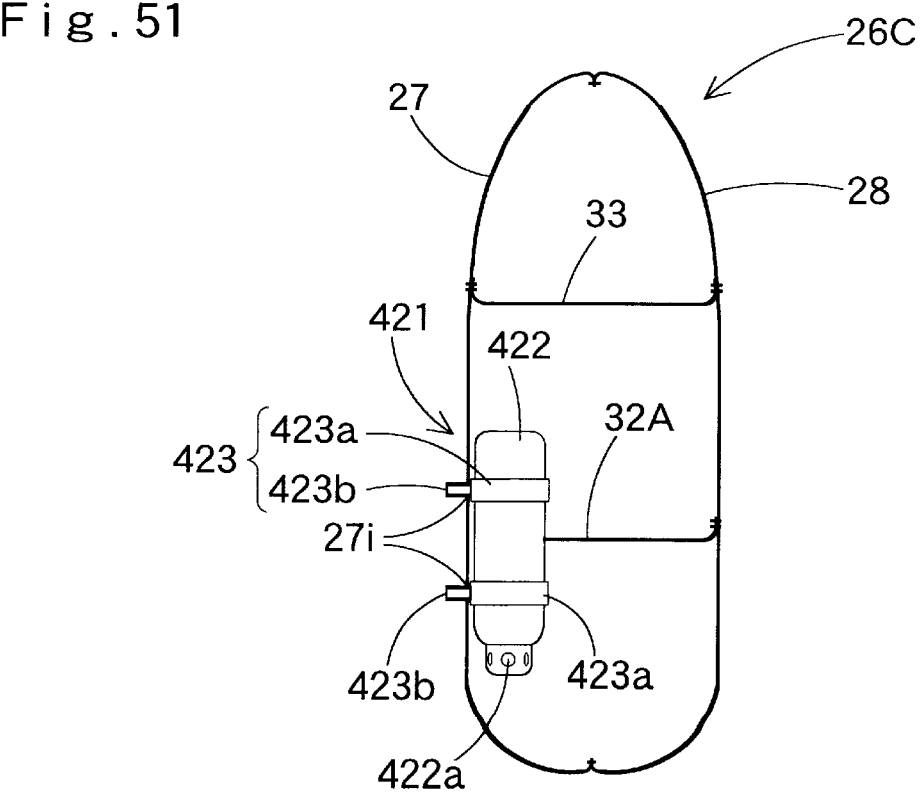
FIG. 51 is a schematic section view taken along plane LI—LI of FIG. 50.

When the predetermined electric signal is inputted to the inflator body 422 after the airbag device S9 is mounted on the vehicle, inflating gas G is discharged from the gas discharge ports 422a to expand the airbag 26C, as shown in FIG. 50. Then, the airbag 26C breaks the unillustrated wrapping film and pushes and opens the door portion 414 of the airbag cover 412 so that the airbag 26C extends and expands upward from the communication hole 12b along the column cover lower face 8a.

In the airbag device S9 of the ninth embodiment, the axis CO of the inflator 421 is parallel with the axis O of the peripheral wall portion 419a of the case 419. Specifically, the cylinder-type inflator 421 is made in axial length w1 than external diameter D1, as shown in FIGS. 47 and 48. In the airbag device S9, therefore, the vertical and transverse dimensions w2 and w3, which are perpendicular to the axis O of the case 419, can be set as follows. The dimensions w2 and w3 of the case 419 can be set to sizes that are calculated by adding the housing space of the airbag 26C to the external diameter D1 of the inflator 421. In other words, the dimensions w2 and w3 of the case 419 can be made smaller than those of a case in which the inflator 421 is arranged with its axis CO generally perpendicular to the axis O of the case peripheral wall portion 419a.

Therefore, the airbag device S9 of the ninth embodiment can be arranged in a narrow housing space by reducing the dimensions w2 and w3, which are perpendicular to the axis O of the case 419.

Figure 52:
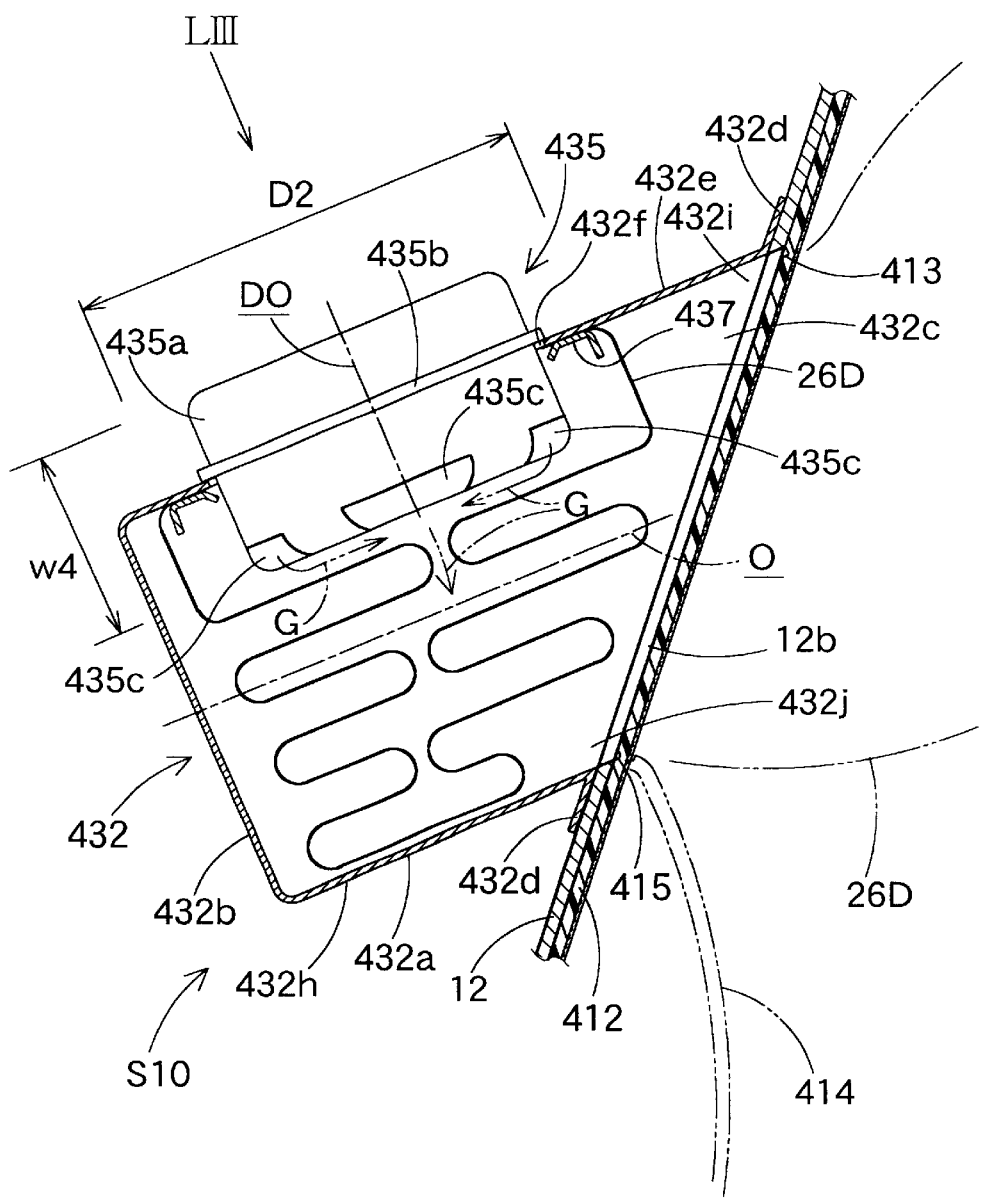
FIG. 52 is a schematic vertical section view of a knee protecting airbag device according to a tenth embodiment of the invention, where the plane of the section extends in the longitudinal direction of the vehicle.

The following is a description of an airbag device S10 of a tenth embodiment. The airbag device S10 is constructed, as shown in FIG. 52, to use a disc-type inflator 435. The construction of the airbag device S10 is similar, other than the inflator 435 and a case 432, to that of the aforementioned airbag device S9. Therefore, common members will not be explained and will have common reference numbers.

The airbag device S10 comprises a folded airbag 26D, the disc type inflator 435, and the case 432 for housing the airbag 26D and the inflator 435. The airbag device S10 is mounted like the aforementioned airbag device S9 on the holding member 12 by arranging the case 432 on the front side of the holding member 12.

Figure 53:
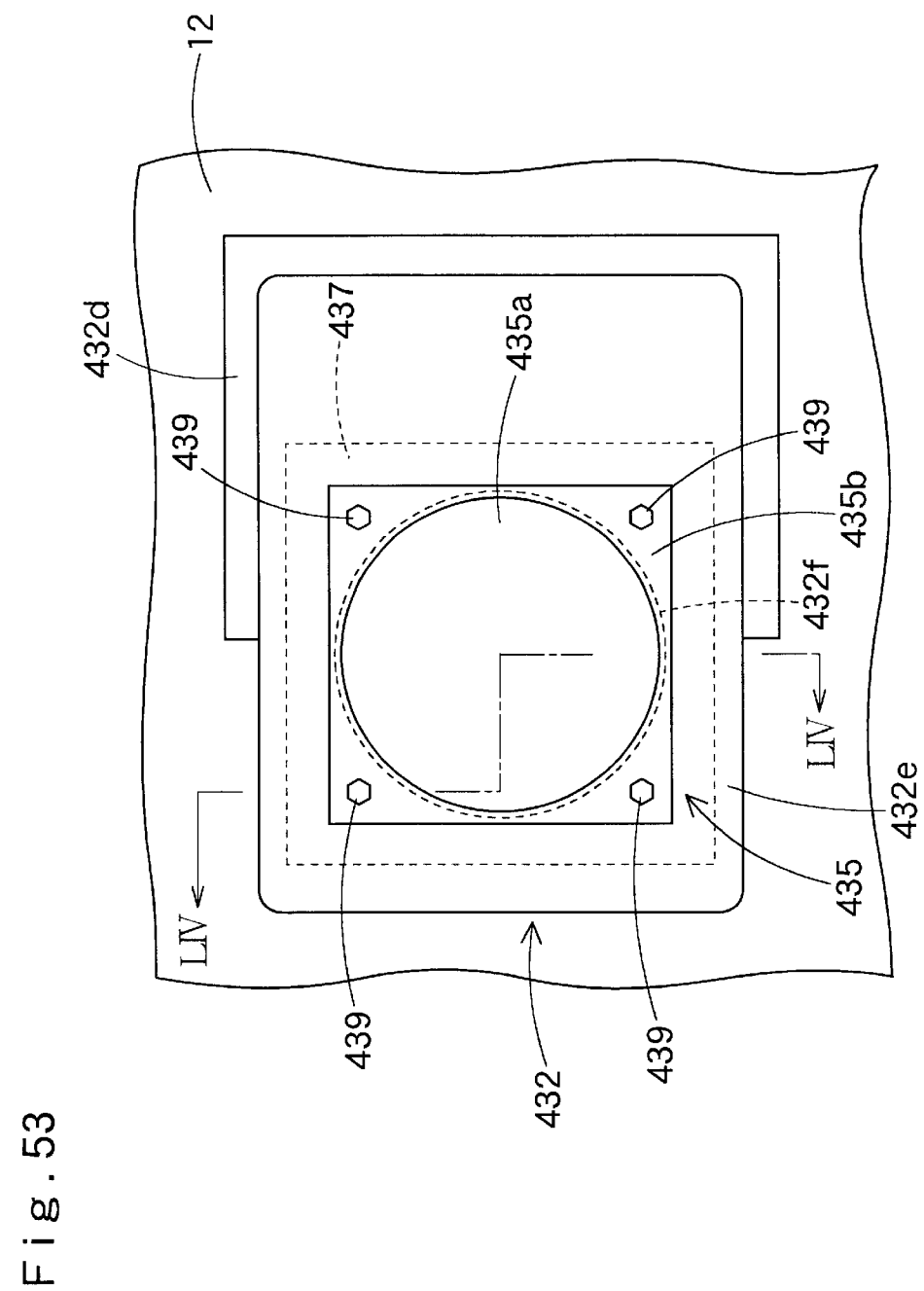
FIG. 53 is a front elevation view, as taken along plane LIII of FIG. 52, of the knee protecting airbag device of the tenth embodiment.
Figure 54:
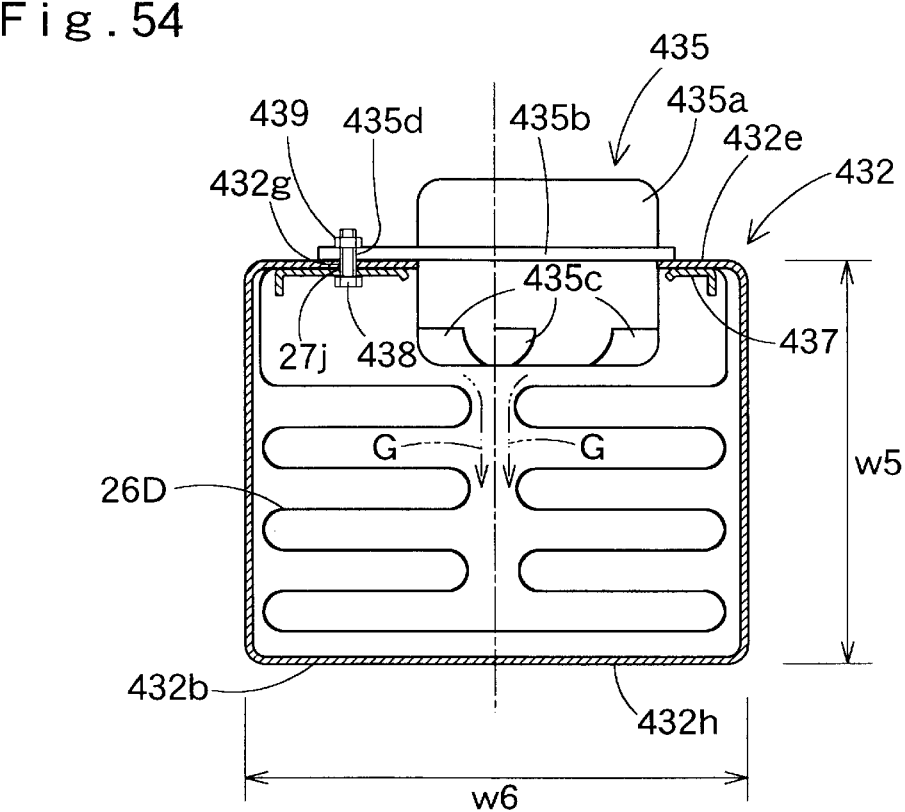
FIG. 54 is a section view taken along plane LIV—LIV of FIG. 53.
Figure 55:
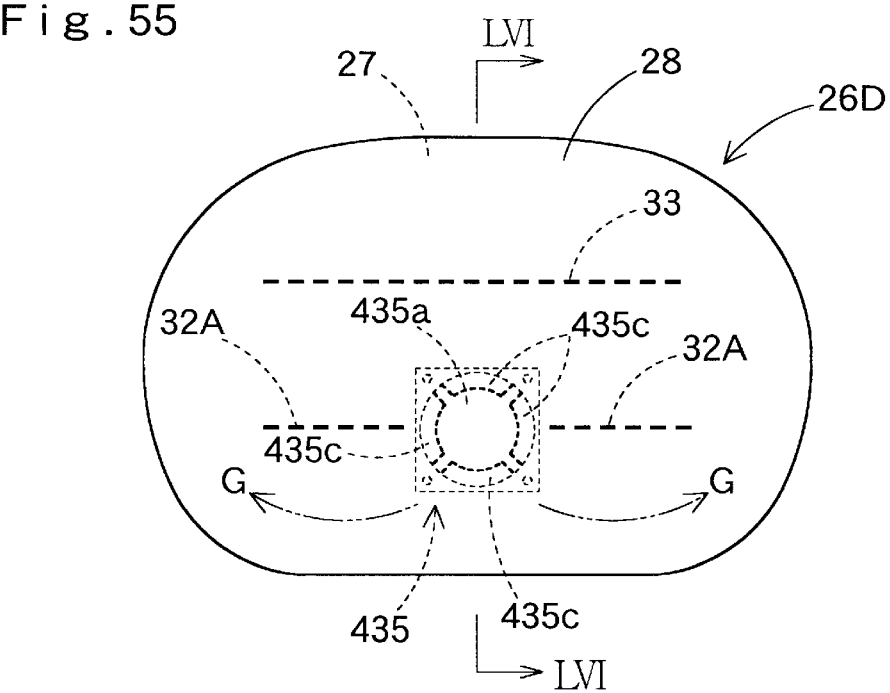
FIG. 55 is a front elevation view of an airbag of the tenth embodiment.
Figure 56:
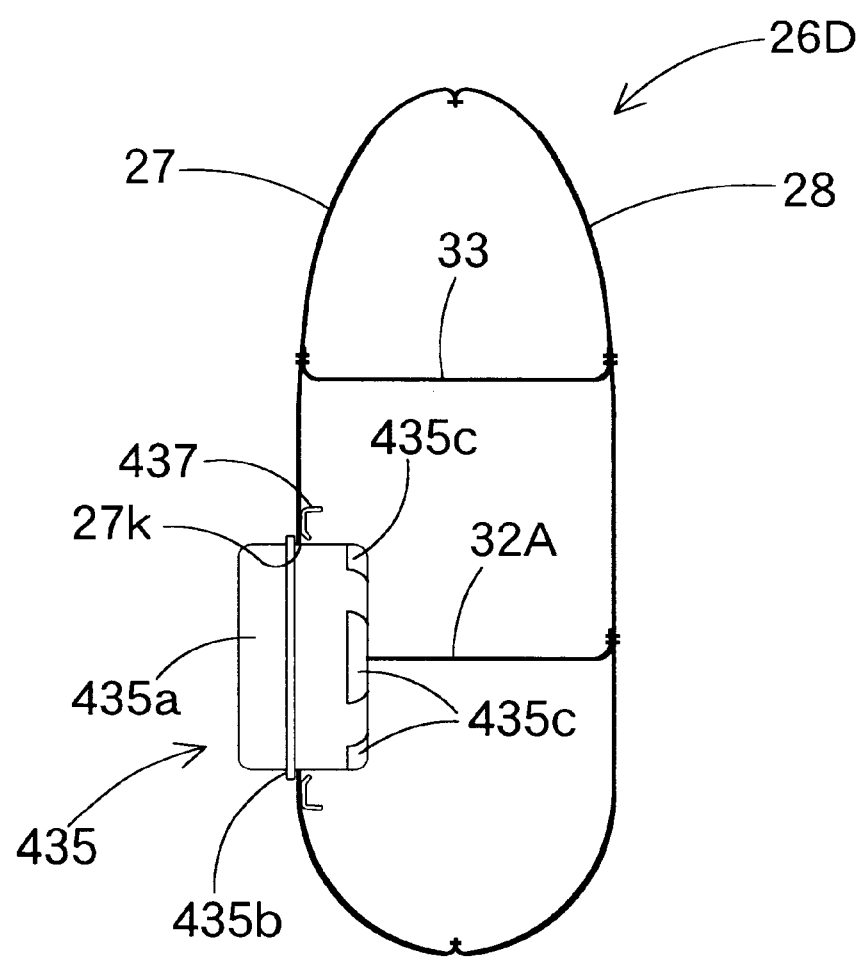
FIG. 56 is a schematic section view taken along plane LVI—LVI of FIG. 55.

The case 432 comprises, as shown in FIGS. 52 to 54, a peripheral wall portion 432a of a generally rectangular tubular shape, and a bottom wall portion 432b of a generally rectangular shape. The bottom wall portion 432b closes the front of the peripheral wall portion 432a. From the periphery of an opening 432c of the peripheral wall portion 432a on the rear side, as in the aforementioned case 419, there is protruded outward a flange portion 432d for mounting the case 432 on the holding member 12. In an upper side wall portion 432e in the peripheral wall portion 432a, as shown in FIGS. 52 to 54, there are an insert hole 432f and four mounting holes 432g. The insert hole 432f is arranged to hold the later-described body 435a of the inflator 435. The individual mounting holes 432g are arranged to receive four bolts 438 for mounting the inflator 435 on the case 432. As shown in FIGS. 52 to 54, the inflator 435 is attached to the upper wall portion 432e of the peripheral wall portion 432a. Then, the folded airbag 26D is housed below the inflator 435 in the case 432.

The case 432 is formed such that the opening 432c of the peripheral wall portion 432a on the rear side is positioned closer at its upper end 432i to the rear of the vehicle than its lower end 432j (see FIG. 52). In other words, at the peripheral wall portion 432a, the rear end of the upper side wall portion 432e is closer to the rear of the vehicle than the rear end of the lower side wall portion 432h.

The inflator 435 is a disc type inflator, as shown in FIGS. 52 to 54. The inflator 435 includes a generally cylindrical body 435a, which is capable of discharging inflating gas G in response to an electric signal, and a generally square annular flange portion 435b, which protrudes from the outer circumference of the body 435a. In the end portion of the lower side of the body 435a, there are gas discharge ports 435c. In the flange portion 435b, there are four insert holes 435d for receiving the bolts 438, which are formed on a retainer 437 arranged in the airbag 26D. The body 435a is connected with an unillustrated lead wire.

The inflator 435 and the airbag 26D are mounted and fixed in the case 432 by using the generally square annular retainer 437, which is arranged in the airbag 26D. Specifically, the individual bolts 438 of the retainer 437 are inserted, as shown in FIG. 54, into the later-described insert holes 27j of the airbag 26D, the mounting holes 432g of the case 432, and the insert holes 435d formed in the flange portion 435b of the inflator 435. The bolts 438 are individually fastened by nuts 439. Thus, the inflator 435 and the airbag 26D are mounted and fixed on the upper side wall portion 432e of the case 432. Then, the inflator 435 is mounted and fixed on the upper side wall portion 432e (or the peripheral wall portion 432a) of the case 432 such that its axis DO is generally perpendicular to the axis O of the case peripheral wall portion 432a, as shown in FIG. 52.

The airbag 26D has a construction similar to that of the airbag 26C. In the lower side of the vehicle side wall portion 27 in the airbag 26D, there are insert holes 27j for receiving the bolts 438 of the retainer 437, and an insert hole 27k, which is circular and is for holding the main body 435a of the inflator 435.

In the airbag device S10, as described above, the disc-type inflator 435 is so mounted and fixed on the upper side wall portion 432e (or the peripheral wall portion 432a) of the case 432 that its axial direction DO may be generally perpendicular to the axial direction O of the case peripheral wall portion 432a. The disc-type inflator 435 is larger in external diameter D2, including the retainer 437, than in axial length (or thickness) w4 as measured along the axis DO, as shown in FIG. 52. In the airbag device S10, therefore, the distance from the upper side wall portion 432e (the wall portion to which the inflator 435 is attached) to the lower side wall portion 432h (the wall portion confronting the inflator 435), that is, the vertical dimension w5 of the case 432 perpendicular to the axis O of the peripheral wall portion 432a, can be set as follows. The dimension w5 of the case 432 can be set to a size that is calculated by adding the housing space of the airbag 26D to the axial length w4 of the inflator 435. As a result, the dimension w5 of the case 432 can be smaller than that of a case in which the inflator 435 is mounted and fixed on the bottom wall portion 432b of the case 432 so that the axis DO is parallel to the axis of the case peripheral wall portion 432a.

Therefore, the airbag device S10 of the tenth embodiment can be arranged in a narrow housing space by reducing the dimension w5 in the direction perpendicular to the axis of the case 432.

In the airbag device S10 of the tenth embodiment, the inflator 435 is mounted and fixed on the upper side wall portion 432e of the case 432. The rear end of the upper side wall portion 432e is positioned closer to the rear of the vehicle than the rear end of the lower side wall portion 432h. In other words, the upper side wall portion 432e is longer in the longitudinal direction than the remaining peripheral wall portion 432a (i.e., the lower side wall portion 432h). Compared with a case in which the inflator 435 is mounted and fixed on the lower wall portion 432a, therefore, the depth of the case 432 is reduced. Of course if this point is not given importance, it is possible that the inflator 435 may be mounted and fixed on the lower side wall portion 432h. The inflator 435 may naturally be arranged on the left and right side wall portions of the case peripheral wall portion 432a. When the inflator 435 is arranged on the left and right side wall portions of the peripheral wall portion 432a, it is possible to reduce the dimension w6 (see FIG. 54) in the transverse direction, which is perpendicular to the axis of the case.

Figure 57:
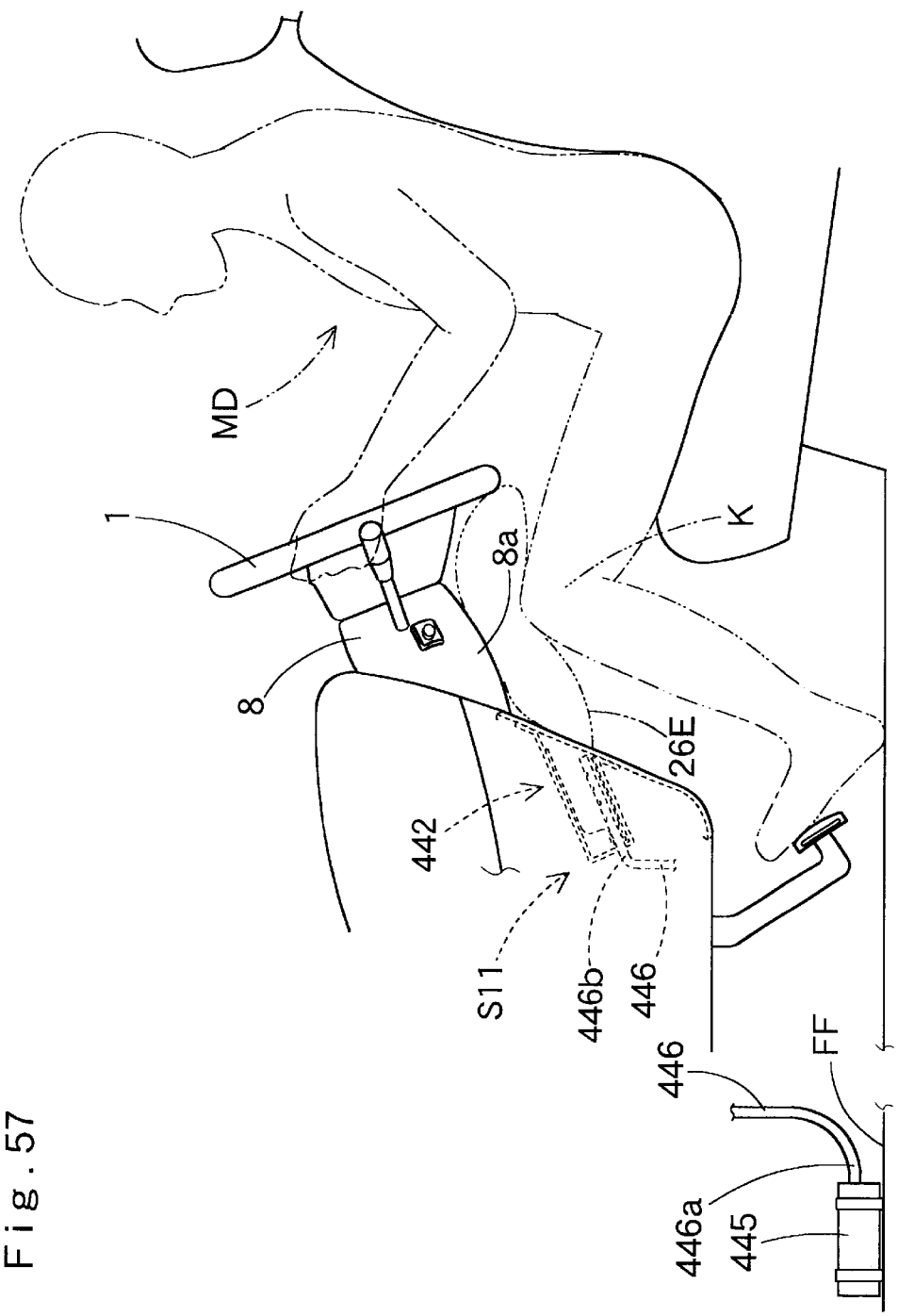
FIG. 57 is a schematic side view of a knee protecting airbag device according to an eleventh embodiment of the invention.

The following is a description of an airbag device S11 of an eleventh embodiment. The airbag device S11 is constructed, as shown in FIG. 57, such that a cylinder type inflator 445 is arranged outside of a case 442 and provided with a gas feed passage 446 for feeding inflating gas to an airbag 26E, which is folded and housed in the case 442. The construction of the airbag device S11 is similar to that of the aforementioned airbag devices S9 and S10, except for the inflator 445, the gas feed passage 446 and the case 442. Therefore, common members will not be explained and will be given common reference numerals.

Figure 58:
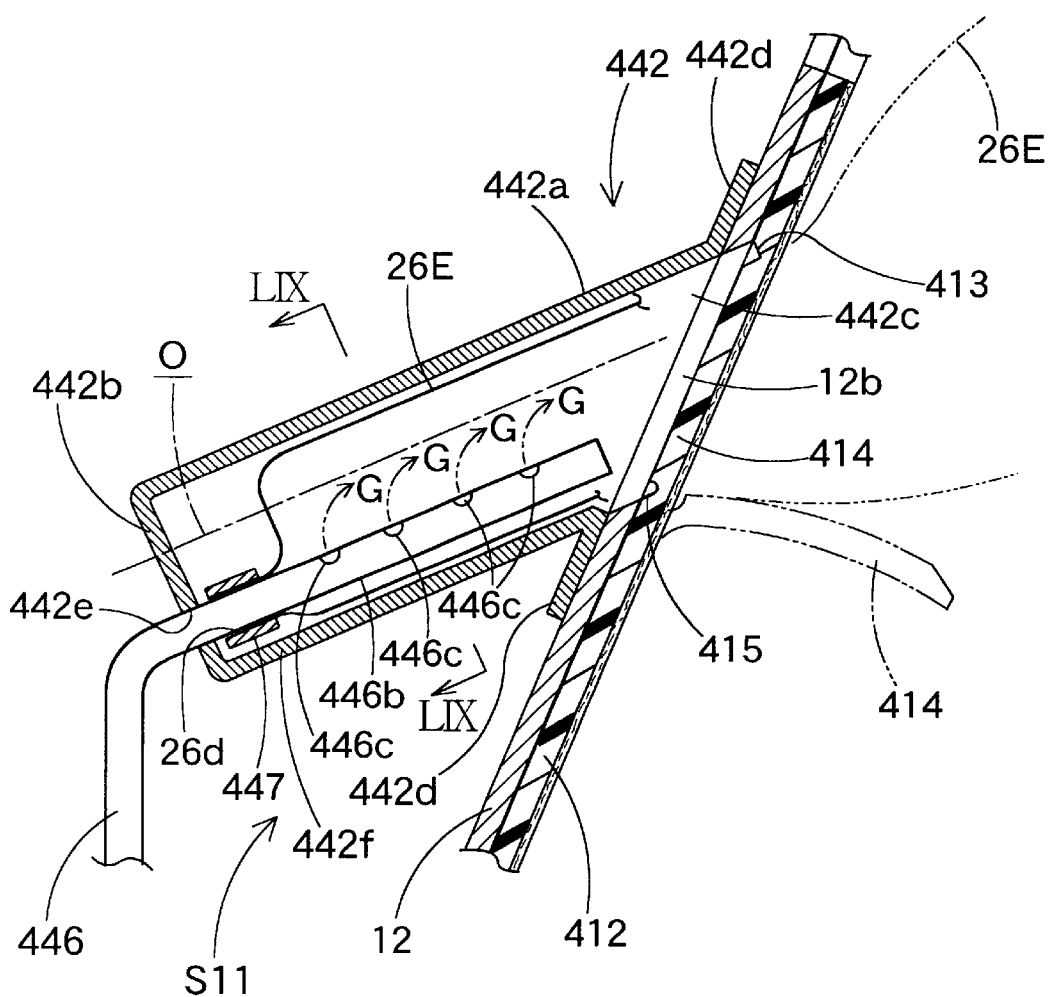
FIG. 58 is a schematic vertical section view of the knee protecting airbag device of the eleventh embodiment where the plane of the section extends in the longitudinal direction of the vehicle.
Figure 59:
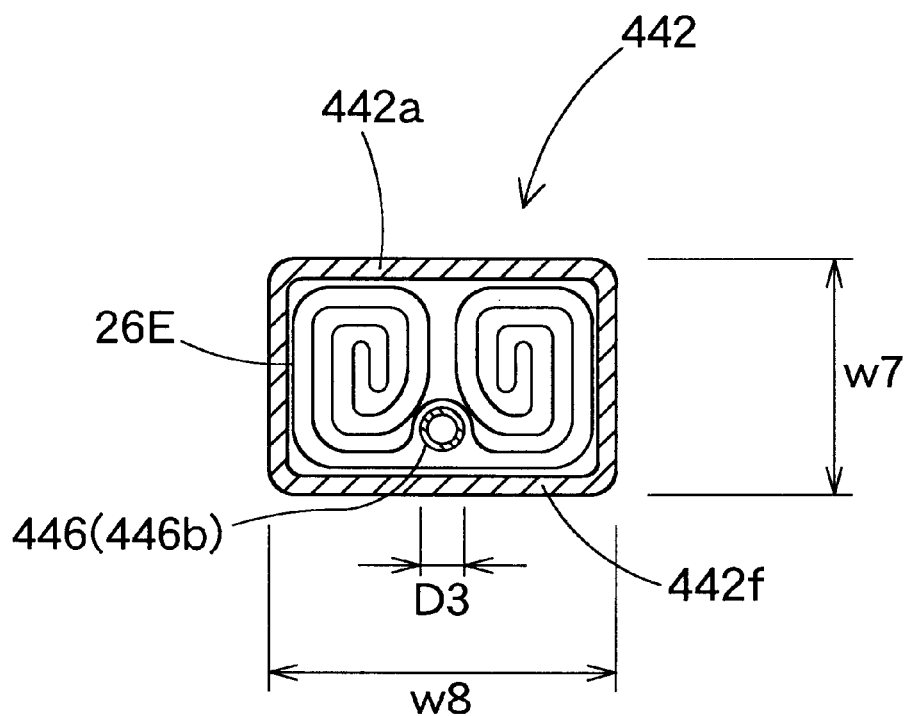
FIG. 59 is a section view taken along plane LIX—LIX of FIG. 58.

The case 442 is provided, as shown in FIGS. 58 and 59, with a peripheral wall portion 442a of a generally rectangular tubular shape, and a bottom wall portion 442b of a generally rectangular shape for closing the front of the peripheral wall portion 442a. From the periphery of an opening 442c of the peripheral wall portion 442a on the vehicle rear side, there is a flange portion 442d for mounting the case 442 on the holding member 12. In the bottom wall portion 442b of the case 442, as shown in FIG. 58, there is an insert hole 442e for the gas feed passage 446. As shown in FIGS. 58 and 59, in the case 442, the later-described end portion 446b of the gas feed passage 446 is located near a lower side wall portion 442f of the peripheral wall portion 442a and is generally parallel with the axis O of the case.

The folded airbag 26E is housed on the left and right sides of the gas feed passage 446 in the case 442.

The gas feed passage 446 is constructed, as shown in FIG. 57, into a pipe shape to connect an upstream end 446a to the inflator 445 and a downstream end 446b to the airbag 26E, which is folded and housed in the case 442. The inflator 445 is mounted and fixed on a frame FF such as a floor panel on the front side of the case 442. The downstream end 446b of the gas feed passage 446 is inserted, as shown in FIG. 58, into the airbag 26E through the insert hole 442e formed in the case 442 and an insert hole 26d formed in the airbag 26E. In the downstream end portion 446b of the gas feed passage 446, there are gas discharge ports 446c for introducing the inflating gas G into the airbag 26E. The airbag 26E and the gas feed passage 446 are connected and fixed by a clamp 447, as shown in FIG. 58.

With this construction of the airbag device S11, the inflator 445 is not located in the case 442. Only the folded airbag 26E and the gas feed passage 446 for feeding the inflating gas G to the airbag 26E are in the case 442. The gas feed passage 446 need not be provided with a gas producing mechanism but may conduct the inflating gas G, so that it can have a smaller volume than that of the inflator 445. For example, as shown in FIG. 59, the gas feed passage 446 of the embodiment can have a smaller external diameter D3 than that of the cylinder-type inflator. As compared with the airbag device S9 having the cylinder-type inflator 421 in the case 419, therefore, the vertical and transverse dimensions w7 and w8, which are perpendicular to the axis of the case, can be reduced.

In the airbag device S11 of the eleventh embodiment, therefore, the case 442 can be arranged in a narrow housing space by reducing the dimensions w7 and w8, which are perpendicular to the axis of the case 442.

In the airbag device S11 of the eleventh embodiment, an intermediate portion 446d of the gas feed passage 446, between the end portions 446a and 446b, may be bent and arranged without any interference with the members arranged around the airbag device S11. Therefore, the intermediate portion 446d of the gas feed passage 446 can be easily arranged in a narrow space.

When the inflator 445 acts in this airbag device S11, the inflating gas G is discharged from the inflator 445 via the gas feed passage 446 and the gas discharge ports 446c in to the airbag 26E. Then, the expanding airbag 26E extends and expands while pushing and opening the door portion 414 of the airbag cover 412.

Figure 60:
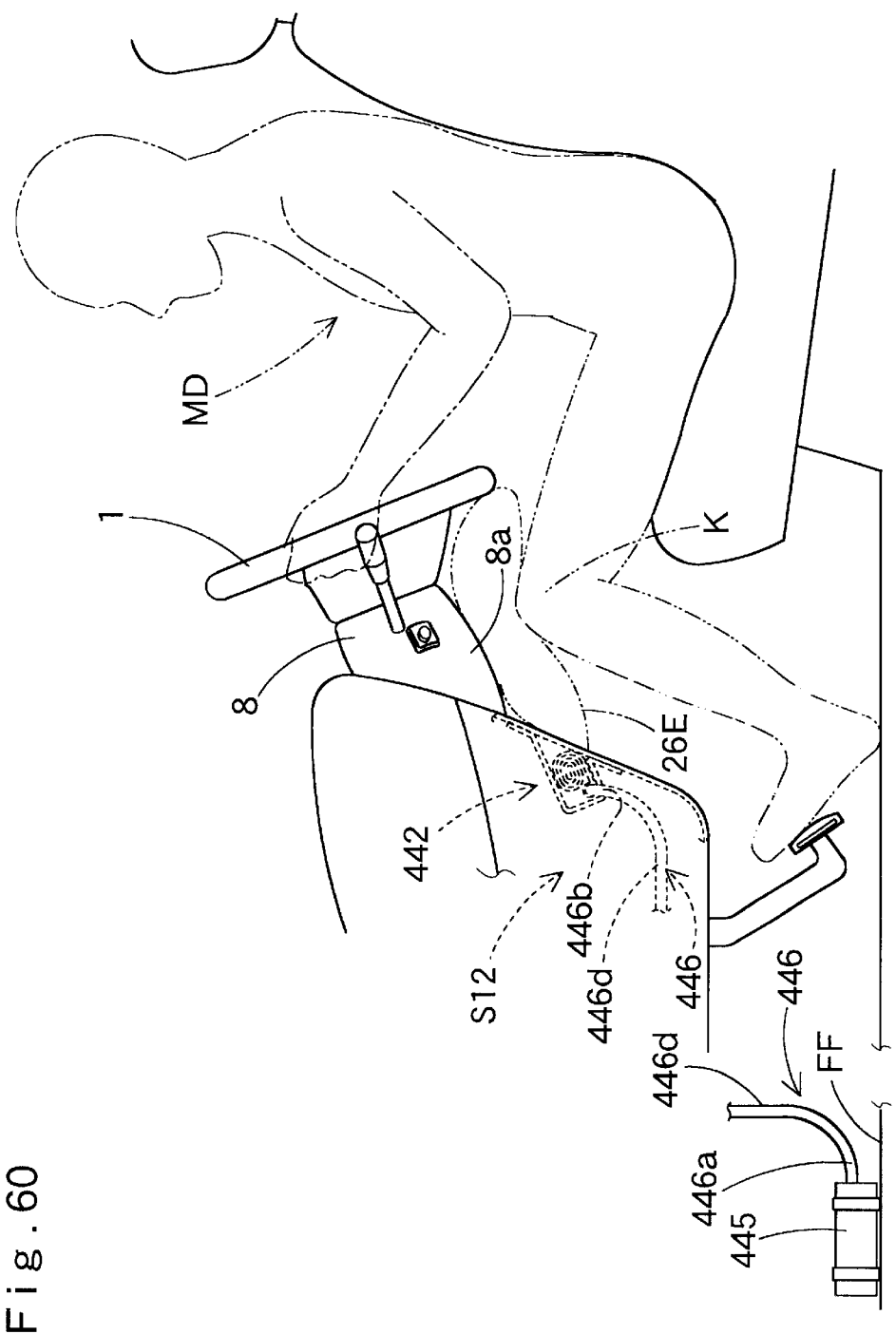
FIG. 60 is a schematic side view of a knee protecting airbag device according to a twelfth embodiment of the invention.
Figure 61:
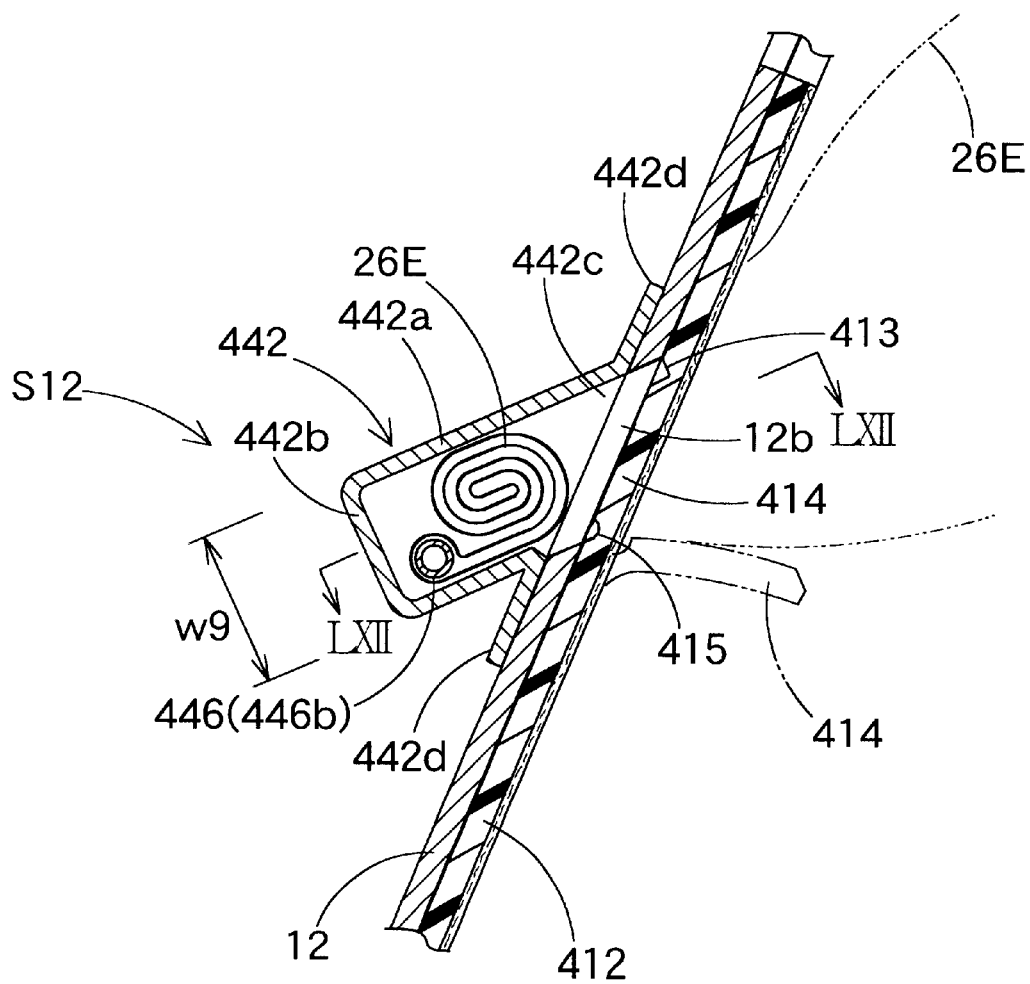
FIG. 61 is a schematic vertical section view of the knee protecting airbag device of the twelfth embodiment where the plane of the section extends in the longitudinal direction of the vehicle.
Figure 62:
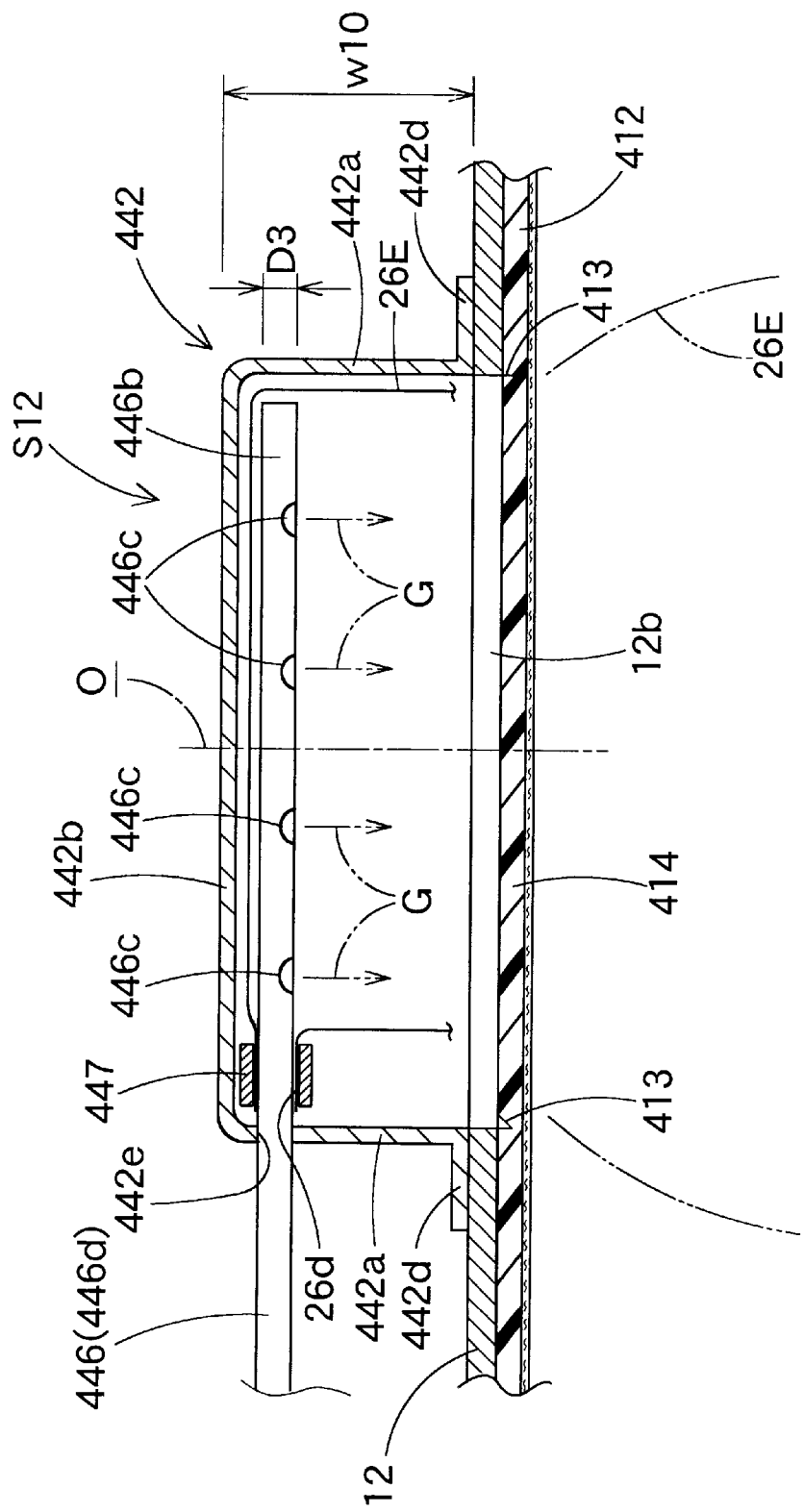
FIG. 62 is a section view taken along plane LXII—LXII of FIG. 61.

If the inflator 445 is arranged at a position different from that of the case 442, on the other hand, an airbag device S12 may be constructed, as shown in FIGS. 60 to 62, such that the downstream end portion 446b of the gas feed passage 446 is arranged in the case 442 such that it is generally perpendicular to the axis O of the case. The construction of the airbag device S12 is similar to that of the aforementioned airbag device S11, except that the end portion 446b of the gas feed passage 446 is arranged in the case 442 and is generally perpendicular to the axis O of the case. Therefore, common members will not be explained and will be given common reference numerals.

In the airbag device S12, on the other hand, the insert hole 442e for holding the gas feed passage 446 is formed in the peripheral wall portion 442a, as shown in FIG. 62. In the case 442, the gas feed passage 446 is arranged near the bottom wall portion 442b and along the transverse directions to perpendicularly intersect the axis O of the case. The folded airbag 26E is housed on the rear side of the gas feed passage 446 in the case 442.

With this construction of the airbag device S12, the gas feed passage 446 has a smaller external diameter D3 than that of the cylinder-type inflator. Therefore, the vertical dimension w9 in the direction perpendicular to the axis O of the case is smaller than that of a case in which the inflator 421 of the airbag device S9 of the ninth embodiment is arranged generally perpendicular to the axis O of the case. With this construction, it is also possible to reduce the depth w10 of the case 442.

In the airbag devices S9 to S12, the cases 419, 432 and 442 are made separate of the holding member 12. However, the cases 419, 432 and 442 may be formed integrally with the holding member 12 by a pressing or welding method using a metallic material such as sheet metal or by a die-casting method using a light metal alloy material of aluminum or the like.

In the airbag devices S9 to S12, the cases 419, 432 and 442 are held by the holding member 12. However, the cases 419, 432 and 442 may be held by a portion within the column cover 8 by attaching brackets or the like on a portion of the column tube 5 in the steering column 3, which does not move. In an alternative case in which the lower panel of the dashboard 10 is arranged below the column cover 8, the cases 419, 432 and 442 may be housed and arranged in the lower panel.

What is claimed is:

1. A knee protecting airbag device for a vehicle, wherein the vehicle has a front end and a rear end, and the airbag device comprises:

a folded airbag; an inflator for feeding inflating gas to said airbag; and a case that houses said airbag and said inflator and is located in front of a seated passenger, wherein:

said airbag, when fed with the inflating gas, extends and expands, while protruding to the rear of the vehicle from an opening of said case, to protect the knees of the passenger;

said knee protecting airbag device further comprises a holding member for supporting said case, wherein the holding member has a mounting portion for mounting the holding member on the vehicle; and said holding member includes a communication hole that communicates with the opening of said case for allowing said airbag to protrude when the airbag is inflated, and a support face, which is located around said communication hole, for supporting a front face of said airbag when the airbag is inflated.

2. The knee protecting airbag device according to claim 1, wherein said case, while housing said folded airbag and said inflator, is assembled in advance with said holding member into an assembly.

3. The knee protecting airbag device of claim 1, wherein said holding member is a plate-like member in which the communication hole is permanently formed, and an airbag cover is located parallel to said holding member, such that said airbag causes an opening to form in said airbag cover when said airbag is inflated after said airbag passes through said communication hole.

4. A knee protecting airbag device for a vehicle, wherein the vehicle has a front end and a rear end, and the knee protecting airbag device comprises: a knee protecting folded airbag and an inflator, for feeding inflating gas to said airbag, and said airbag and said inflator are housed in a plate-shaped holding member, which is located in front of the knees of a seated passenger, wherein:

an airbag cover, which covers the housed airbag in a manner that allows the airbag to protrude, is mounted on said holding member;

said holding member includes a bottomed box-shaped housing portion for housing said airbag and said inflator;

said housing portion includes an opening that faces toward the rear of the vehicle; and said airbag cover includes:
  a door portion for covering the opening of said housing portion, wherein the door portion opens when pushed by said airbag when said airbag is inflated;
  a thin breakaway portion arranged along a periphery of said door portion, wherein the breakaway portion is broken for said door portion to open;
  a hinge portion located along at least one edge of said door portion for providing a pivot for said door portion; and
  a general portion arranged around said door portion, said breakaway portion and said hinge portion for covering a rear periphery of said housing portion; and said airbag cover includes mounting members, which are mounted on said housing portion, for attaching said airbag cover to said housing portion through said holding member, are arranged at a plurality of locations on said general portion around the opening of said housing portion.

5. The knee protecting airbag device according to claim 4, wherein:
  said mounting members have retaining holes; and
  said housing portion has a plurality of hooks, which are fitted in said retaining holes for retaining said mounting members.

6. The knee protecting airbag device according to claim 4, wherein:
  said holding member has a joining portions, which is connected to a body member of the vehicle when said knee protecting airbag device is mounted on the vehicle; and
  a kinetic energy absorbing member, which, under certain conditions, absorbs kinetic energy of the knees of the passenger, is arranged on the body member to which said joining portion is connected.

7. A knee protecting airbag device for a vehicle, wherein the vehicle has a front end and a rear end, and the knee protecting airbag device comprises an airbag module located in front of the knees of a seated passenger, and wherein:
  said airbag module includes: a knee protecting folded airbag; an inflator, which delivers inflating gas to said airbag; a case for housing said airbag and said inflator; and an airbag cover for covering opening, which is located on a rear side of said case;
  said opening permits said airbag to protrude toward the rear of the vehicle, when the airbag is inflated;
  said knee protecting airbag device further includes a plate-shaped holding member, which is made of a deformable material;
  said holding member has a plate-shaped portion, which extends from around the opening of said case, and mounting portions, for mounting the holding member to the vehicle;
  said plate-shaped portion is located in front of an area occupied by said airbag, when said airbag has expanded due to inflation; and,
  said mounting portions are arranged near a periphery of said plate-shaped portion;
  said holding member is constructed to support the case, which houses said airbag and said inflator, and said airbag cover; and when a kinetic energy higher than a predetermined level is applied by said knees to said airbag, said plate-shaped portion is deformed to absorb kinetic energy of said knees.

8. The knee protecting airbag device according to claim 7, wherein said plate-shaped portion of said holding member has ribs, which adjust a quantity of kinetic energy of said knees that can be absorbed by the plate-shaped portion of said holding member.

9. The knee protecting airbag device according to claim 8, wherein said plate-shaped portion of said holding member has a flange portion on its periphery for adjusting a quantity of kinetic energy of said knees which that can be absorbed by the plate-shaped portion of said holding member.

10. A knee protecting airbag device for a vehicle, wherein said vehicle has a front end and a rear end, and said airbag device is arranged in front of the knees of a seated passenger, and wherein the airbag device comprises: a knee protecting folded airbag; an inflator for feeding inflating gas to said airbag; a case, which has an opening that faces toward the rear of the vehicle, for housing said airbag and said inflator; and an airbag cover for covering a rear side of said case, wherein:
  said airbag cover consists of an integral molding, which includes a door portion, which covers the opening of said case, and a general portion, which is located around said door portion;
  said door portion includes a hinge portion, which is arranged at a lower end of the door portion for providing a pivot when said door portion is opened, and a thin breakaway portion, which is arranged at a periphery of the door portion, other than the location of said hinge portion, such that the door portion is opened downward when said airbag is inflated; and
  extension promoting means for rapidly opening said door portion, to promote extension and expansion of said airbag, is arranged near said door portion.

11. The knee protecting airbag device according to claim 10, wherein said door portion is arranged at an inclination such that its upper end is closer to the rear end of the vehicle rear than its hinge portion.

12. The knee protecting airbag device according to claim 11, wherein:
  said case includes a peripheral wall portion and a bottom wall portion;
  said airbag cover has a mounting wall portion for mounting and fixing said airbag cover on said peripheral wall portion; and
  said wall mounting portion serves as said extension promoting means and is located near an upper end of said thin breakaway portion, which is above said door portion.

13. The knee protecting airbag device according to claim 11, wherein:
  a guide wall portion, which covers lower section of said opening, is arranged in said case near said door portion; and
  said guide wall portion serves as said extension promoting means to guide said airbag toward an upper side of said door portion, when said airbag is inflated.

14. The knee protecting airbag device according to claim 11, wherein:
  said door portion has ribs formed to protrude toward the front end of said vehicle; and
  front faces of said ribs serve as said extension promoting means for opening said door portion when pushed by said airbag, when said airbag is inflated.

15. The knee protecting airbag device according to claim 11, wherein said case includes a peripheral wall portion and a bottom wall portion;

a left side wall portion and a right side wall portion of said peripheral wall portion are each inclined so that the distance between upper ends of said left side wall portion and said right side wall portion is greater than the distance between lower ends of said left side wall portion and said right side wall portion; and said left side wall portion and said right side wall portion serve as said extension promoting means.

16. A knee protecting airbag device for a vehicle, wherein the vehicle has a front end, and a rear end, and the knee protecting airbag device comprises:

a folded airbag; an inflator for feeding inflating gas to said airbag; and a case that houses said airbag and said inflator and is arranged below a steering column, wherein:

said airbag, when fed with inflating gas, extends and expands, while protruding toward the rear of the vehicle from an opening of said case, to protect the knees of a passenger;

said opening faces toward the rear end of the vehicle, and said case includes a peripheral wall portion, which defines an axis of said case, and a bottom wall portion, which closes a front side of said peripheral wall portion; and said inflator is a cylinder—type inflator that has an axis and is housed in said case such that the axis of the inflator is generally parallel to the axis of said peripheral wall portion.

17. The knee protecting airbag device of claim 16, wherein said axis of said peripheral wall portion extends from the front of the vehicle to the rear of the vehicle.

18. A knee protecting airbag device for a vehicle, wherein the vehicle has a front end and a rear end, and the knee protecting airbag device comprises: a folded airbag; an inflator for feeding inflating gas to said airbag; and a case that houses said airbag and said inflator and is arranged below a steering column, wherein:

when said airbag is fed with inflating gas, said airbag expands and protrudes toward the rear end of the vehicle from an opening of said case, to protect the knees of a passenger;

said opening of said case faces the rear end of the vehicle, and the case includes a peripheral wall portion, which has an axis, and a bottom wall portion, which closes a front side of said peripheral wall portion; and said inflator is a disc—type inflator that has an axis and is mounted and fixed on the peripheral wall portion of said case such that the axis of the inflator is generally perpendicular to the axis of said peripheral wall portion.

19. The knee protecting airbag device according to claim 18, wherein:

said case is constructed such that an upper side of the opening is positioned closer to the rear of the vehicle than a lower side of the opening; and said inflator is mounted and fixed on an upper portion of said peripheral wall portion.

20. A knee protecting airbag device for a vehicle, wherein the vehicle has a front end and a rear end, and the knee protecting airbag device comprises: a folded airbag; an inflator for feeding inflating gas to said airbag; and a case that houses said airbag and is arranged below a steering column, wherein:

when said airbag is fed with inflating gas, said airbag expands, and protrudes toward the rear end of the vehicle from an opening of said case, to protect the knees of a passenger;

said opening of said case faces toward the rear of the vehicle, and said case includes a peripheral wall portion and a bottom wall portion, which closes a front side of said peripheral wall portion, and said inflator has a gas feed passage for feeding inflating gas to said airbag, when said airbag is folded and housed in said case, and the inflator is located outside of said case.

* * * * *